(12) United States Patent
Bendeck et al.

(10) Patent No.: US 12,216,678 B2
(45) Date of Patent: Feb. 4, 2025

(54) SEARCH TOOL FOR EXPLORING QUANTIFIABLE TRENDS IN LINE CHARTS

(71) Applicant: Salesforce, Inc., San Francisco, CA (US)

(72) Inventors: Alexander Elias Bendeck, Boca Raton, FL (US); Dennis Nathan Bromley, Seattle, WA (US); Vidya Raghavan Setlur, Portola Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/426,186

(22) Filed: Jan. 29, 2024

(65) Prior Publication Data
US 2024/0362248 A1 Oct. 31, 2024

Related U.S. Application Data

(60) Provisional application No. 63/543,070, filed on Oct. 7, 2023, provisional application No. 63/463,055, filed on Apr. 30, 2023.

(51) Int. Cl.
| | |
|---|---|
| *G06F 16/00* | (2019.01) |
| *G06F 16/242* | (2019.01) |
| *G06F 16/2457* | (2019.01) |
| *G06F 16/26* | (2019.01) |
| *G06F 16/28* | (2019.01) |
| *G06F 40/169* | (2020.01) |
| *G06F 40/205* | (2020.01) |
| *G06F 40/284* | (2020.01) |
| *G06F 40/30* | (2020.01) |

(52) U.S. Cl.
CPC ............ *G06F 16/26* (2019.01); *G06F 16/243* (2019.01); *G06F 16/24578* (2019.01); *G06F 16/285* (2019.01); *G06F 40/169* (2020.01); *G06F 40/205* (2020.01); *G06F 40/284* (2020.01); *G06F 40/30* (2020.01)

(58) Field of Classification Search
CPC ...... G06F 16/26; G06F 16/243; G06F 16/285; G06F 16/24578
USPC ....................................................... 707/723
See application file for complete search history.

(56) References Cited

U.S. PATENT DOCUMENTS

| | | | |
|---|---|---|---|
| 2013/0038612 A1* | 2/2013 | Hanumara | G06Q 30/02 345/440 |
| 2022/0189140 A1* | 6/2022 | Woodbeck | G06V 10/75 |

\* cited by examiner

*Primary Examiner* — Chelcie L Daye
(74) *Attorney, Agent, or Firm* — Morgan, Lewis & Bockius LLP

(57) ABSTRACT

A computing device receives a natural language input specifying search terms directed to a dataset. The device parses the input into tokens and executes queries against a search index to retrieve a plurality of labeled trend events. Each labeled trend event has a respective chart identifier. The device determines a respective composite score for each labeled trend event and individually assigns each labeled trend event to a respective group. For each group, the device sorts the respective labeled trend events within the respective group according to respective composite scores, determines a respective final score for each group, and ranks the groups according to one or more determined final scores. The device retrieves data corresponding to a first subset of line charts having the respective chart identifiers of the ranked groups, generates the first subset of line charts, and displays one or more line charts of the first subset with annotation.

20 Claims, 53 Drawing Sheets
(33 of 53 Drawing Sheet(s) Filed in Color)

| Labeled trend event 1 252-1 |
|---|
| Chart ID 262-1 |
| Start point 264-1 |
| End point 266-1 |
| Label(s) 268-1 |
| ⋮ |

```
{    "index": {"similarity": {"default": {"type": "scripted",
"script": {"source": "double tf = Math.sqrt(doc.freq); double idf =
1.0; double norm = 1/Math.sqrt(doc.length); return query.boost * tf
* idf * norm;"}}}},
    "analysis": {
        "filter": {
            "synonym": {
                "type": "synonym",
                "synonyms_path": "synonyms_final.txt"
            },
            "custom_edgegrams": {
                "type": "edge_ngram",
                "min_gram": 3,
                "max_gram": 6
            }
        },
        "analyzer": {
            "modified_standard": {
                "tokenizer": "standard",
                "filter": ["lowercase", "kstem"]
            },
            "modified_standard_synonym": {
                "tokenizer": "standard",
                "filter": ["lowercase", "synonym", "kstem"]
            },
            "synonym_edgegrams": {
                "tokenizer": "standard",
                "filter": ["lowercase", "synonym", "kstem",
"custom_edgegrams"]
            },
            "edgegrams": {
                "tokenizer": "standard",
                "filter": ["lowercase", "kstem",
"custom_edgegrams"]
            }
        }
    }
}
```

Figure 15

```
{ "properties": {
        "label": {
            "type": "text",
            "analyzer": "modified_standard",
            "norms": true,
            "fielddata": false,
            "fields": {
                "edge": {"type": "text", "analyzer": "edgegrams", "search_analyzer": "modified_standard"},
                "synonym": {"type": "text", "analyzer": "modified_standard_synonym", "search_analyzer": "modified_standard"},
                "synonym_edge": {"type": "text", "analyzer": "synonym_edgegrams", "search_analyzer": "modified_standard"}
            }
        },
        "nouns_verbs": {
            "type": "text",
            "analyzer": "modified_standard",
            "norms": true,
            "fielddata": false,
            "fields": {
                "edge": {"type": "text", "analyzer": "edgegrams", "search_analyzer": "modified_standard"},
                "synonym": {"type": "text", "analyzer": "modified_standard_synonym", "search_analyzer": "modified_standard"},
                "synonym_edge": {"type": "text", "analyzer": "synonym_edgegrams", "search_analyzer": "modified_standard"}
            }
        }
    }
}
```

Figure 16

```
subsiding => lessening, lessen, relaxing, easing, abating
ascending => uprising
decline => diminution, declivity, declension, decay, declination,
reduction, downslope
soft => slack, gentle, slight, meager, mild, weak, easy
escalating => amplifying, intensify, step up, intensifying
bouncing => jounce, rallying, resurging, recovering
descending => down, sliding, come down
mounting => wax, accumulating, climb up
decreasing => minify, lessen, dwindling, reducing, lowering
stable => solid, fixed, firm, secure
accelerating => quickening, speeding, rushing, hastening, speed,
speed up, quicken
diminishing => lessening, lessen, dwindling, reducing
consistent => regular, uniform
falling => down, lessen, plummeting, come down, lowering
sharp => abrupt, intense, steep, precipitous, acute, severe,
dramatic
sharply => steeply
upturn => improvement, recovery
constant => fixed, invariant, changeless
declining => sliding, reducing, worsen
steady => firm, uniform, unfluctuating
```

Figure 17A

```
even => equal, uniform
stagnant => dormant, inactive, unmoving, moribund, lethargic
slumping => slide down, drooping, diving
decelerating => cooling, moderating, retard, easing-off, reducing
growing => amplifying, enlarging
soaring => soar up, rallying, soar upwards, skyrocketing, zoom
downturn => downswing, recession
maximum => peak, peaked, top, climax, pinnacle, high, extremum,
crest, crown, apex, zenith, acme, vertex, summit, highest, max
quick => swift, prompt, rapid, hasty, speedy
quickly => fast
dropping => plummeting, drop down
increasing => amplifying, intensifying
climbing => wax, climb up
rising => wax, progressing, arise, enhancing, come up, uprise, move
up, appreciating, lift
peak, peaked
least, minimum, min, lowest
least, minimum, min, lowest
dipping, dip
static => flatlining, stagnating, stagnant, plateauing, plateau,
unchanging, unvarying, constant, stable, steady, even, flat
```

2220 Execute the one or more queries against a search index to retrieve a plurality of labeled trend events.

> 2222 Each labeled trend event (i) corresponds to respective portion of a respective line chart of a set of line charts representing the time series data and (ii) has a respective chart identifier.

2224 Each labeled trend event of the plurality of labeled trend events is identified by a respective chart ID, a respective start point, a respective end point, and a respective set of semantic labels.

2226 Each labeled trend event of the plurality of labeled trend events is a respective labeled slope segment of a respective line chart in the set of line charts.

2228 Each line chart in the set of line charts is a plot of data values of a data field over a predefined time span.

2230 Each line chart in the set of line charts has the same time span.

2232 The search index stores (i) first vector representations corresponding to the plurality of labeled trend events, (ii) second vector representations corresponding to a plurality of encoded tokens, and (iii) respective mapping relationships between the first vector representations and the second vector representations.

2234 The retrieved plurality of labeled trend events includes a first labeled trend event corresponding to an exact match of the one or more tokens.

2236 The retrieved plurality of labeled trend events includes a second labeled trend event corresponding to an inexact match of the one or more tokens.

2238 When no exact match exists between the retrieved plurality of labeled trend events and the one or more token, generate and display a notification indicating that there is no exact match for the one or more terms. Display one or more user-selectable text labels corresponding to synonyms of the one or more terms.

2310

2316 Each labeled trend event of the first and second sets of labeled trend events is a respective labeled slope segment of a respective line chart in the set of line charts.

2318 Each line chart in the set of line charts has the same time span.

2320 Each line chart in the set of time series line charts is a plot of data values of a data field over a predefined timespan.

2322 The first sequence of data trends is specified by the first search term, the second search term, and the third search term.

2324 The determination that the first search term and the second search term specify the first sequence of data trends includes parsing the natural language input including the first search term and the second search term into a plurality of tokens, including assigning (i) a first semantic role to a first token corresponding to the first search term and (ii) a second semantic role to a second token corresponding to the second search term; and determining, based on the assigned first and second semantic roles, that the first search term and the second search term specify the first sequence of data trends.

2326 Parsing the natural language input includes determining that an event type corresponding to the natural language input is a multi-sequence event type.

Figure 23B 2300 (cont'd)

2328 Construct one or more sequences of labeled trend events based on the retrieved first and second sets of labeled trend events.

> 2330 For each sequence of labeled trend events, join a respective first labeled trend event corresponding to the first search term and a respective second labeled trend event corresponding to the second search term, according to (i) a respective chart identifier corresponding to the respective first labeled trend event and the respective second labeled trend event and (ii) respective start and end dates of the respective first labeled trend event and the respective second labeled trend event.

> 2332 When the constructed one or more sequences of labeled trend events are partial sequence matches of the natural language input: determine, for each sequence of the one or more sequences, a respective sequence score based at least in part on (i) the number of events in the respective sequence and (ii) the respective sequence offset.

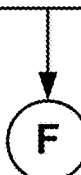

2334 Determine, for each sequence of the one or more sequences, a respective sequence score by aggregating one or more respective composite scores corresponding to one or more respective labeled trend events in the respective sequence.

2336 For a respective labeled trend event in the respective sequence, determine a respective composite score for the respective labeled trend event based on (1) a respective label score representing the extent to which a respective search term matches respective labels of a respective set of labeled trend events and (2) a respective visual saliency score.

2338 The respective composite score is a product of the respective label score and the respective visual saliency score.

2340 Compute the respective label score according to (i) the frequency with which the search terms occur in the respective labeled trend event and (ii) a label length of the respective labeled trend event.

2342 Compute the respective visual saliency score according to (1) the temporal duration of the respective portion of the respective line chart relative to the predefined timespan and (ii) the first difference in the data values of the data field over the temporal duration relative to a second difference in the data values of the data field over the predefined timespan.

2344 Assign each sequence of labeled trend events, of the one or more sequences of labeled trend events, into one or more groups according to the respective chart identifier.

2346 Determine, for each group of the one or more groups, a respective final score.

2348 The respective final score for each group of the one or more groups is an aggregation of one or more respective sequence scores, from one or more respective sequences of labeled trend events, in the respective group.

Figure 23D

SEARCH TOOL FOR EXPLORING QUANTIFIABLE TRENDS IN LINE CHARTS

RELATED APPLICATIONS

This application claims the benefit of (i) U.S. Provisional Patent Application No. 63/543,070, filed Oct. 7, 2023, titled "Search Tool for Exploring Quantifiable Trends in Line Charts" and (ii) U.S. Provisional Patent Application No. 63/463,055, filed Apr. 30, 2023, titled "Quantifying the Semantic Meaning of Hedge Words used for Data Interaction," each of which is incorporated by reference herein in its entirety.

This application is related to U.S. patent application Ser. No. 18/426,192, filed Jan. 29, 2024, titled "Systems and Methods for Exploring Quantifiable Trends in Line Charts," which is incorporated by reference herein in its entirety.

TECHNICAL FIELD

The disclosed implementations relate generally to data visualization and more specifically to systems, methods, and user interfaces that enable users to explore quantifiable trends in time series data.

BACKGROUND

Natural language and search interfaces facilitate data exploration and provide visualization responses to analytical queries based on underlying datasets. Existing search tools support basic analytical intents to just document search, fact-finding, or simple retrieval of data values, and have limited support for more specific analytic tasks such as the identification of precise temporal trends in time-series data.

SUMMARY

Trend analysis is an important aspect of the data analysis and decision-making process. Trends are data patterns that indicate a general change in data attributes (e.g., data fields, or data values of a data field) over time. The identification of data trends can in turn lead to the recognition of anomalies or deviations from normal or expected values of a dataset, due to factors such as significant events, seasonality, and market conditions. Visual data analysis tools often visualize trends as line charts. These tools can also provide additional computation functionality such as moving averages, trend lines, or regression analysis to indicate how the data changes over time.

Search interfaces, including those that enable natural language inputs, can facilitate data exploration and provide visualization responses to analytical queries based on underlying datasets. For instance, search engines can provide data relevant to the user's query in the form of visualizations and/or widgets. Natural language interfaces (NLIs) for visual data analysis and large language models (LLMs) make it easy and convenient for a user to interact with a device and query data through the translation of user intent into device commands.

Presently, most search tools can only support basic analytical tasks such as document search, fact-finding, or simple retrieval of data values. These tools have limited support for more specific analytic tasks, such as computing derived values, finding correlations between variables, creating clusters of data points, and identifying temporal trends. NLI-related tools that are currently available tend to focus on the general support of analytical inquiry and does not consider the interpretation of intents specific to data trends.

The human language (e.g., natural language) is remarkably diverse when it comes to describing data trends. Expressions such as "slow increase," "steady increase," "exploding," "slumping," and "tanking" convey different extents (e.g., relative magnitudes or degrees) of changes in data values and are likely to invoke different user responses. The expressive power in these scenarios comes from the precise, quantified semantics of these words used to describe the trends, which existing NLI systems are unable to capture or leverage upon.

To empower users to search and glean patterns in data trends, what is needed are improved systems, devices, and user interfaces that are capable of leveraging semantics to interpret expressive user analytical intents. Using the stock market as an example, the system would need to understand what terms such as "plateau," "tank," or "fell sharply" mean to a user, in order to be able to identify the relevant stocks that fit the description and provide that information to the user.

Some implementations of the present disclosure describe a system and user interface that enables users to search for phenomena in a dataset by leveraging precise, quantified semantics of language, focusing on searching for trends in time series data.

Some implementations of the present disclosure describe generating a labeled dataset of semantic concepts describing trends and their quantifiable properties, collected through crowdsourced data collection experiments. The disclosed dataset maps numeric slopes to semantic trend descriptor words. For example, the dataset includes slope labels (e.g., "falling") and slope labels with modifiers ("slowly falling"), along with multi-line trends that comprise a combination of "up", "down", and "flat" trend segments (e.g., "peak" and "valley"). The dataset provides useful metadata that enable a structured approach to indexing, classification, and retrieval of trends in a search system. Metadata that can encapsulate language describing slopes and angles can further enhance the precision and recall of search interfaces. Based on this dataset, an approach for applying semantic trend descriptor labels to raw time series data is introduced.

Some implementations of the present disclosure describe a system and interface that leverage a quantified semantics dataset and labeling algorithms to produce a novel analytical search experience that supports diverse trend search intents and facilitates the retrieval and visualization of temporal data patterns. The disclosed system and interface, also known as "SlopeSeeker," incorporates custom logic for scoring and ranking results based on both the label relevance and visual prominence of trends. In some implementations, SlopeSeeker surfaces a semantic hierarchy of trend descriptor terms from our dataset, with which the user can interact to filter results down to only those that it deems most relevant.

The present disclosure extends the capabilities of general searching to support intents that involve trends and their properties in line charts. For instance, SlopeSeeker detects analytical trend intents in the search queries and finds trends matching the specified quantifiable properties such as "sharp decline" and "gradual rise" in line charts. By leveraging quantified semantics of language, the present disclosure uniquely explores the nuances of trend patterns and their properties using natural language as the modality for expressing trend search queries.

As disclosed herein, SlopeSeeker also integrates text with the search results, along with faceted browsing, to provide additional information and expressivity for navigating the search results. The present disclosure also builds upon search and natural language interface data analysis systems to support the exploration of trends with a comprehensive labeled semantic concept map of trends and their properties.

The systems, methods, and user interfaces of this disclosure each have several innovative aspects, no single one of which is solely responsible for the desirable attributes disclosed herein.

(A1) In accordance with some implementations, a method for analyzing data trends is performed at a computing device having one or more processors, and memory storing one or more programs configured for execution by the one or more processors. The method includes receiving a first natural language input specifying one or more search terms directed to a dataset. The dataset comprises a set of time series data. The method includes, in response to receiving the first natural language input, parsing the first natural language input into one or more tokens. The method includes assigning a respective semantic role to each of the one or more tokens. The method includes translating (i) the one or more tokens and (ii) one or more semantic roles assigned to the one or more tokens into one or more queries. The method includes executing the one or more queries against a search index to retrieve a plurality of labeled trend events. Each labeled trend event (i) corresponds to respective portion of a respective line chart of a set of line charts representing the time series data and (ii) has a respective chart identifier. The method includes determining, for each labeled trend event, a respective composite score. The method includes individually assigning each of the plurality of labeled trend events to a respective group according to the respective chart identifier, where each group (i) includes one or more respective labeled trend events and (ii) corresponds to one respective line chart in the set of line charts. The method includes sorting, for each group of the one or more groups, the one or more respective labeled trend events within the respective group according to respective composite scores corresponding to the one or more respective labeled trend events. The method includes determining, for each group of the one or more groups, a respective final score. The method includes ranking the one or more groups according to one or more determined final scores. The method includes retrieving, from the dataset, data corresponding to a first subset of line charts having the respective chart identifiers of the ranked one or more groups in accordance with the ranking. The method includes generating the first subset of line charts. The method includes annotating respective segments of the first subset of line charts that correspond to the labeled trend events. The method also includes displaying one or more line charts of the first subset of line charts as annotated.

(A2) In some implementations of A1, the method further includes, after retrieving the data corresponding to the first subset of line charts, generating, for each line chart in the first subset of line charts, a respective text snippet describing a predefined number of events that match the one or more search terms, including annotating respective words in the respective text snippet that match the one or more search terms. Displaying the one or more of the first subset of line charts as annotated includes displaying the respective text snippet with each line chart in the one or more line charts.

(A3) In some implementations of A2, the method further includes displaying the annotated respective words with a different visual characteristic from other words in the respective text snippet and displaying the annotated respective segments with a different visual characteristic from other segments of the one or more line charts.

(A4) In some implementations of any of A1-A3, the respective semantic role for each token comprises a predefined category of a plurality of categories. The plurality of categories includes two or more of: an event type, a trend, an attribute, and a date range.

(A5) In some implementations of A4, the plurality of categories includes the event type and the event type is either a single event or a multi-sequence event.

(A6) In some implementations of any of A1-A5, each labeled trend event of the plurality of labeled trend events is identified by a respective chart ID, a respective start point, a respective end point, and a respective set of semantic labels.

(A7) In some implementations of any of A1-A6, each labeled trend event of the plurality of labeled trend events is a respective labeled slope segment of a respective line chart in the set of line charts.

(A8) In some implementations of any of A1-A7, the respective composite score for each labeled trend event is computed based on (1) a respective label score representing an extent to which the one or more search terms match respective labels of the plurality of labeled trend events and (2) a respective visual saliency score.

(A9) In some implementations of A8, for each labeled trend event, the respective composite score is a product of the respective label score and the respective visual saliency score.

(A10) In some implementations of A8 or A9, determining, for each labeled trend event, the respective composite score includes computing the respective label score according to (i) a frequency with which the search terms occur in the respective labeled trend event and (ii) a label length of the respective labeled trend event.

(A11) In some implementations of any of A8-A10, each line chart in the set of line charts is a plot of data values of a data field over a predefined time span. Determining, for each labeled trend event, the respective composite score includes computing the respective visual saliency score according to (i) the temporal duration of the respective portion of the respective line chart relative to the predefined time span and (ii) the first difference in the data values of the data field over the temporal duration relative to a second difference in the data values of the data field over the predefined time span.

(A12) In some implementations of any of A1-A11, each line chart in the set of line charts has the same time span.

(A13) In some implementations of any of A1-A12, the search index stores (i) first vector representations corresponding to the plurality of labeled trend events, (ii) second vector representations corresponding to a plurality of encoded tokens, and (iii) respective mapping relationships between the first vector representations and the second vector representations.

(A14) In some implementations of any of A1-A13, the retrieved plurality of labeled trend events includes a first labeled trend event corresponding to an exact match of the one or more tokens and a second labeled trend event corresponding to an inexact match of the one or more tokens.

(A15) In some implementations of any of A1-A14, the method further includes: when no exact match exists between the retrieved plurality of labeled trend events and the one or more tokens: (i) generating and displaying a notification indicating that there is no exact match for the one or more terms and (ii) displaying one or more user-selectable text labels corresponding to synonyms of the one or more terms.

(B1) In accordance with some implementations, a method for analyzing data trends is performed at a computing device having one or more processors, and memory storing one or more programs configured for execution by the one or more processors. The method includes receiving a natural language input specifying a plurality of search terms directed to a dataset. The plurality of search terms includes a first search term and a second search term. The second search term is subsequent to the first search term in the natural language input. The dataset comprises a set of time series data. The method includes, in response to receiving the natural language input: when the first search term and the second search term specify a first sequence of data trends: (i) for the first search term, executing one or more first queries against a search index to retrieve a first set of labeled trend events and (ii) for the second search term, executing one or more second queries against the search index to retrieve a second set of labeled trend events. Each labeled trend event in the first and second sets of labeled trend events (i) corresponds to respective portion of a respective line chart of a set of line charts representing the time series data and (ii) has a respective chart identifier. The method includes constructing one or more sequences of labeled trend events based on the retrieved first and second sets of labeled trend events. The method includes assigning each sequence of labeled trend events, of the one or more sequences of labeled trend events, into one or more groups according to the respective chart identifier. The method includes determining, for each group of the one or more groups, a respective final score. The method includes ranking the one or more groups according to one or more determined final scores. The method includes retrieving, from the dataset, data corresponding to a subset of line charts having the respective chart identifiers of the ranked one or more groups in accordance with the ranking. The method includes generating the subset of line charts. The method includes annotating respective segments of the subset of line charts that correspond to the sequences of labeled trend events. The method also includes displaying one or more line charts of the subset of line charts as annotated.

(B2) In some implementations of B1, constructing the one or more sequences of labeled trend events based on the retrieved first and second sets of trend events includes, for each sequence of labeled trend events: joining a respective first labeled trend event corresponding to the first search term and a respective second labeled trend event corresponding to the second search term, according to (i) a respective chart identifier corresponding to the respective first labeled trend event and the respective second labeled trend event and (ii) respective start and end dates of the respective first labeled trend event and the respective second labeled trend event.

(B3) In some implementations of B1 or B2, the method includes after constructing the one or more sequences of labeled trend events, determining, for each sequence of the one or more sequences, a respective sequence score by aggregating one or more respective composite scores corresponding to one or more respective labeled trend events in the respective sequence. The respective final score for each group of the one or more groups is an aggregation of one or more respective sequence scores, from one or more respective sequences of labeled trend events, in the respective group.

(B4) In some implementations of B3, the method further includes, for a respective labeled trend event in the respective sequence, determining a respective composite score for the respective labeled trend event based on (1) a respective label score representing an extent to which a respective search term matches respective labels of a respective set of labeled trend events and (2) a respective visual saliency score.

(B5) In some implementations of B4, the respective composite score is a product of the respective label score and the respective visual saliency score.

(B6) In some implementations of B4 or B5, determining the respective composite score includes computing the respective label score according to (i) a frequency with which the search terms occur in the respective labeled trend event and (ii) a label length of the respective labeled trend event.

(B7) In some implementations of any of B4-B6, each line chart in the set of time series line charts is a plot of data values of a data field over a predefined timespan. Determining the respective composite score includes computing the respective visual saliency score according to (1) the temporal duration of the respective portion of the respective line chart relative to the predefined timespan and (ii) the first difference in the data values of the data field over the temporal duration relative to a second difference in the data values of the data field over the predefined timespan.

(B8) In some implementations of any of B1-B7, the plurality of search terms specified in the natural language input includes a third search term. The first sequence of data trends is specified by the first search term, the second search term, and the third search term.

(B9) In some implementations of B8, the method further includes, when the constructed one or more sequences of labeled trend events are partial sequence matches of the natural language input, determining, for each sequence of the one or more sequences, a respective sequence score based at least in part on (i) the number of events in the respective sequence and (ii) the respective sequence offset.

(B10) In some implementations of B9, the respective final score for each group of the one or more groups is an aggregate of one or more respective sequence scores, from one or more respective sequences of labeled trend events, in the respective group.

(B11) In some implementations of any of B1-B10, the determination that the first search term and the second search term specify the first sequence of data trends includes: parsing the natural language input that includes the first search term and the second search term into a plurality of tokens, including assigning (i) a first semantic role to a first token corresponding to the first search term and (ii) a second semantic role to a second token corresponding to the second search term, and determining, based on the assigned first and second semantic roles, that the first search term and the second search term specify the first sequence of data trends.

(B12) In some implementations of B11, parsing the natural language input includes determining that an event type corresponding to the natural language input is a multi-sequence event type.

(B13) In some implementations of any of B1-B12, each labeled trend event of the first and second sets of labeled trend events is a respective labeled slope segment of a respective line chart in the set of line charts.

(B14) In some implementations of any of B1-B13, each line chart in the set of line charts has the same time span.

In accordance with some implementations, a computing device includes a display, one or more processors, and memory coupled to the one or more processors. The memory stores one or more programs configured for execution by the one or more processors. The one or more programs include instructions for performing any of the methods disclosed herein.

In accordance with some implementation, a non-transitory computer readable storage medium stores one or more programs configured for execution by a computing device having a display, one or more processors, and memory. The one or more programs include instructions for performing any of the methods disclosed herein.

Thus methods, systems, and graphical user interfaces are disclosed that support natural language querying of quantifiable trends.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

FIG. 2B illustrates a labeled trend event, in accordance with some implementation.

FIGS. 7A-7C show the results of three crowdsourced experiments that were designed to collect a dataset of quantified semantics for trend descriptor words.

FIG. 15 shows a code snippet for a search index configuration, in accordance with some implementations.

FIG. 16 illustrates a code snippet for defining the properties of fields within an index mapping in the search index, in accordance with some implementations.

FIGS. 17A and 17B illustrate contents of a synonym file, in accordance with some implementations.

FIGS. 22A-22D provide a flowchart of a method for analyzing data trends, in accordance with some implementations.

FIGS. 23A-23E provide a flowchart of a method for analyzing data trends, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

Some implementations of the present disclosure are directed to systems, methods, and user interfaces that enable users to search and glean for patterns in trends. The present disclosure extends the capabilities of general search to supporting intents that involve trends and their properties in line charts.

The disclosed system, also referred to herein as SlopeSeeker, detects analytical trend intents in the search queries and finds trends matching the specified quantifiable properties such as "sharp decline" and "gradual rise" in line charts.

Some implementations leverage quantified semantics of language to explore the nuances of trend patterns and their properties using natural language as the modality for expressing trend search queries.

As disclosed herein, SlopeSeeker integrates text with the search results, along with faceted browsing, to provide additional information and expressivity for navigating the search results. The disclosed system also builds upon search and natural language interface data analysis systems to support the exploration of trends with a comprehensive labeled semantic concept map of trends and their properties.

Figure 1:
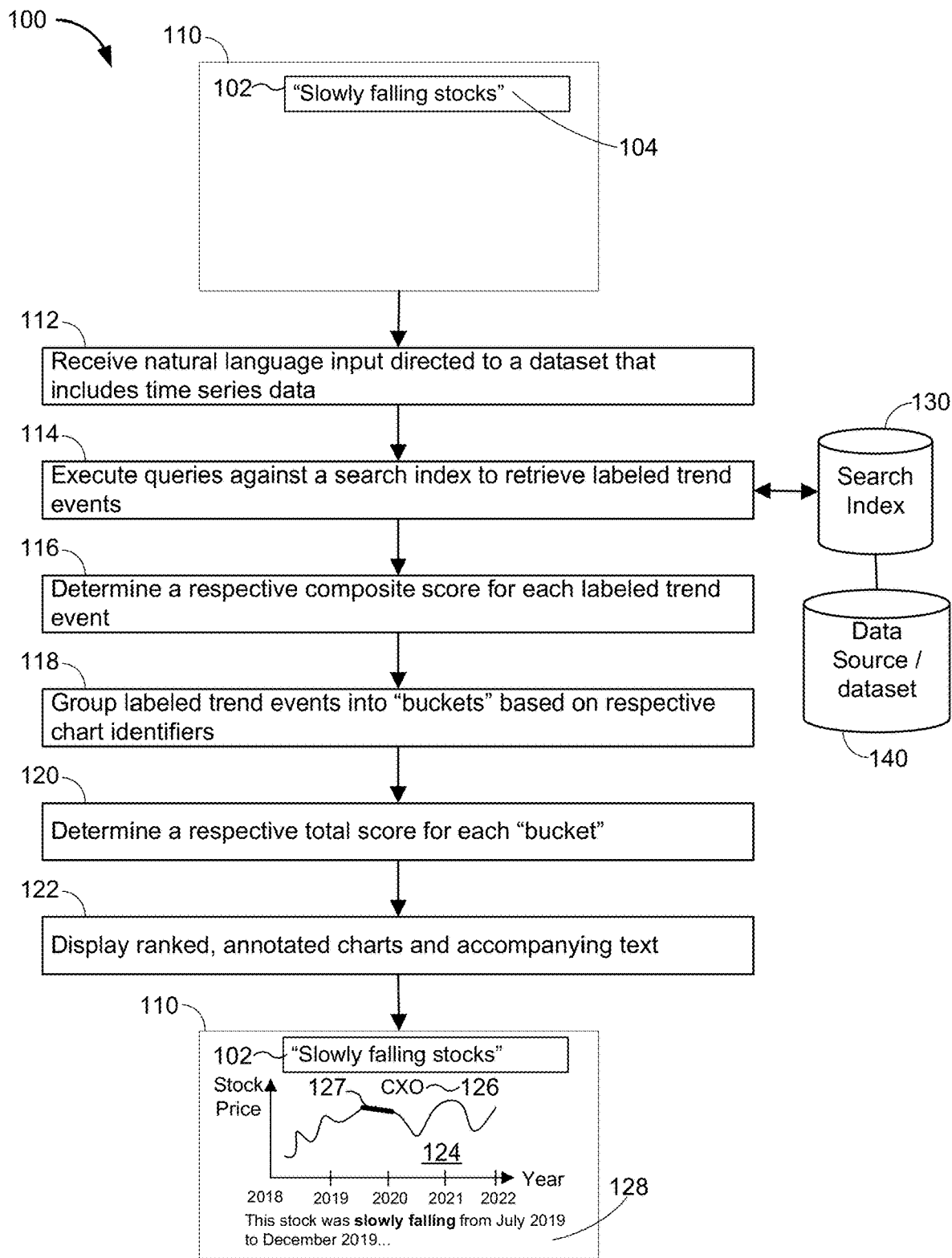
FIG. 1 illustrates an exemplary process for exploring data trends in time series data, in accordance with some implementations.

FIG. 1 illustrates an exemplary process 100 for exploring data trends in time series data, in accordance with some implementations. In some implementations, the process 100 is performed by a computing device 200 executing an application that includes a user interface. In some implementations, the process 100 is performed by a server system 300 executing a web application that includes a user interface module.

The process 100 includes receiving (112) a natural language input 104 directed to a dataset 140 that includes time series data. In some implementations, the natural language input 104 is received as text input via a search bar 102 of a user interface 110. In some implementations, the natural language input is a voice command or any other type of user input.

The process 100 includes executing (114) queries against a search index 130 to retrieve labeled trend events. The process 100 includes determining (116) a respective composite score for each labeled trend event. The process 100 includes grouping (118) the labeled trend events into "buckets" based on respective chart identifiers. The process 100 includes determining (120) a respective total score for each "bucket," and displaying (122), via the user interface 110, one or more ranked charts 124 (e.g., ranked according to the total score). In some implementations, a displayed chart 124 includes a chart identifier 126. In some implementations, the displayed chart 124 includes one or more annotations 127 corresponding to segments of the line chart whose time periods have the highest scoring matches. In some implementations, the annotated segments 127 are also visually emphasized (e.g., in a different color, or line thickness, or other visual emphasis) compared to other portions of the line chart. The chart 124 is displayed with an accompanying text snippet 128 describing up to three highest matches for the line chart. The emphasized chart segments and corresponding text snippets are interactively and bi-directionally linked. Hovering over a chart segment fades out any other emphasized segments and highlights the corresponding text in gray; hovering over a text snippet works similarly.

Figure 2A:
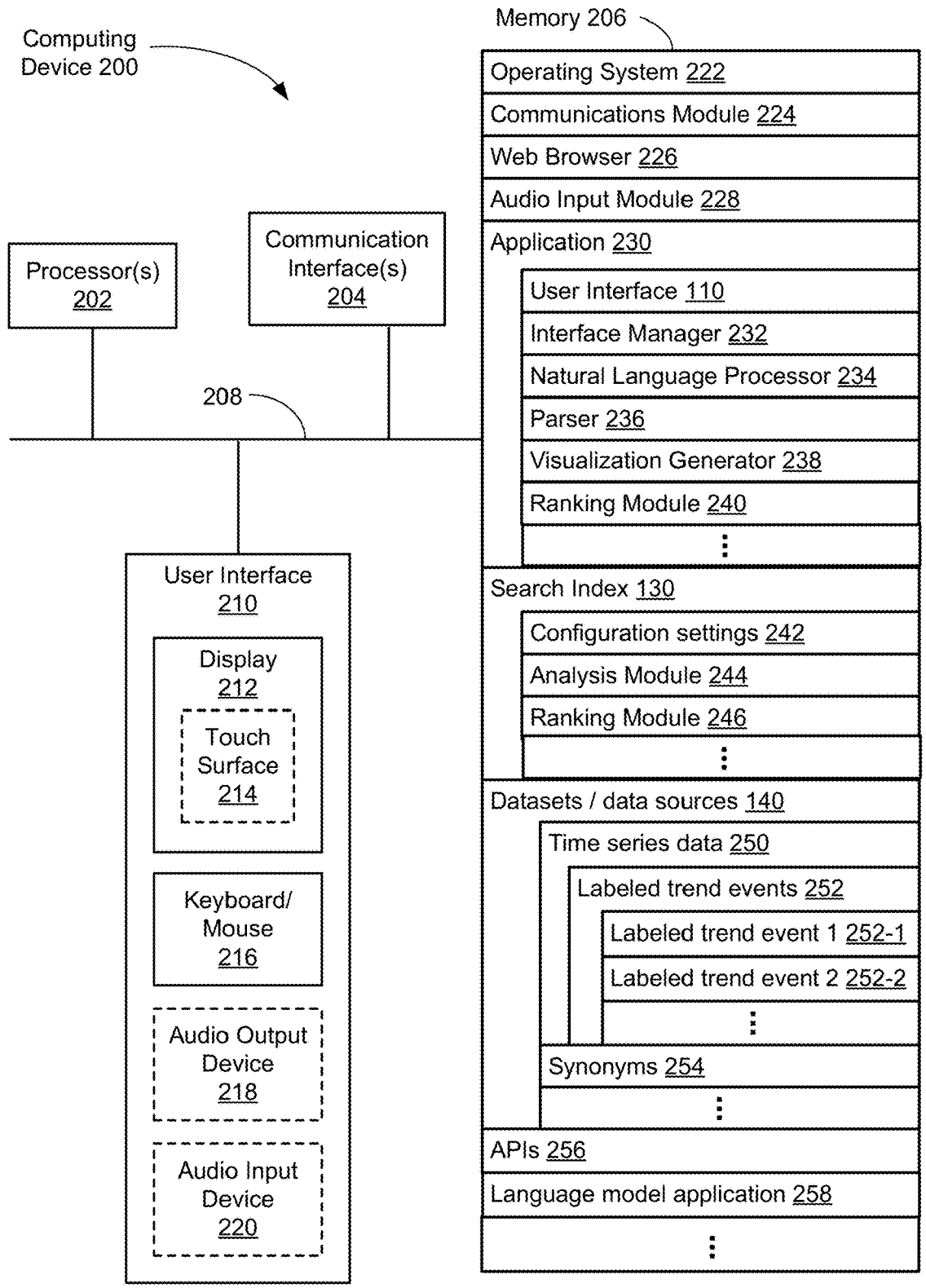
FIG. 2A provides a block diagram of a computing device, in accordance with some implementations.

FIG. 2A is a block diagram of a computing device 200, in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers (e.g., server 300) and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module), which processes audio captured by the audio input device 220. The captured audio may be sent to a remote server (e.g., a server system 300) and/or processed by an application executing on the computing device 200 (e.g., the application 230 or the natural language processor 234);
- an application 230 (e.g., SlopeSeeker). In some implementations, the application 230 includes:
  - a graphical user interface 110 (e.g., the SlopeSeeker user interface as illustrated in FIGS. 14B, 18A-18G, 19A-19D, 20A, 20B, and 21A-21I) for a user to input natural language queries and display data visualizations (e.g., charts and line plots) and text snippets in response to the natural language queries;
  - an interface manager 232 (see FIG. 14A), which receives natural language queries (e.g., via the SlopeSeeker user interface 110), passes the queries to a parser 236 (e.g., a semantic parser) (and/or a natural language processor 234) for processing, receives relevant documents from a search index 130, and generates outputs that include charts, accompanying annotations, and/or text snippets;

a natural language processor 234, which processes natural language queries;

a parser 236 (e.g., a semantic parser), as discussed below in Section V.C.;

a visualization generator 238, which generates and displays data visualizations (e.g., line charts) and accompanying annotations, and text snippets; and an optional ranking module 240, which ranks labeled trend event results returned from the search index 130. In some implementations, the ranking module 240 ranks the results based on how precisely the search term (e.g., natural language input query) matches the event labels of the document. In some implementations, the ranking module 240 ranks the results based on a visual saliency score of the labeled event.

a search index 130 (e.g., a search engine such as Elasticsearch, or other search indexing frameworks such as Solr, Sphinx, or OpenSearch), which is described in further detail in Section V.D. In some implementations, the search index 130 includes:

configuration settings 242 (e.g., configuration specifications), which define the requirements for analysis and indexing;

an analysis module 244, which processes query string tokens and retrieves the most relevant labeled events based on the degree of overlap between the set of query string tokens and the document string tokens; and a ranking module 246, which ranks labeled trend event results returned from the search index 130. In some implementations, the ranking module 246 ranks the labeled trend event results by computing a respective label score and a respective visual saliency score for each labeled trend event that was returned from the search index 130;

zero or more datasets or data sources 140, which are used by the application 230, the search index 130, and/or the language model application 258. In some implementations, the datasets/data sources 140 include time series data 250. An example of time series data is data of stock prices over time. Other examples of time series data in other domains include healthcare trends, economic data trends, and climate patterns. The time series data includes labeled trend events 252, such as a first labeled trend event 252-1 and a second labeled trend event 252-2. In some instances, the time series data 250 includes 1000, 5000, 10,000, 50,000, or 100,000 labeled trend events. FIG. 2B shows a block diagram of a labeled trend event 252-1 in accordance with some implementations. In some implementations, a labeled trend event 252-1 corresponds to a portion of a line chart and is identified by a chart ID 262-1, a start point 264-1, an end point 266-1, and set of one or more labels 268-1. In some implementations, a user selects one or more datasets/data sources 140 (which may be stored on the computing device 200 or stored remotely) and input queries are directed to the selected dataset/data sources. In some implementations, a dataset or data source 140 includes a set of synonyms for data values, data field names, and/or trend analysis labels;

APIs 256 for receiving API calls from one or more applications (e.g., a web browser 226, an application 230, a search index 130, and/or a language model application 258), translating the API calls into appropriate actions, and performing one or more actions; and a language model application 258, which executes one or more large language models (LLMs).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above. In some implementations, a subset of the programs, modules, and/or data stored in the memory 206 is stored on and/or executed by a server system 300.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to the computing device 200 may be stored or executed on a server system 300.

Figure 3:
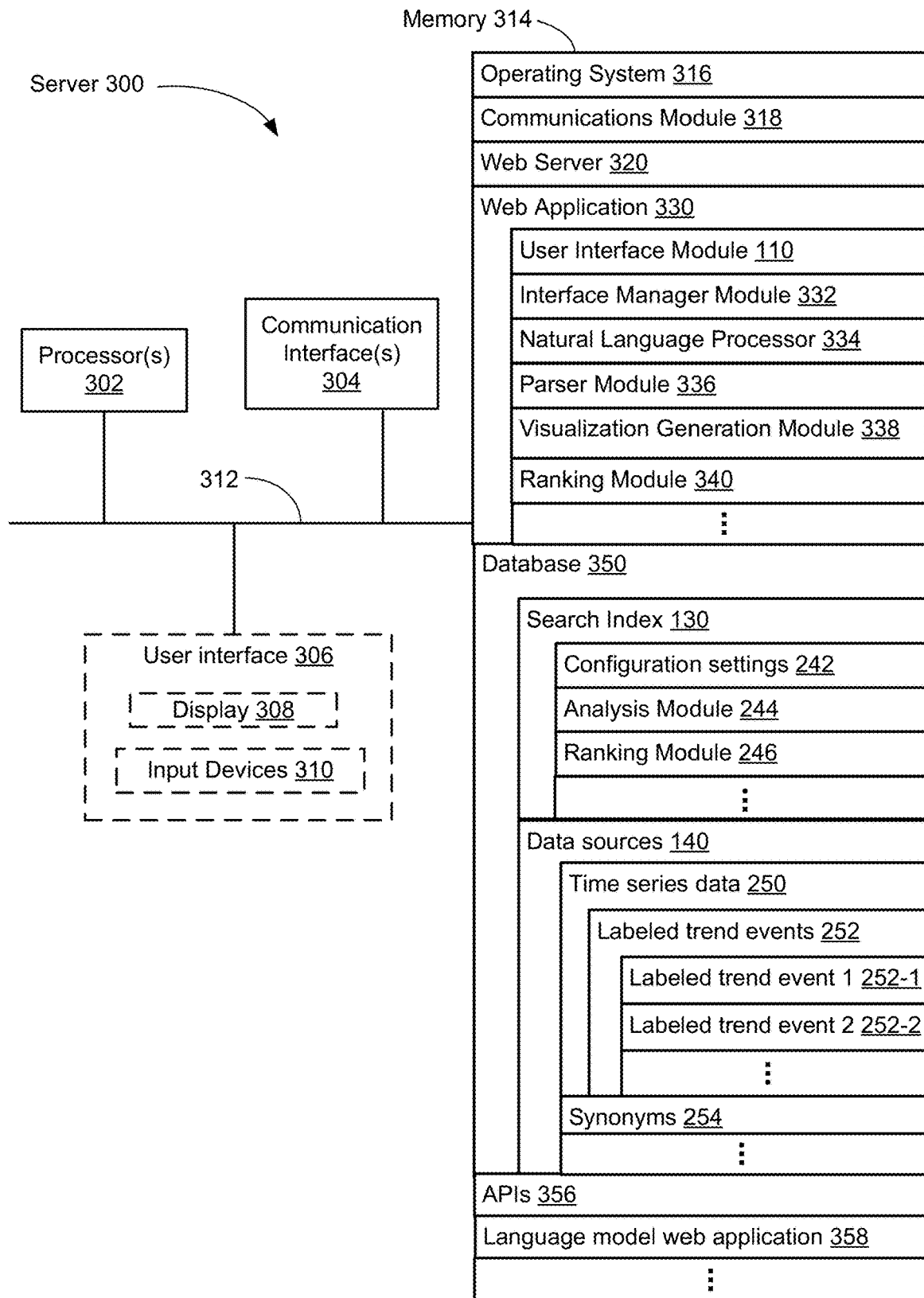
FIG. 3 provides a block diagram of a server system, in accordance with some implementations.

FIG. 3 is a block diagram of a server system 300, in accordance with some implementations. The server system 300 typically includes one or more processing units/cores (CPUs) 302, one or more network interfaces 304, memory 314, and one or more communication buses 312 for interconnecting these components. In some implementations, the server system 300 includes a user interface 306, which includes a display 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprises a non-transitory computer readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communications module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a web application 330 (e.g., the SlopeSeeker web application), which may be downloaded and executed by a web browser 226 on a user's computing device 200. In general, a web application 330 has the same functionality as a desktop application 230, but provides the flexibility of access from any device at any location with network connectivity, and does not require installation and maintenance. In some implementations, the web application 330 includes various software modules to perform certain tasks, such as:

- a user interface module 110, which provides the user interface for all aspects of the web application 330;
- an interface manager module 332, which receives natural language queries (e.g., via user interface module 110), passes the queries to a parser module 336 (and/or a natural language processor module 334) for processing, receives relevant documents from a search index 130, and generates outputs that include charts, accompanying annotations, and/or text snippets;
- a natural language processor module 334;
- a parser module 336 (e.g., a semantic parser), as discussed below with reference to Section V.C.;
- a visualization generation module 338, which generates and displays data visualizations (e.g., line charts) and accompanying annotations, and text snippets; and
- an optional ranking module 340, which has the same functionality as the optional ranking module 240.

In some implementations, the server system 300 includes a database 350. In some implementations, the database 350 includes a search index 130, which is described in FIG. 2 and Section V.D below. In some implementations, the search index 130 includes:

- configuration settings 242 (e.g., configuration specifications), which define the requirements for analysis and indexing;
- an analysis module 244, which processes query string tokens and retrieves the most relevant labeled events based on the degree of overlap between the set of query string tokens and the document string tokens; and
- a ranking module 246, which ranks labeled trend event results returned from the search index 130. In some implementations, the ranking module 246 ranks the labeled trend event results by computing a respective label score and a respective visual saliency score for each labeled trend event that was returned from the search index 130;

In some implementations, the database 350 includes zero or more datasets or data sources 140, which are used by the web application 330, the search index 130, and/or the language model web application 358. In some implementations, the datasets/data sources 140 include time series data 250. The time series data includes labeled trend events 252, such as a first labeled trend event 252-1 and a second labeled trend event 252-2, as described in FIGS. 2A and 2B. In some implementations, a data source 140 includes synonyms 254 for data values, data field names, and/or trend labels.

In some implementations, the memory stores APIs 356 for receiving API calls from one or more applications (e.g., a web server 320, a web application 330, a search index 130, and/or a language model web application 358), translating the API calls into appropriate actions, and performing one or more actions.

In some implementations, the memory 314 stores a language model web application 358 that executes one or more LLMs.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

I. Crowdsourcing a Dataset of Text Labels with Visual Features

Relevant language describing visual features in charts can be useful for authoring captions and summaries about the charts to help with readers' takeaways. To better understand the interplay between concepts that describe visual features and the semantic relationships among those concepts (e.g., "steep increase" versus "gradual rise"), the inventors conducted a crowdsourced study to collect labels and visual feature pairs for univariate line charts. The motivation for crowdsourcing a labeled dataset of terms and visual features is two-fold: (1) capture semantic descriptions of different visual features in univariate line charts and (2) elucidate and quantify the relationships among those semantic descriptions.

Figure 4:
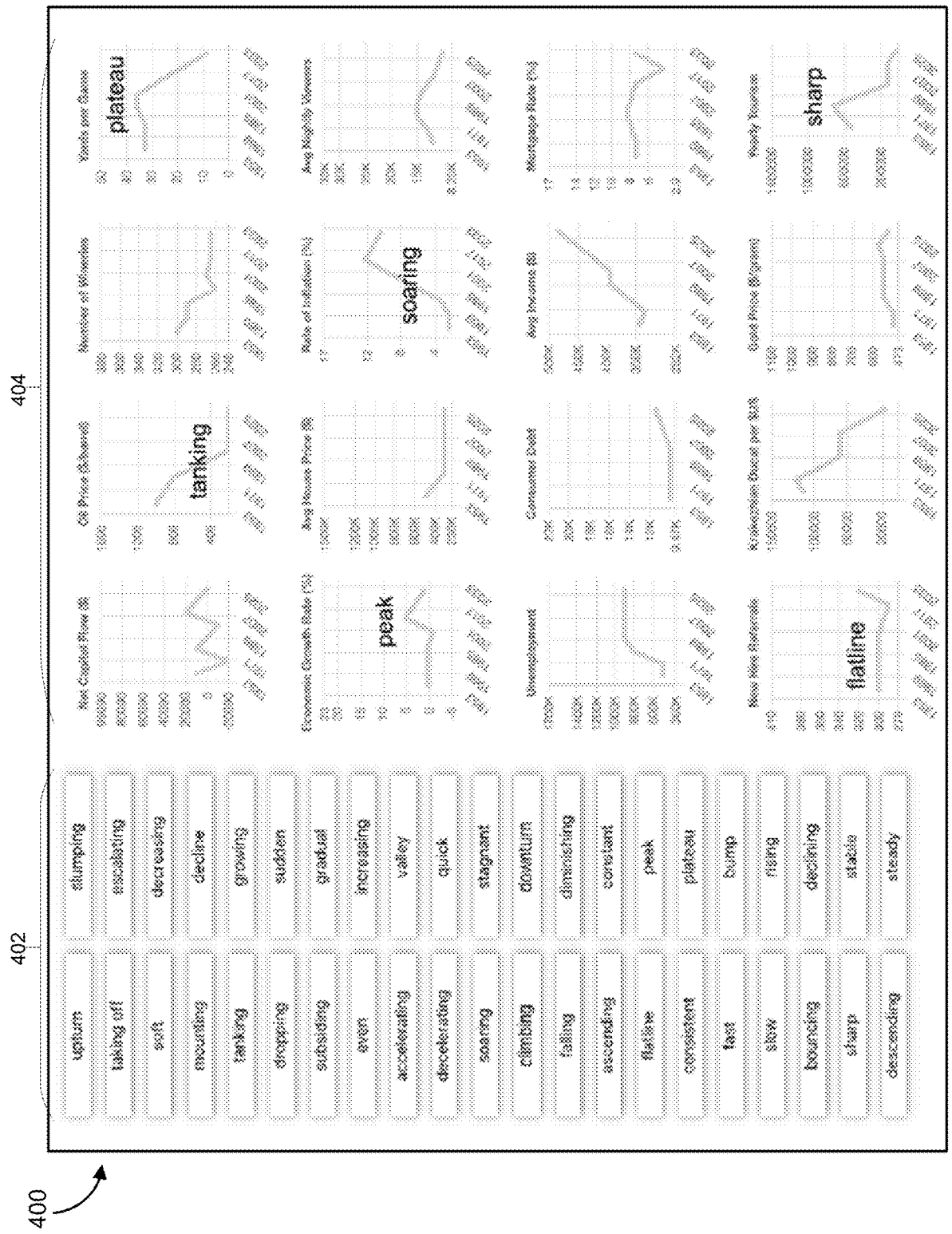
FIG. 4 illustrates an annotation-collection tool interface 400 for performing the crowdsourced study, in accordance with some implementations.

FIG. 4 illustrates an annotation-collection tool interface 400 for performing the crowdsourced study, in accordance with some implementations. The tool interface 400 was implemented as a Typescript frontend and a Django backend attached to a PostgreSQL database, and includes a left portion 402 and a right portion 404.

The left portion 402 of the interface 400 comprises 42 word labels consisting of: (i) words related to the basic shape descriptors, 'up,' 'down,' and 'flat,' (ii) adjectives that describe such shapes (e.g., 'slow,' 'rapid,') and (iii) words that describe the emergent shapes created by such regions (e.g., 'plateau' or 'valley'). To find these word descriptors, the inventors leveraged the hierarchy of hypernyms and hyponyms from Wordnet, whose depth typically ranges up or down to two hierarchical levels (e.g., "up"→['increasing', 'ascending']), as well as word2vec to identify related concepts such as "sharp" and "increasing." In total, the list contained 8 nouns, 13 adjectives, and 21 verbs. While this list is not exhaustive, the inventors considered the set of words as a starting point for collecting nuanced language that describes common features found in line charts. The words were displayed in a randomized order in the interface for each participant to avoid positional bias.

The right portion 404 of the interface 400 displays 16 line charts shown in random order to each participant to mitigate any positional bias. The same charts were shown to all participants. The charts were generated in Chart.JS, showing years on the x-axis, ranging from 1960 to 2030. The title and its corresponding y-axis range were randomly assigned from one of the following topics: Average Income ($), Unemployment, Yards per Game, New Hire Referrals, Yearly Tourism, Rate of Inflation (%), Average House Price ($), Krakozhian Ducats per $US, Average Nightly Viewers, Economic Growth Rate (%), Gold Price ($/gram), Oil Price ($/barrel), Consumer Debt, Number of Wineries, Mortgage Rate (%), and Net Capital Flow ($). Each chart is a line graph constructed by connecting seven sequential line segments end to end. Each segment is randomly assigned one of nine different slopes: Up, Down, Flat with slopes [1, −1, 0], SteepUp, SteepDown, SteepFlat with slopes [3, −3, 0], Gentle Up, Gentle Down, Gentle Flat with slopes [0.5, −0.5, 0].

For the study, participants drag words from the left portion 402 over to visual features of the charts on the right portion 404. The words are snapped to the nearest chart position. Words may be moved or deleted once they are attached to a chart. Individual words may be used on multiple charts and multiple times on a single chart. Multiple words can be dragged to the same feature in a chart. The chart identifier, the annotation, the position along the line graph where the annotation occurred, the date the annotation occurred, and a unique anonymous participant identifier were recorded.

The data collected was analyzed by determining "term co-occurrence" and "annotation clustering," with the goal of discovering quantifiable relationships among the different annotation terms. Annotation co-occurrence enables one to understand how often different annotation terms are used to label the same visual feature. For each annotation, the co-occurrence of every other word is calculated as the average of per-segment % representation. For example, consider two segments that contain the annotation "quick." If the term "fast" represents 50% of the annotations on the first segment and 30% of the annotations on the second segment, then the overall co-occurrence of "fast" with respect to "quick" is (50%+30%)/2=40%. Note that co-occurrence is not symmetric as "quick" may co-occur with different annotations than "fast."

Annotations are clustered using hierarchical clustering and Ward's linkage calculated with Euclidean distance. These approaches tend to identify dense clusters while making a minimum number of assumptions about cluster size, shape, and count. Position matrix entries are assigned by segment co-occurrence. For example, if 'quick' and 'fast' co-occurred 10 times, then each would have the position on the other's axis. The matrix is then scaled so all values are in [0,1], and values of 1.0 are placed along the diagonal.

Figure 5:
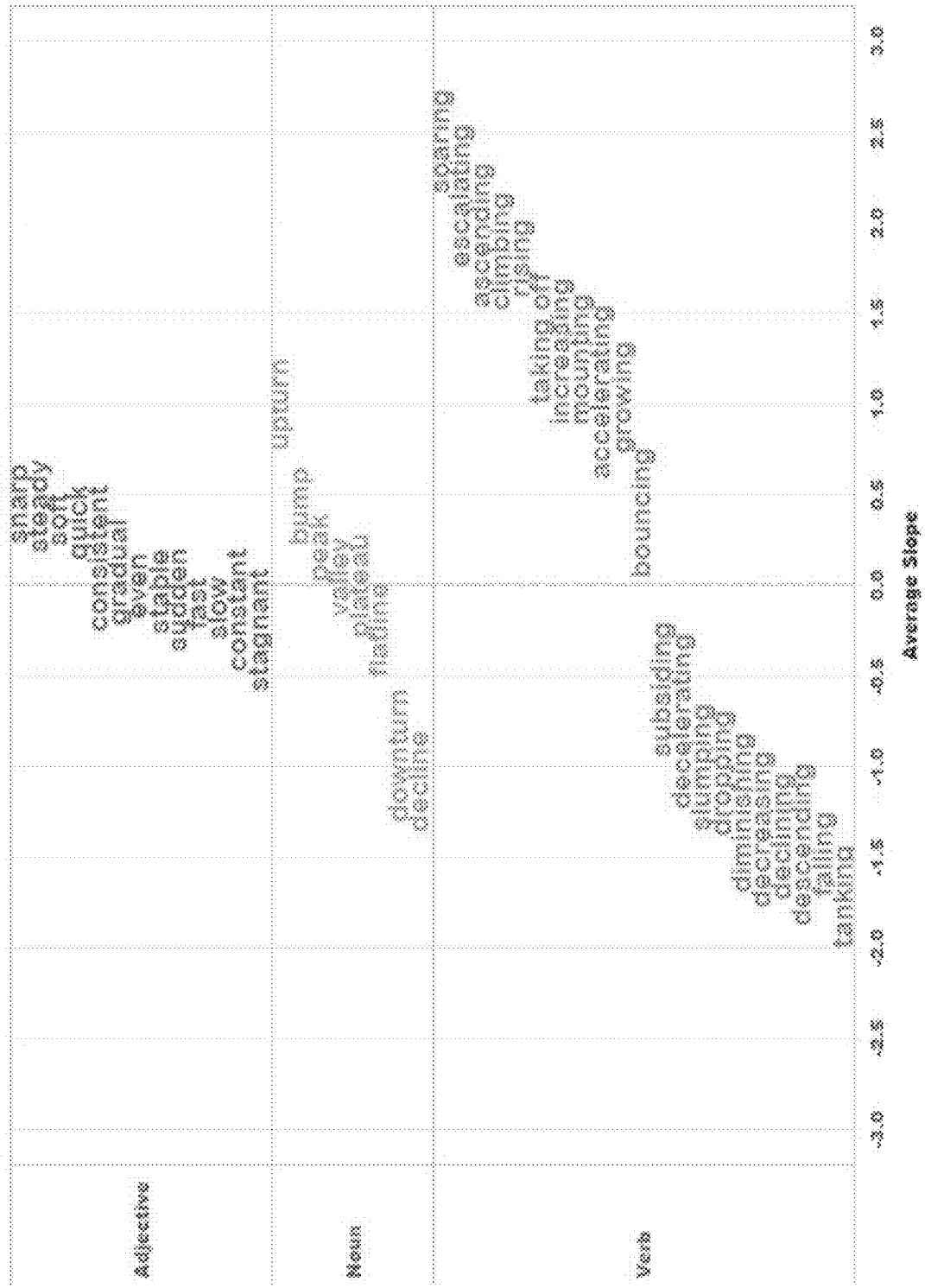
FIG. 5 illustrates various inter-word relationships and an average slope of annotations determined from a crowdsourced study, in accordance with some implementations.

FIG. 5 illustrates various inter-word relationships and an average slope of annotations determined from the crowd-sourced study, in accordance with some implementations.

Term co-occurrence analysis quantifies which words are typically present together. Agglomerative hierarchical clustering of term co-occurrence results in distinct groups, suggesting a high degree of semantic agreement among participants.

One of the goals of this work is to understand the hierarchical semantics of the visual feature/annotation pairs. Using line slope as a fundamental component of signal shape, the inventors analyzed the average slope associated with each annotation. As shown in FIG. 5, slope analysis distributed the various annotation words across a broad continuum from steeply descending to steeply ascending. Not only does this suggest an empirically derived semantic hierarchy (e.g., "soaring" is a steeper increase than "taking off" while "tanking" is a steeper drop-off than "slumping") the quantification of that hierarchy enables one to make concrete natural language recommendations when generating labels for previously unlabeled signals. The maximum possible slope range available for the charts is −3 to +3.

II. Automatic Labeling of Visual Features in Line Charts

Some implementations disclose two techniques-shape identification and slope identification—for automatic labeling of visual chart features according to the dataset of terms and visual features obtained from the crowdsourced study (see Section above). In some implementations, shape identification is useful for discovering concrete shapes such as "peak" and "valley." In some implementations, slope identification is useful for describing how univariate data changes along the y-axis.

In this discussion, a univariate data set is referred to as a "signal" and the small annotated source signal whose shape the disclosed algorithm is looking for in a larger unlabeled signal is referred to as the "kernel."

Figure 6:
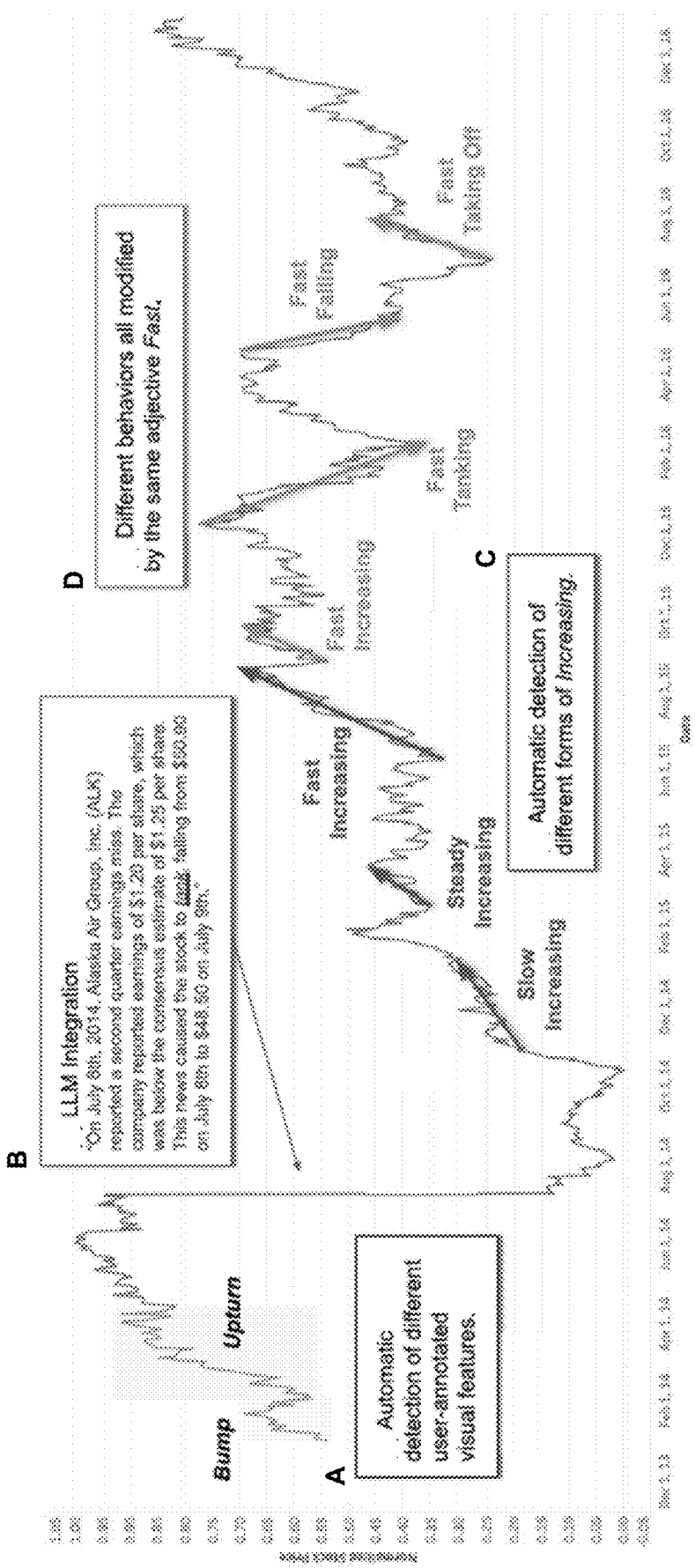
FIG. 6 illustrates automatic labeling of visual features in a line chart, in accordance with some implementations.

Shape identification tries to find a participant-annotated visual feature in a larger unlabeled signal. FIG. 6 illustrates automatic labeling of visual features in a line chart, in accordance with some implementations. FIG. 6 part A shows an example of finding a "bump" and an "upturn," in accordance with some implementations. This shape identification approach is particularly applicable to finding visual features that are constructed from multiple segments (e.g., a "peak" consists of a rising segment followed by a falling segment).

In some implementations, a shape discovery algorithm for identifying a kernel signal's shape within a larger unlabeled signal includes the steps of:

1. Begin with an unlabeled signal in which it is likely to find a visual feature.
2. Collect all 112 (16 line plots*7 segments/plot) annotatable segments and the annotations associated with them.
3. For each segment, build a five-segment kernel signal consisting of the annotated segment and two segments on each side of that annotated segment. Note that kernels near the edge may consist of fewer than five segments. For each such kernel signal, create shallow and deep variants of it where the normalized variant heights range from [0.1,1.0] in units of 0.1.
4. For each variant, perform normalization, smoothing, and take the first derivative. Employ standard Savitzky-Golay smoothing with a smoothing factor proportional to the kernel size for efficient smoothing and derivation.
5. Normalize the unlabeled signal and apply Savitzky-Golay smoothing and derivation.
6. Calculate a windowed-mean-absolute-error (MAE) by sliding the kernel past the unlabeled signal, much like convolution. The window size is parameterizable to allow the algorithm to search for visual features of different sizes.
7. Accrue these errors for every variant of every kernel.

8. For every kernel, calculate MAE z-scores.
9. Filter the stored MAE scores using two user-adjustable sensitivity criteria: the maximum acceptable MAE score and the maximum acceptable z-score. Retain any point that falls below either threshold.
10. Mark points that meet the criteria threshold. The presence of points indicates that a visual feature is found in the chart.
11. Merge adjacent qualifying points into larger annotated regions In addition to the least-errors shape identification approach taken above, the quantified slope semantics shown in FIG. 5 provide an additional tool for visual feature identification. Specifically, the quantified slope semantics help identify specific relationships among line slope, hedge words, and the hedge word's semantic modifiers. For example, FIG. 5 shows a rough hierarchy of single-word slope descriptions from which one might decide to label a line as "soaring" rather than "growing." However, if verb annotations and their adjective modifiers are considered as a single unit that encodes line-slope information, it becomes much more precise. For example, "taking off" in the context of "gradual" has an average slope of only 0.7, but "taking off" in the context of "quick" has a much steeper average slope of 2.7. Using this information along with word co-occurrence data for the specific <adjective><verb> pairs, the different regions of the analyzed signals can be annotated. This is illustrated in FIG. 6 at parts C and D.

In some implementations, selecting an <adjective><verb> annotation for a given chart region uses the following protocol:
1. Determine the slope of a given region using Ramer-Douglas-Peuker piecewise-linear decomposition.
2. Find all <adjective><verb> pairs whose average slope falls within a window (default=0.5) of the desired slope.
3. From that set, select the <adjective><verb> pair with the highest annotation co-occurrence. The window in step 2 allows one to use annotation co-occurrence to select more commonly used expressions like "fast tanking" instead of "stagnant accelerating."

One of the goals of this work is to quantify relationships between visual features and annotations. FIG. 5, FIG. 6 part C, and FIG. 6 part D show that these terms do, in fact, work together to encode specific slope information that can be used to automatically annotate a univariate signal. Among terms, annotation clustering shows that terms tend to cluster in semantically intuitive ways. Collectively, these findings support the hypothesis that quantitative analysis of semantic labels is capable of generating visual feature labels that are not only human-accessible but also quantitatively accurate. Providing language descriptors for accurately describing data insights can provide useful "guard rails" and guidance as data summary generation becomes prevalent with the use of large language models (LLMs).

III. Visual Feature Integration with LLMs

Some implementations combine the discovered semantic labels discussed above with additional information from the data set to form LLM queries. For example, some instances use a specific stock symbol "ALK" and the dates of the discovered visual feature to ask the GPT 3.5 LLM the templated question, "What happened between <Jul. 8, 2014> and <Jul. 9, 2014> that caused the stock symbol <ALK> to <tank>?"

In this example, the specific LLM response is shown in FIG. 6 part B. An interesting aspect of LLM integration is that the responses implicitly integrate additional data into the user's investigation. For example, no data involving share price, earnings reports, or even the company name is explicitly linked to the chart.

The models do have limitations around higher-order numeric reasoning and context. For example, in FIG. 6 part B, while the LLM provided several reasons for the stock price decline, it missed the key fact that there was a stock split. Custom-trained GPT models can potentially bridge this gap in higher-order analytical reasoning by incorporating additional knowledge. In addition to summary generation, other utilities for these custom LLMs can explore the automatic enrichment of additional descriptors for the dataset.

In some implementations, annotations and summaries describing visual features in charts can be used as metadata in search interfaces to find pre-authored charts based on search queries such as, "find me the sales chart that has a spike in 2009, followed by a gradual decline," or in a voice assistant to ask for real-time notifications about data-"Hey Voice Assistant, tell me if this stock tanks." The work can also provide language prompts to LLMs to support sketching interfaces used for generating data stories.

IV. Creation and Utilization of Quantified Semantic Label Dataset for Trends

To support an expressive analytical experience for exploring relevant trends in a time series dataset, having a quantifiable understanding of the semantics of the trends is useful. For example, while describing a stock price as "slumping" intuitively corresponds to a less severe decline than "crashing," quantifying the nuanced differences between these terms enable visual data analysis tools to more easily leverage the words' expressive power.

Some implementations disclose creating a dataset of quantified semantic labels for trend descriptor words, which are in turn used in conjunction with a search index to return precise search results to an analyst.

Crowdsourced experiments were conducted to create the dataset of trend descriptors with quantified semantics. These experiments were designed to collect trend labels associated with precise, isolated slopes. Various trend descriptor types were treated differently with slight modifications to the experimental design depending on whether the data collection is for singleton slope labels (e.g., "falling"), slope labels with modifiers ("fast falling"), or multi-line trend shapes (e.g., "peak").

The crowdsourced dataset was subsequently operationalized by applying new trend descriptor labels to unlabeled time series data—in this case, stock prices over time.

Some implementations apply a novel visual saliency scoring algorithm to the labeled stock data to help boost perceptually prominent trend descriptor results during search. The final stock data with labeled trends was subsequently used to populate the search index for the Slope-Seeker tool.

IV.A. Quantified Semantic Label Dataset Collection & Analysis

The inventors designed and conducted three crowdsourced experiments (referred to hereinafter as Experiment 1, Experiment 2, and Experiment 3) to collect a dataset of quantified semantics for trend descriptor words. The details of the experiments are described in U.S. Provisional Patent Application No. 63/543,070, filed Oct. 7, 2023, titled "Search Tool for Exploring Quantifiable Trends in Line Charts," which is incorporated by reference herein in its entirety.

Briefly, the goal of Experiment 1 was to estimate a slope distribution for every label, where each label is a single trend descriptor word. The goal of Experiment 2 was to assess the impact of modifier adverbs on the quantified semantics of two-word trend descriptor phrases (e.g., "falling slowly"). The goal of Experiment 3 was to gather labels for different shapes found in time series data. For Experiment 3, a shape is defined as a pair of connected line segments with varying degrees of (1) inclination angle between the two lines and (2) overall 360° rotation or orientation.

Figure 7A:
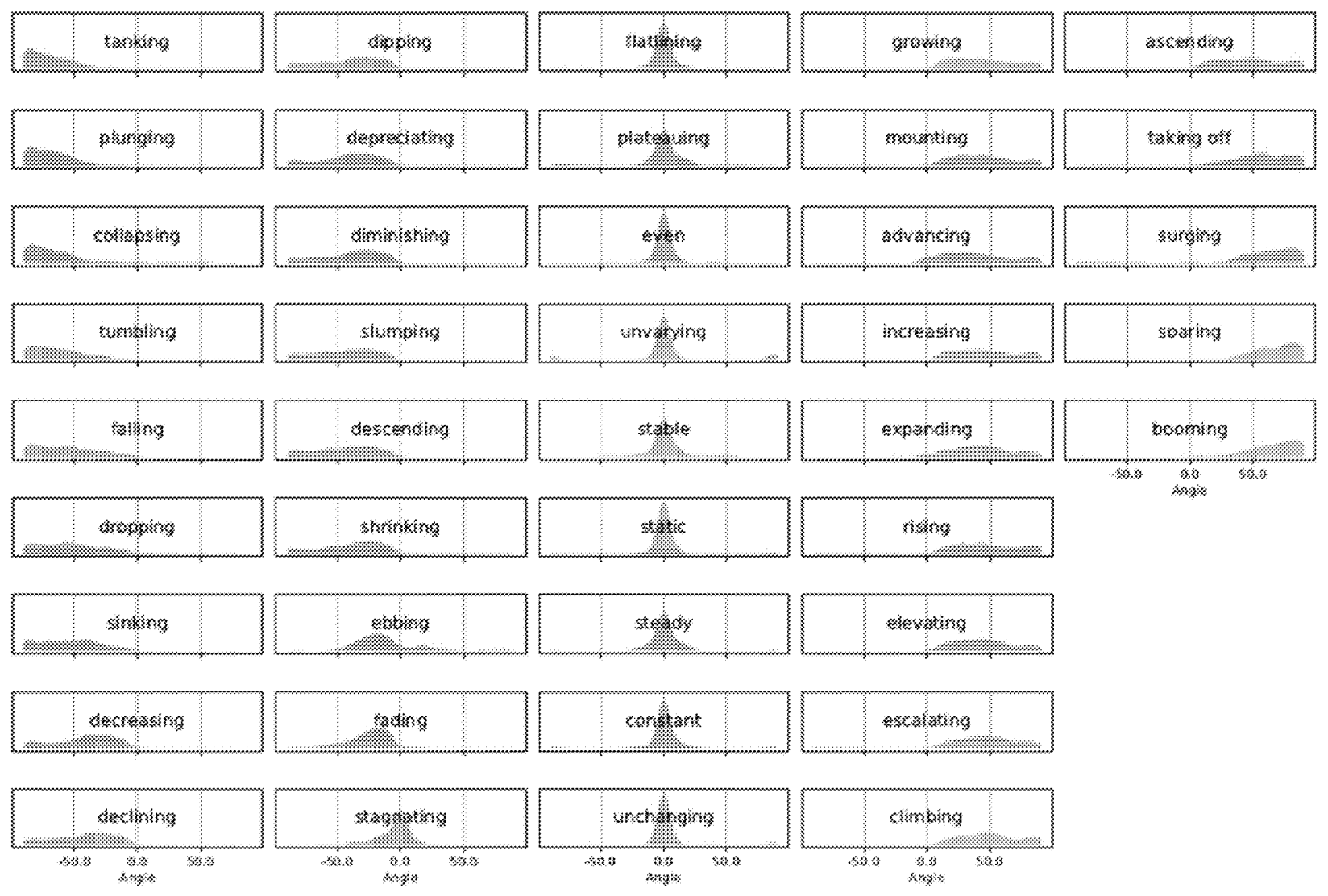
Figure 7B:
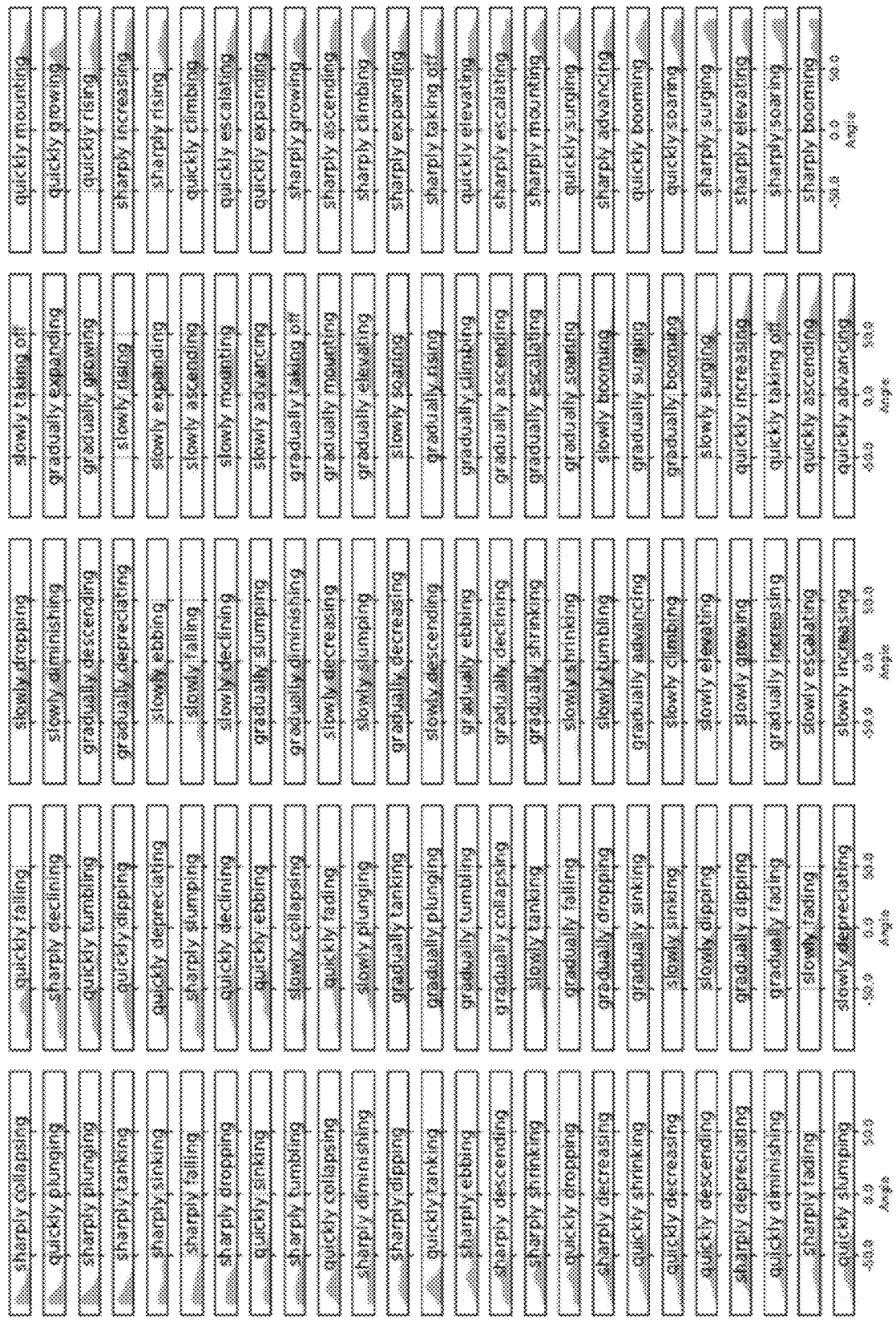
Figure 7C:
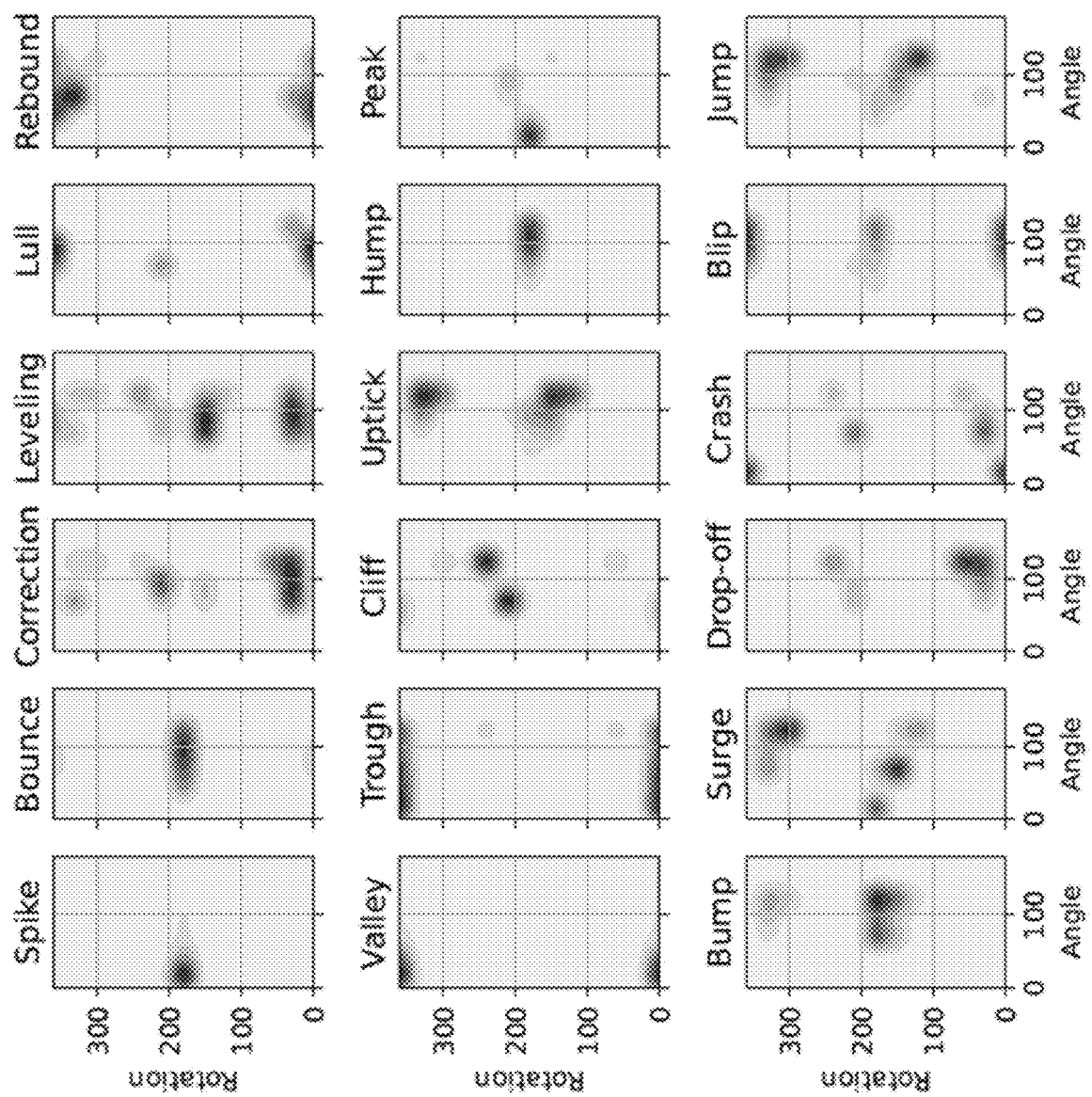

FIGS. 7A, 7B, and 7C show the results of the crowd-sourced experiments.

FIG. 7A shows the 41 labels that were investigated in Experiment 1 and, for each label, a one-dimensional Kernel Density Estimation (KDE) indicating a probability density for the respective label over the range of −90° to 90°. Peak probability density was used to sort the labels from the most negative angle (steepest down) to the most positive angle (steepest up) from the top left to the bottom right, respectively.

KDE is a common tool for estimating the probability density function of a random variable without making assumptions about the nature of the distribution (e.g., that it is normal). As such, KDE is a useful tool for estimating the slope distributions for each label. Gaussian kernels are a common choice for smoothing KDE datapoints as the shape is symmetric, it has well-understood mathematical properties, and, notably, the 'bandwidth' KDE parameter can be interpreted as the Gaussian standard deviation.

FIG. 7B shows the KDE distributions of Experiment 2's compound labels over the range of −90° to 90°. Peak probability density was used to sort the labels from the most negative angle (steepest down) to the most positive angle (steepest up) from the top left to the bottom right, respectively.

Experiment 2 also enabled the overall scaling effect each modifier adverb had on each label's associated angle to be computed. For example, consider a crowdsourced data point from a single participant in Experiment 2 indicating that the "anchor" angle associated with the label "dropping" is approximately −48°. A subsequent Experiment 2 data point from the same participant indicates that the angle associated with the compound label "sharply dropping" is −88°. In this case, the scalar effect of the modifier "sharply" is calculated to be −88/−48=1.8. The slope difference between "dropping" and "sharply dropping" can thus be quantified: "sharply dropping" is 1.8 times steeper than simply "dropping" for this participant. As shown in FIG. 7B, in general, "slowly" reduces slope steepness by a factor of 0.4, "gradually" reduces slope steepness by a factor of 0.6, and "quickly" and "sharply" increase slope steepness by factors of 1.3 and 1.5, respectively.

FIG. 7C shows respective two-dimensional KDE plots for shape labels that were investigated in Experiment 3.

IV.B. Quantifying Semantic Relationships

The Cambridge Dictionary defines synonym, hyponym, and hypernym as:

Synonym: "a word or phrase that has the same or almost the same meaning as another word or phrase in the same language"

Hyponym: "a word whose meaning is included in the meaning of another words"

Hypernym: "a word whose meaning includes a group of other words"

These definitions lead to the notion of a semantic hierarchy. Consider the data shown in FIG. 8, which is a scatter plot showing implicit semantic hierarchies. The x-axis shows the angle range to which the label has been assigned by experiment participants and the y-axis indicates the width of the inter-quantile range (IQR) of the label angle distributions. Labels with a broader "definition" (applicable to more angle ranges) are at the top and labels with narrower "definitions" are at the bottom. Stated another way, each label is represented by the inter-quantile range (IQR) (the middle 50% of its probability density) of its angle assignments.

Figure 8:
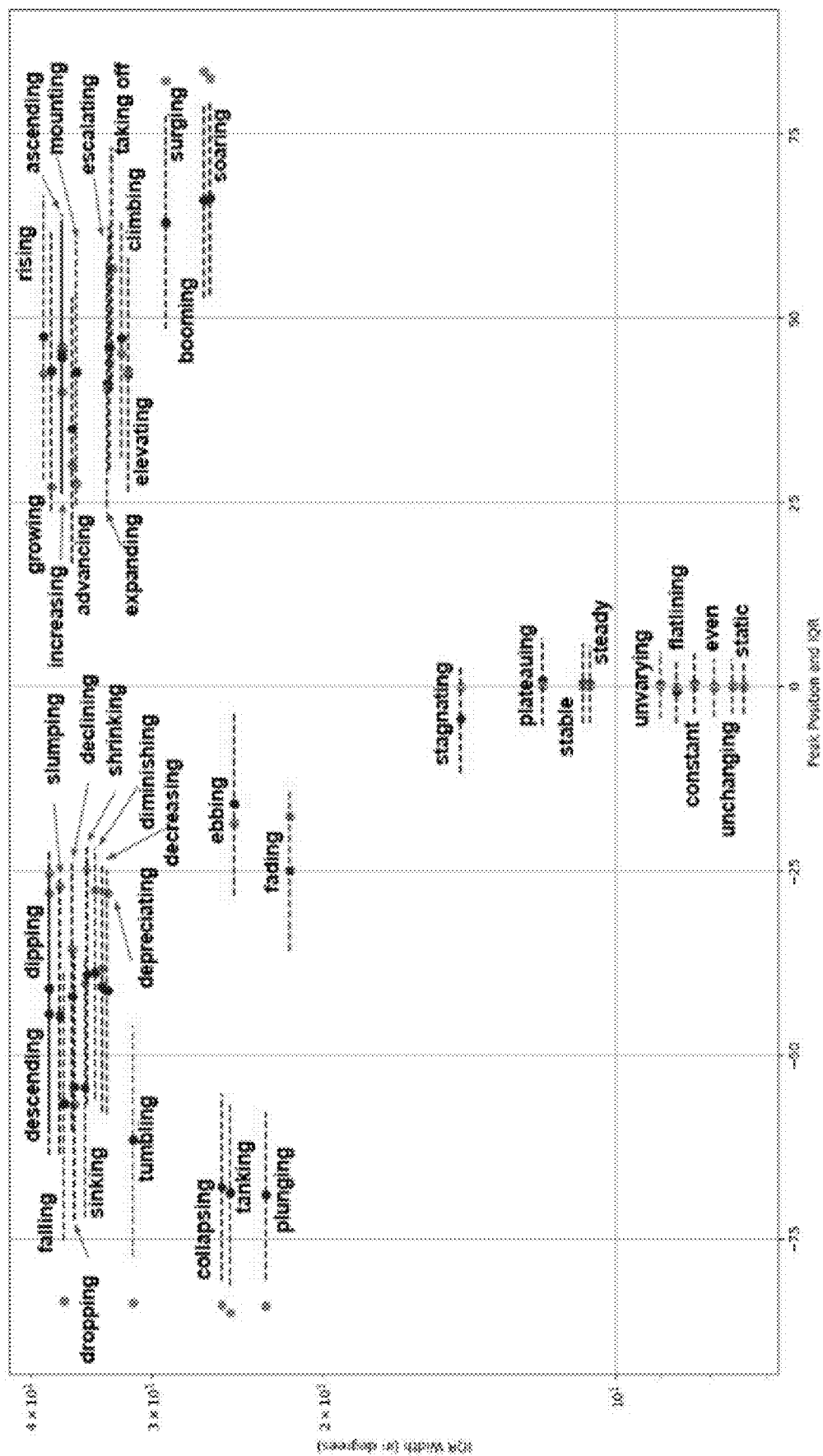
FIG. 8 illustrates a scatter plot showing implicit semantic hierarchies, in accordance with some implementations.

Taking the data in FIG. 8 and the definitions of above, semantic relationships can be derived in the following manner:

Synonym: Two words are synonyms if their distributions (or by proxy, their IQRs) are approximately the same.

Hyponym: A word is a hyponym of another word if its IQR is subsumed by the other word's IQR.

Hypernym: A word is a hypernym of another word if its IQR subsumes the other word's IQR IV.C. Labeling Events in Time-Series Data In some implementations, after establishing the KDE distributions for both slope labels and shape labels, these distributions are used to label new time series data represented as raw, univariate input signals. Temporal stock price data is used as an exemplary dataset, and relevant portions of temporal stock price data are annotated with labels such as "sharply climbing" and "cliff."

An exemplary algorithm for label assignment is as follows: decompose the input signal into linear segments, calculate angles and rotations over those segments, use those angles and rotations to index into the KDEs from Experiments 1, 2, and 3, and discover appropriate labels.

Before executing the steps of the algorithm, the x and y axes of the temporal stock data need to be normalized to roughly the same scale. Otherwise, the angle and rotation calculations would be meaningless. There is no "correct" mathematical relationship or shared scale to be established between the stock price in dollars (or any other non-temporal measure) (e.g., y-axis) and time (e.g., x-axis). To resolve this, two observations were made:

(1) The quality of "steepness" is, to a large degree, perceptual and anchored to both the time range that is analyzed and the size and shape of the chart. For example, a multi-month sea level drop viewed over one year might be perceived as "gradual," but that same drop viewed over 1000 years on a chart of the same size would be perceived as "sudden".

(2) Participants labeled angles in a user interface with an aspect ratio of 1:1, meaning that the visual space was "square."

With these observations in mind, the input signal was transformed in two ways before data analysis. First, both the x-axis and the y-axis were normalized to span the range [0.0, 1.0]. Second, both axes were scaled by the aspect ratio of the final labeled chart (e.g., 3:1 in the case of this study). This approach provided data with axis units that were comparable (important for proper slope calculation), informed by the viewer's chart presentation, and respectful of the participant's original aspect ratio while performing labeling.

Following the axis normalization, temporal stretches of data are identified and labeled. First, the input signal was decomposed into consecutive linear segments using the Ramer-Douglas-Peucker algorithm (e.g., as implemented in the rdp python package (https://pypi.org/project/rdp/). Epsilon values for the Douglas et al. algorithm were empirically chosen as 0.03, 0.1, and 0.2 to provide three different decomposition resolutions.

For single-segment temporal stretches, the slope of the segment was calculated, and used to index into all the single-label (Experiment 1) or compound-label (Experiment 2) one-dimensional KDEs. The label whose KDE returned the highest probability density was chosen as the label for that segment. Because the KDE models are a continuous surface (e.g., one-dimensional for Experiments 1 and 2, and two-dimensional for Experiment 3) and use Gaussian kernels, which have infinite support, a non-zero probability density will be returned for all points on the real line. Thus, any point-even a point that is far away from all labels and should not be assigned a label-will always return a non-zero probability density score, resulting in some (possibly inappropriate) label. To resolve this, labels with the lowest scores were filtered out by taking the set of all segment labels (one label per segment), sorting them by their probability density, and filtering out the bottom 25%. The remaining 75% of labels were used for the SlopeSeeker database (e.g., in the database 350).

Figure 9:
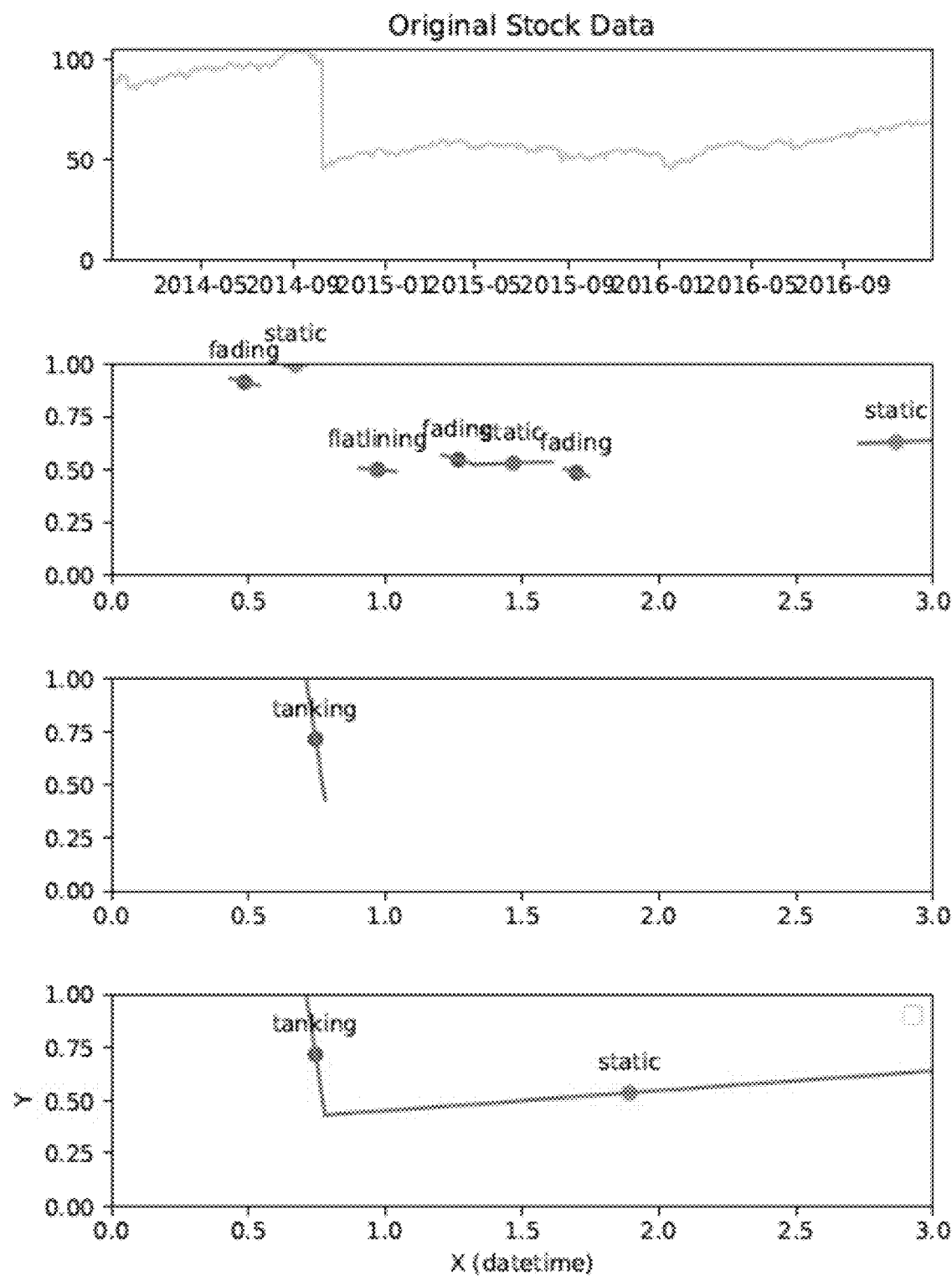
FIG. 9 illustrates examples of segment labeling with single labels, in accordance with some implementations.

FIG. 9 illustrates examples of segment labeling with single labels, in accordance with some implementations. The three sub-charts correspond to the three levels of linearization. For clarity, only the top 25% of labels are shown in this example.

Figure 10:
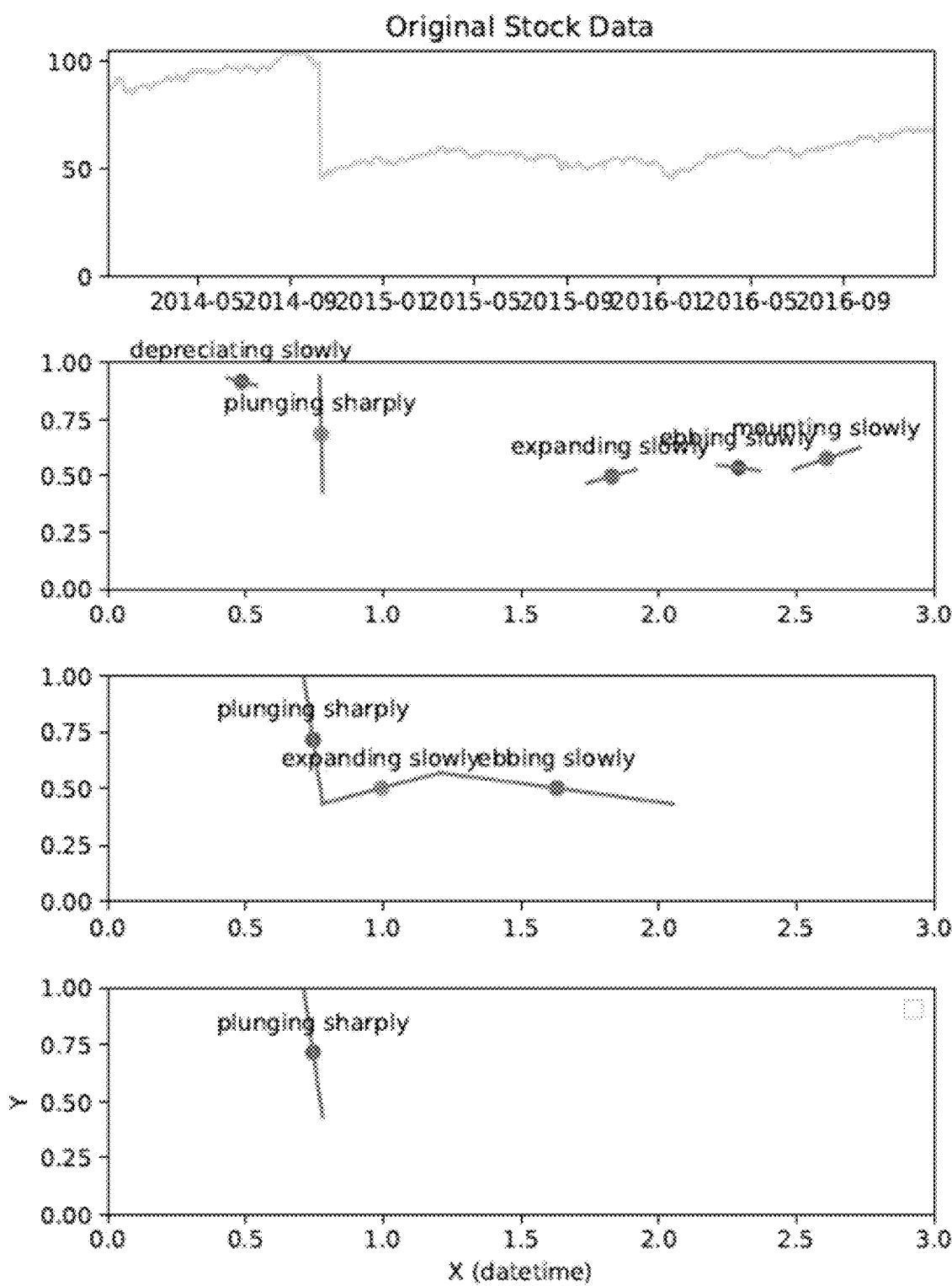
FIG. 10 illustrates examples of segment labeling with compound labels, in accordance with some implementations.

FIG. 10 illustrates examples of segment labeling with compound labels, in accordance with some implementations. The three sub-charts correspond to the three levels of linearization. For clarity, only the top 25% of labels are shown in this example.

A similar process was adopted for two-segment (shape) temporal stretches. The angle and rotation of each shape was first calculated, and then used index into all the 2D label (Experiment 3) KDEs. The label whose KDE returned the highest probability density was chosen as the label for that shape. The set of all shape labels (one label per shape) are sorted by their probability density, and the top 75% of labels are used for the SlopeSeeker database.

Figure 11:
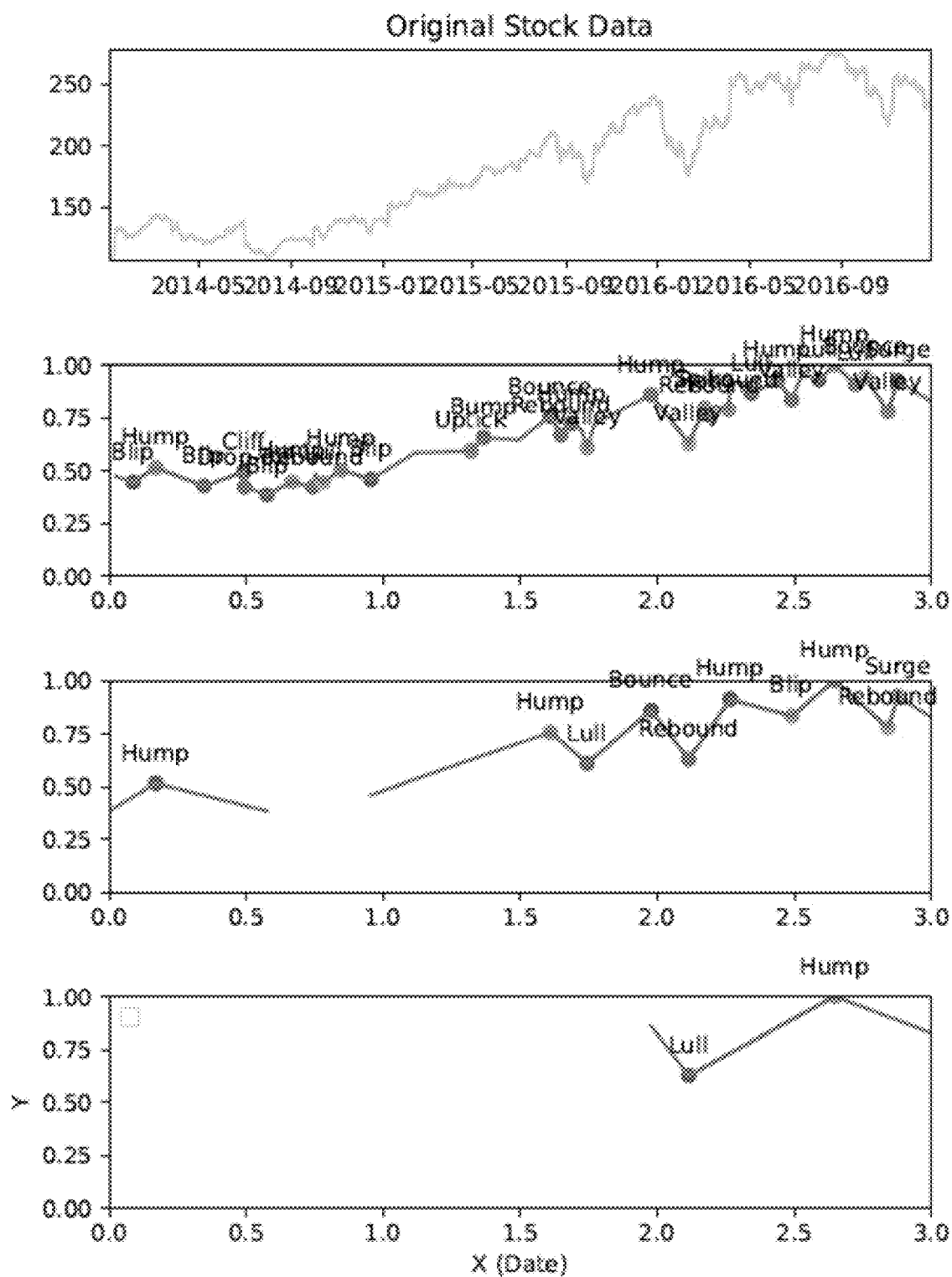
FIG. 11 illustrates examples of shape labeling, in accordance with some implementations.

FIG. 11 illustrates examples of shape labeling, in accordance with some implementations. The three sub-charts correspond to the three levels of linearization. For clarity, only the top 25% of labels are shown in this example.

Figure 12:
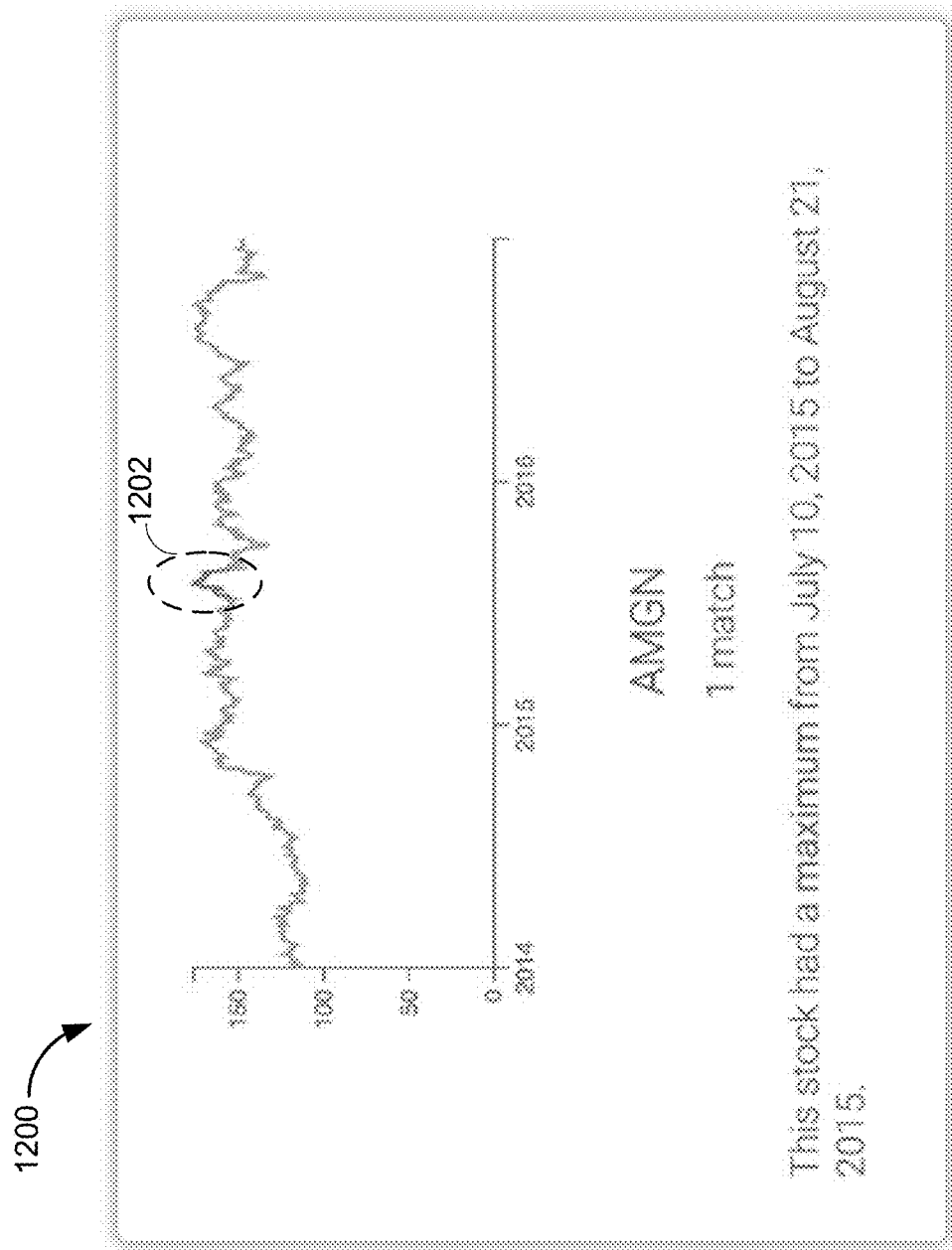
FIG. 12 shows a line chart that is output by the SlopeSeeker system in response to a user query that includes a superlative descriptor, in accordance with some implementations.

Superlatives. In some instances, a user may use superlative descriptors (e.g., "maximum", "minimum", "highest point", etc.) to search for particular features in line charts. With such descriptors, the user evidently wants to retrieve the single highest or lowest value throughout the time frame of the data. In some implementations, to support the querying of superlative features in the dataset, applicable superlative labels are generated. Using the time-series data of stock prices as an example, for each stock, the highest and lowest values are identified over the length of the time series data. Then, the event consisting of 15 days both before and after the maximum or minimum is incorporated into the event label to facilitate ease of viewing, as illustrated in FIG. 12. FIG. 12 shows a line chart 1200 that is output by the SlopeSeeker system in response to a user query (e.g., maximum stock price") that includes a superlative descriptor "maximum," in accordance with some implementations. Segment 1202 of the chart corresponds to the event where the stock price was the highest.

IV.D. Visual Saliency Scoring

Line chart annotations that emphasize the most visually prominent features of the chart are more effective at helping readers glean meaningful takeaways. To operationalize this concept during search, a way to quantify the visual saliency of each labeled trend event within its chart was established. Otherwise, it would be difficult to identify the most relevant results for a given search query when several matching results could have the same labels based on slope.

Figure 13:
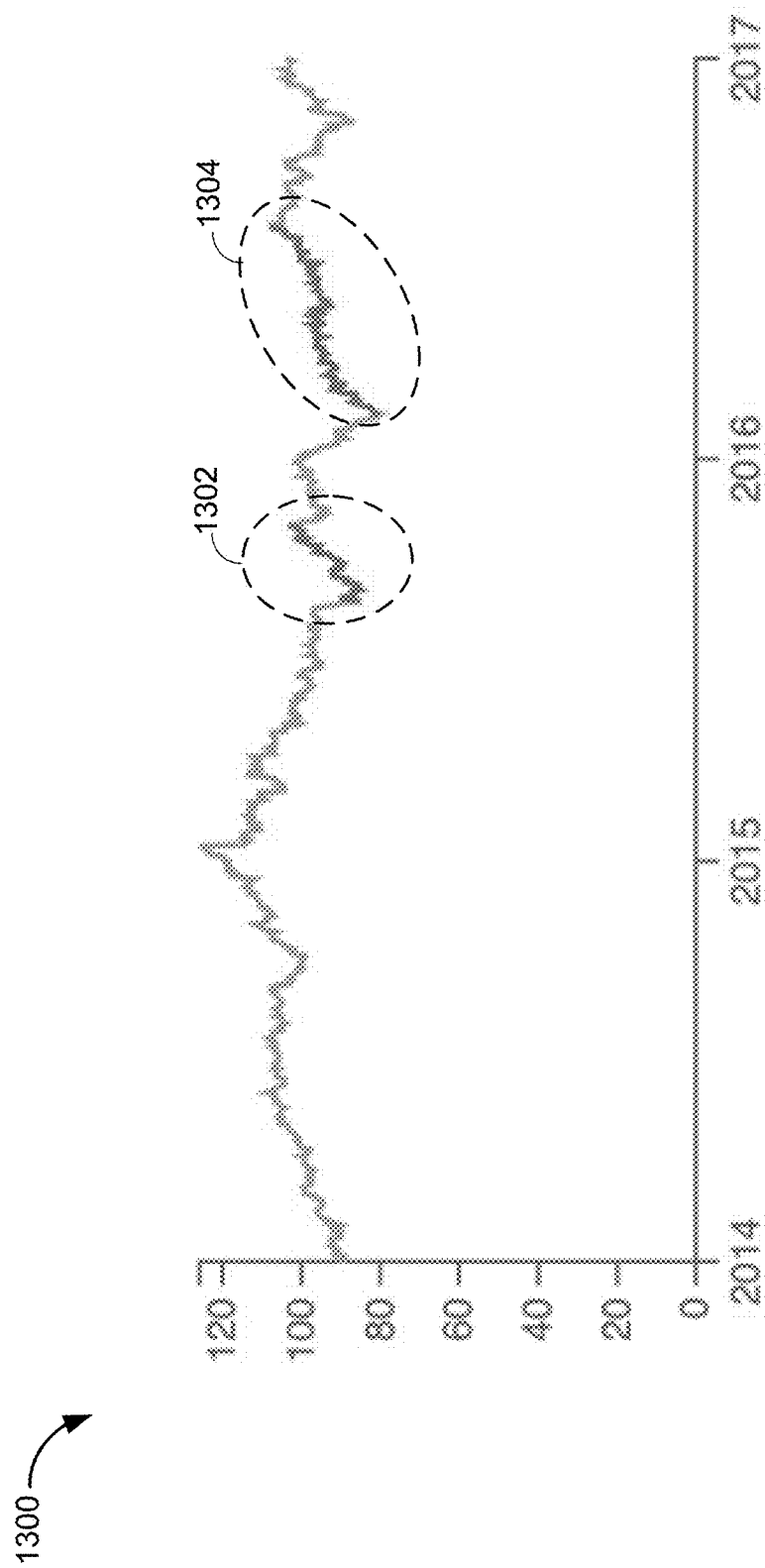
FIG. 13 shows a line chart that is output by the SlopeSeeker system in response to a user query that includes the terms "gradually increasing," in accordance with some implementations.

Consider the example of FIG. 13, which shows a line chart 1300 that is output by the SlopeSeeker system in response to a user query that includes the terms "gradually increasing." Although both segment 1302 and segment 1304 of the chart correspond to events that match the user query (e.g., based on slope), the event that occurred during 2016 (i.e., corresponding to segment 1304) intuitively appears more prominent and impactful than the event in 2015 (segment 1302).

The rationale behind the visual saliency scoring approach is to view each trend event as a vector that covers some of the encompassing chart's visual space in both the x direction (i.e., the temporal duration of the trend) and in the y direction (i.e., the data value delta over the course of the trend).

In some implementations, an exemplary algorithm for computing visual saliency is as follows:

for each trend result (single-segment slopes): do
    Compute the x vector component as the ratio of the entire time range taken up by the trend.
    Compute the y vector component as the ratio of the entire data value range taken up by the trend.
    Take these two vector components and use the Pythagorean theorem to compute the L2 norm.
end for In some implementations, the visual saliency is determined using Equation 1 below:

$$\text{Visual Saliency Score} = \sqrt{\left(\frac{x_{event_{end}} - x_{event_{start}}}{x_{chart_{max}} - x_{chart_{min}}}\right)^2 + \left(\frac{y_{event_{end}} - y_{event_{start}}}{y_{chart_{max}} - y_{chart_{min}}}\right)^2} \quad (1)$$

Intuitively, trends described by words like "tanking" will mostly be short in x, in which case the most visually salient results will have the largest change in y. On the other hand, trends described by words like "flatline" are likely to have little change in y, and so their visual salience will mostly depend on the duration in x. However, an intuitive correspondence between trend labels and their visual span in x or y does not need to hold for the scoring to provide a useful quantification of visual saliency. Consider again the two events in FIG. 13, both labeled as "gradually increasing." The event during 2016 is longer temporally (i.e., $x_{event_{end}} - x_{event_{start}}$ is greater) and spans a larger value range (i.e., $y_{event_{end}} - y_{event_{start}}$ is greater), therefore giving it a higher saliency score.

For multi-segment shapes, we compute the y vector component using the maximum and minimum values of y over the duration of the shape event rather than the start and end values. More precisely, we use, $y_{event_{max}} - y_{event_{min}}$ in Equation (1) above rather than, $y_{event_{end}} - y_{event_{start}}$.

In with some implementations,

The final labeled stock data that was loaded into the protype SlopeSeeker tool contains 8,353 data points (labeled events) for 100 different stocks. The time period for each stock is a three-year period from the start of 2014 to the end of 2016, and each labeled event covers some subset of this time span.

Although the example is described with respect to stock data, it will be apparent to one of ordinary skill in the art that the processes to create labeled events as disclosed herein are equally applicable to time-series data in other domains such as healthcare (e.g., Covid cases over time), economic data trends (e.g., employment rates or unemployment rates over time), and climate patterns.

V. SlopeSeeker Tool

According to some implementations of the present disclosure, the SlopeSeeker system is developed as a search tool to operationalize the dataset of quantified semantic trend labels (e.g., as discussed in Section IV).

V.A. Architecture Overview

Figure 14A:
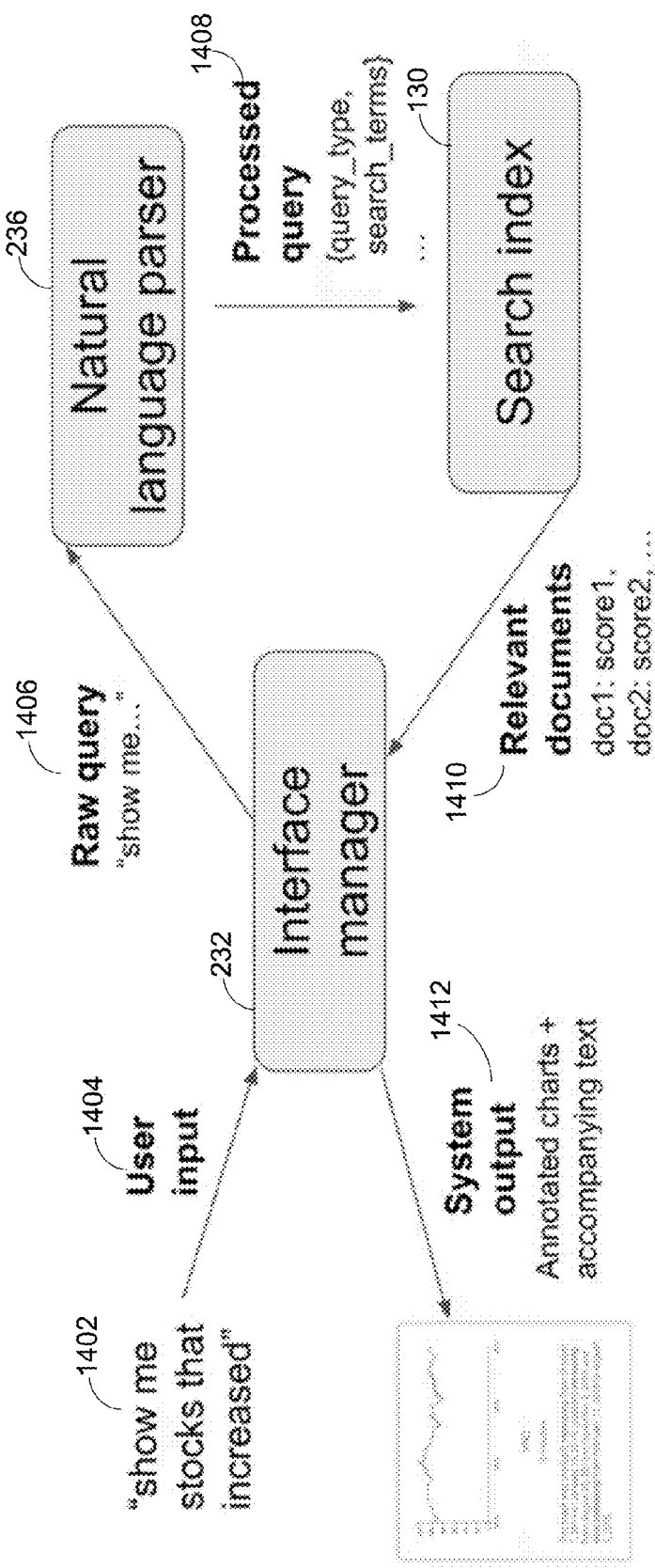
FIG. 14A illustrates the SlopeSeeker system architecture, in accordance with some implementations.

FIG. 14A illustrates the SlopeSeeker system architecture, in accordance with some implementations. After the user enters a query 1402, the input 1404 is passed to an interface manager 232, which in turn passes the raw query 1406 to a natural language parser 236. The query is then processed (1408) and the processed search terms are used to write queries to a search index 130 (e.g., an Elasticsearch index or other search indexing frameworks such as Solr, Sphinx, or OpenSearch). The search index 130 returns relevant "documents" 1410 (and their respective scores) to the interface manager 232, which generates the system output 1412 of charts and accompanying annotations. A "document" as used herein refers to a labeled trend event.

In some implementations, the SlopeSeeker system is implemented as a web-based application using Python and a Flask backend connected to a React.js frontend. For data storage and retrieval, Elasticsearch, a robust distributed search platform built on the open-source Apache Lucene, is employed. The platform offers scalability of data, real-time indexing for fast querying, and is adept at handling text-heavy and diverse datasets. In some implementations, a RESTful API is employed for easy integration with SlopeSeeker.

V.B. Interface

Figure 14B:
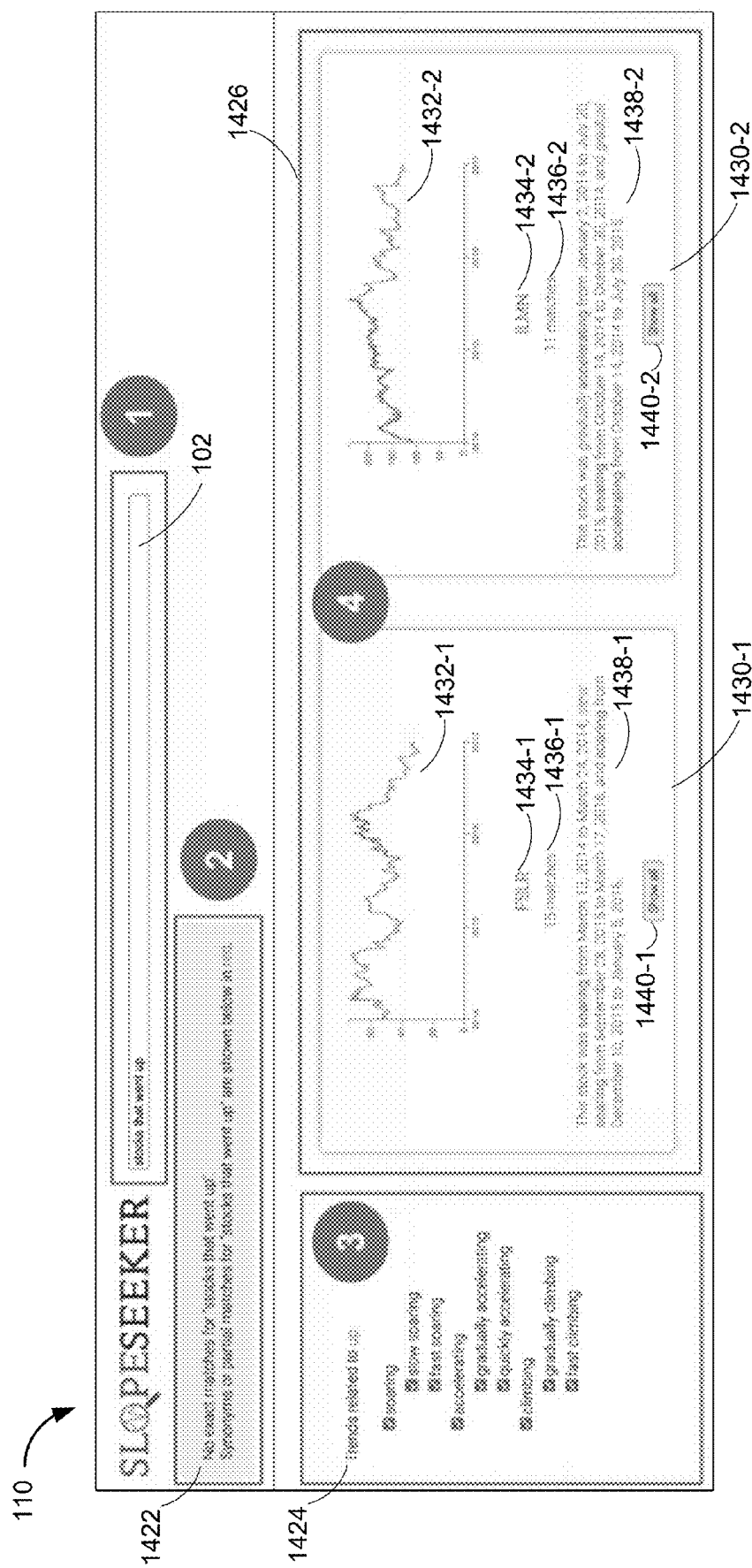
FIG. 14B illustrates a user interface for the SlopeSeeker system, in accordance with some implementations.

FIG. 14B illustrates a user interface 110 for the SlopeSeeker system, in accordance with some implementations. The user interface 110 is designed to provide an experience similar to that of using a search engine. On startup, the user is presented with a search bar 102 (e.g., a natural language input box) (also labeled as "1" in FIG. 14B), enabling the user to search for a trend of interest. When results are not exact matches to the user input, a notification box 1422 (labeled as "2" in FIG. 14B) informs the user which terms are not being matched exactly. The user interface 110 includes a side bar 1424 (labeled as "3" in FIG. 14B) that allows the user to optionally filter the results to include only specific labels that are of interest. The text box filter in the side bar 1404 is nested hierarchically by individual semantic concepts. For instance, "soaring" is a parent of both "slow soaring" and "fast soaring." Results appear as tiles 1430 (e.g., tile 1430-1 and tile 1430-2) in a region 1426 below the search bar 102 (labeled as "4" in FIG. 14B). Each tile 1430 corresponds to one stock and shows a line chart 1432 of the stock price over time (e.g., line chart 1432-1 for the stock FSLR and line chart 1432-2 for the stock ILMN), the stock ticker 1434, the number of matches 1436 for that input query for that stock, and a text description 1438 (e.g., text snippet) describing up to three highest matches for that stock. The time periods corresponding to those highest scoring matches are also emphasized in a different color on the line chart. The emphasized chart segments and corresponding text snippets are interactively and bi-directionally linked. Hovering over a chart segment will fade out any other emphasized segments and will highlight the corresponding text in gray; hovering over a text snippet works similarly. If a stock has more than three matches, the user can expand the tile (e.g., via selection of user-selectable affordance 1440) to show a list of the rest of the matches, which can also be hovered over to display on the line chart.

V.C. Semantic Parser

Given the premise of SlopeSeeker is to demonstrate the utility of the quantified semantic trends dataset in the context of a search tool, the present disclosure describes examples that focus on supporting the interpretation of queries to search for trends within an exemplary dataset that includes labeled trend events for stock data. It will be apparent to one of ordinary skill in the art that the processes to create labeled events as disclosed herein are equally applicable to time-series data in other domains.

In some implementations, the SlopeSeeker system includes a semantic parser (e.g., parser 236 or parser module 336) for parsing trends that contain semantic labels, attributes, and temporal filter attributes. The semantic parser converts natural language inputs into structured representations, allowing for explicit reasoning, reduced ambiguity, and consistent interpretation. The semantic parser also provides the convenience of better traceability and are performant for structured tasks. In some implementations, the semantic parser is combined with one or more large language models (LLMs) (e.g., LLM(s) 258 or LLM(s) 358). In some implementations, in the combined semantic parser/LLM setup, the semantic parser is used for structured tasks and the LLMs are used for open-ended tasks in the context of a more comprehensive analytics tool.

In some implementations, the semantic parser is implemented using Python's open-source NLP library, SpaCy, which employs compositional semantics to identify tokens and phrases based on their semantics to create a valid parse tree from the input search query. The semantic parser takes as input the individual tokens in the query and assigns semantic roles to these tokens. The semantic roles are one of four categories: (1) event_type (e.g., single event or multi-sequence event), (2) trend_terms (e.g., "tanking" and "plateau"), (3) attr (e.g., data attributes, data fields, or data field names, such as stock ticker symbols and company names), and (4) date range (e.g., absolute date ranges and relative data ranges).

In some implementations, the tokens and their corresponding semantic roles are translated into a machine-interpretable form that can be processed to retrieve relevant search results in SlopeSeeker. Using an input search query "Show me when Alaska Airlines was tanking before November 2016" as an example, the parser output is as follows:

```
{
    'event\_type': 'single',
    'trend\_terms': ['tanking'],
    'attr': 'alaska airlines',
    'date\_range': {'lt': '2016 Nov. 1'} #"before November 2016"
}
```

V.D. Search Framework

After producing the labeled data for the stock prices (see discussion above), each labeled trend event (considered a "document" for the search scenario disclosed herein) is added to the search index, wherein indexed documents are first retrieved and then ranked according to a match score. In some implementations, the search index 130 (e.g., Elasticsearch) includes built-in scoring logic that is combined with a visual saliency score to produce a scoring mechanism tailored to the use case described herein. Finally, matching documents are grouped by their parent chart for presentation to a user (e.g., as tiles 1430 in the user interface 110).

In some implementations, SlopeSeeker supports different types of queries beyond single trend events, including event sequences and more long-term, and global descriptors.

V.D.1. Indexing

The indexing phase creates indices for each of the documents in a dataset along with their metadata. Each document (i.e., a labeled event, corresponding to a portion of a line chart identified by a chart ID, start point, end point, and set of labels) is represented as a document vector $d_i$ where:

$$\mathcal{D} = \{d_1, d_2, \ldots, d_n\}$$

In some implementations, n-gram string tokens are stored from these document vectors to support both partial (e.g., inexact) matches and exact matches at search time:

$$\mathcal{S} = \{s_1, s_2, \ldots, s_n\}$$

where $s_i = \varepsilon(d_i)$ for an encoding function $\varepsilon$ that converts each document vector into a collection of string tokens.

In some implementations, the search index 130 performs synonym and edge n-gram processing according to specification in the search index settings.

In some implementations, the search index 130 is configured to retrieve labeled trend events based on exact and partial (e.g., inexact) matches between the query tokens and the labeled data. A retrieved labeled trend event can be an exact match to at least one token (e.g., a user types "tanking" and a matching document would contain that word) or an inexact match to at least one token. An inexact match occurs when a search result is returned as a result of support for synonyms or edge n-gram matches.

An example of a synonym match is when a user types in the word "plummeting" and no labeled event contains that word "plummeting," but at least one labeled event contains the word "tanking," and the specification for the search index settings has specified that "plummeting" and "tanking" are synonyms.

An edge n-gram match occurs when the user only partially types in a search term and the search index can guess what the user means based on these first few letters. For instance, if the user types "dro", the search index would return documents that contain "dropping".

The original vectors D and encoded tokens S are stored in the semantic search engine index by specifying the mapping of the content, which defines the type and format of the fields in the index. The "content" refers to the raw event label for each document. For example, a label for an event could be "tanking." The "mapping" specifies how the content will be processed and interpreted by the search index 130 for storage as fields in the index. "Fields" are different ways of storing copies of documents' data in the search index 130 so that documents can be retrieved in various ways. The "type" (e.g., text type) and "format" of each field determines how it is stored and how documents can later be matched to search queries. For instance, a synonym field can take the label of "tanking" and map it to the synonym "plummeting" based on synonym specifications (e.g., specified in the search index settings), allowing this same document to be retrieved by user searches for either "tanking" or "plummeting." As another example, an edge n-gram field can take the same label of "tanking" and map it to shortened substrings of that label, such as 'tan', so that searching these sub-strings will also retrieve that document.

In other words, each semantic trend label and its associated stock data are stored as tokens in the search index in multiple processed formats (i.e., in different fields), enabling fast and flexible retrieval at search time. This indexing enables full-text search on the labels in the index, supporting exact-value search, fuzzy matching to handle typos and spelling variations, and n-grams for multi-word label matching. A scoring algorithm, tokenizers, and filters are specified as part of the search index settings. These settings specify how the matched documents are scored with respect to the input query, as well as the handling of tokens, including the conversion of tokens to lowercase and the addition of synonyms from a thesaurus.

FIG. 15 shows a code snippet for a search index configuration, in accordance with some implementations. The scripted similarity in the search index configuration defines a custom scoring mechanism for ranking search results based on term frequency (tf), inverse document frequency (idf), and normalization. The search index configuration also incorporates synonym expansion and edge n-grams for more flexible and comprehensive search results. A synonym file "synonyms_final.txt" is used to expand or replace terms.

The contents of the synonym file are illustrated in FIGS. 17A and 17B, in accordance with some implementations. Using the first line of FIG. 17A as an example, the term "subsiding" has synonyms "lessening," "lessen," "relaxing," "easing," and "abating." Thus, in some implementations, a natural language query that includes the term "subsiding" would cause the search index to return the same set of labeled trend events as another natural language query that includes the term "easing."

FIG. 16 illustrates a code snippet for defining the properties of fields within an index mapping in the search index, in accordance with some implementations.

V.D.2. Search (Individual Documents)

The search phase can be conceptualized as having two steps-retrieval and ranking. For retrieval, consider a user input query q that is represented as a query vector q with query tokens $q_1, q_2, \ldots, q_j$. $\hat{q}$ is encoded into string tokens using the same encoding function $\varepsilon$ from indexing, such that $\hat{s} = \varepsilon(\hat{q})$. The search retrieval process then returns the most relevant r document vectors $\mathcal{R} = \{d_1, d_2, \ldots, d_r\}$ based on the degree of overlap between the set of query string tokens $\hat{s}$ and the document string tokens in $\mathcal{S}$. As used herein, the "degree of overlap" refers to the magnitude of the set intersection (i.e., number of common tokens) between the set of query tokens and the set of document string tokens. The "most relevant" documents (i.e., labeled trend events) are a predefined number of labeled trend events (e.g., 1000, 800, 500, or 200) that have the greatest "degree of overlap" out of all documents.

In some implementations, the scoring function $r_{max}$ maximizes search relevance as follows:

$$\{d_1, d_2, \ldots, d_r\} = r_{max \; i \in \{1, 2, \ldots, n\}} |\hat{s} \cap s_i|$$

For search inputs that contain both a noun/verb descriptor (e.g., "decline") and a modifying adjective (e.g., "fast"), SlopeSeeker subsequently filters out partially matching documents that contain only the adjective. For example, this would prevent a query of "fast decline" from returning documents labeled "fast increase" as partial matches. More formally, if $\hat{s}$ contains at least one token that matches a noun/verb descriptor in at least one document, then every matching document $d_i$ must contain that descriptor in its set of string tokens $s_i$. However, users may still enter search queries consisting only of an adjective and see documents where that adjective is paired with a variety of noun/verb descriptors.

After retrieval, SlopeSeeker ranks document results (labeled trend event results) based on two components. The first component is how precisely the search term matches the event labels of the document, which is computed by the search index 130 according to the index and search settings. Consider a document with a single event label. In this example, a scoring scheme is utilized where this document's score is the frequency with which the search terms occur in its label, divided by the length of its label. This means that events with longer labels (e.g., those with modifying adjectives like "slow" or "fast") will be scored higher than events with shorter labels if and only if the additional tokens accounting for the added length match the search terms.

Consider a document $d_1$ with the label "slow climbing." For a user search of "slow climbing", the score for the $$\frac{2}{\sqrt{12}} \approx 0.577,$$

so the score tor $d_1$ tor this search would be 0.577. In this example, the numerator has value 2 because there are two search terms "slow" and "climbing" that match the user search input. The value of the denominator is 12 because there are 12 letters in the label.

Now consider that there is also another hypothetical document $d_2$ with the label "climbing," and imagine that the user searches for stocks that were "climbing". The label score for $d_1$ will be $$\frac{1}{\sqrt{12}} \approx 0.289$$

(because there is one search term "climbing" that matches the search input) while the label score for $d_2$ will be $$\frac{1}{\sqrt{8}} \approx 0.354,$$

demonstrating how longer labels with the same number of matching tokens are penalized for being less precise matches.

The second scoring component is the visual saliency score of the labeled event (Section IV.D). The visual saliency score quantifies the perceptual prominence of a trend event. It is specifically designed for the search scenario to favor the most visually salient events, motivated by prior research showing that text annotations corresponding to visually salient features of line charts are most effective at driving reader takeaways. The final composite score used to rank events in the results is then the product of the search index (e.g., Elasticsearch index, or other search indexing frameworks such as Solr, Sphinx, or OpenSearch) component and the visual saliency component.

The visual saliency component of scoring is most important when there are a large number of matching results for a user query. Consider a case where a user is interested in "stocks that increased." There could feasibly be very many document results with a label of "increasing" which will all have identical (or at least very similar) search index scores (e.g., Elasticsearch scores). However, these results are not likely to all be of equal interest to the user. For instance, a short three-day increase in stock price is probably less interesting, both visually and in terms of the analytical task at hand, compared to a three-month increase during which much more stock value was gained. Note that these could both have similar slopes and thus identical labels. The visual saliency scoring component thus serves as a tiebreaker to boost results with greater prominence and relevance over others that share identical labels.

V.D.3. Bucketing

The indexed data and result scoring (discussed above) are at the level of the labeled trend event (e.g., document), where each labeled trend event is a labeled slope segment. Any individual chart (e.g., stock) could have multiple matching events for a query. It is for this reason that in SlopeSeeker's interface, events are not presented individually but are placed into buckets at search time based on their chart identifier (e.g., stock key). Events within a bucket are sorted by their composite score. Buckets themselves are also scored; the final score for each bucket is the sum of the composite scores of its individual events, and buckets are presented in sorted order according to this final score.

In accordance with some implementations of the present disclosure, this scheme is designed to create an experience akin to standard "document search," where more matches in a bucket bump that bucket higher in the results.

V.D.4. Sequence Queries

A sequence query includes of a list of trend events in a specified order. Each of the trend events can be a single word or multi-word. Since this type of query is not straightforward to support natively in the search index 130 (e.g., Elasticsearch) based on the way the data is indexed, sequence query results are constructed as follows. First, each individual constituent event is run through the search index 130 as its own single-word or multi-word query but not yet bucketed. Then, sequences are constructed by taking these results and doing an SQL join based on chart identifier and start/end dates. In some implementations, a tunable parameter is included to allow for some temporal delay between adjacent events.

As disclosed herein, some implementations also provide partial matching support for sequences. In particular, two types of sub-sequences are supported: edge sub-sequences (e.g., for "up, flat, down": "up"; "up, flat") as well as other in-order sub-sequences (e.g., for "up, flat, down": "flat"; "down"; "flat, down").

In some implementations, due to the construction of sequence results requiring custom logic, a custom scoring scheme for sequences and partial sequence matches is defined. At first, each sequence's score is assigned to be the sum of the composite scores of its constituent segments. Although partial matching sequences have fewer constituent components and will thus generally have lower composite scores than full matches, the inventors found it beneficial to additionally down-weight the composite scores of partial sequence matches.

In some implementations, the custom scoring scheme for sequence queries is based on the following formula:

$$\text{score}_0 \left( \frac{l_{seq}}{l_{\hat{q}} + \text{offset}_{seq}} \right)^2$$

In the formula above, score, is the un-penalized score, $l_{seg}$ is the number of events in the sequence being scored, and $l_{\hat{q}}$ is the number of events in the query, and $\text{offset}_{seq}$ is the number of sequential events missing from the beginning of the sequence compared to the query.

This custom scoring scheme applies two different penalties. First, longer sub-sequences ($l_{seq} \approx l_{\hat{q}}$) are penalized and scored higher than shorter ones ($l_{seq} < l_{\hat{q}}$). For example, if the user is interested in stocks with the pattern "up, flat, down"

which has length three, a sub-sequence of length two (e.g., "up, flat") will be scored higher than a sub-sequence of length one (e.g., "up") because it matches more constituent events of the sequence. Second, a non-edge sub-sequence (with a large offset) will be penalized to be scored lower than an edge sub-sequence (with zero offset). Continuing with the same example, the sub-sequence "up, flat" has zero offset because it begins at the same place as the initial query pattern, but "flat, down" has an offset of one since begins starts one event later in the sequence. Intuitively, sub-sequence partial matches that begin similarly to the desired sequence from the query should be scored higher than those that end similarly to the desired sequence. Finally, after applying any score penalties to the sequence results and any partial results, all results are bucketed, and the bucket scores are computed as before.

VI. Exemplary Use Case Scenarios

FIGS. 18A to 18G provide a series of screenshots illustrating how the SlopeSeeker system allows a user to search for specific trends and data based on the quantified language of a natural language queries, in accordance with some implementations.

Figure 18A:
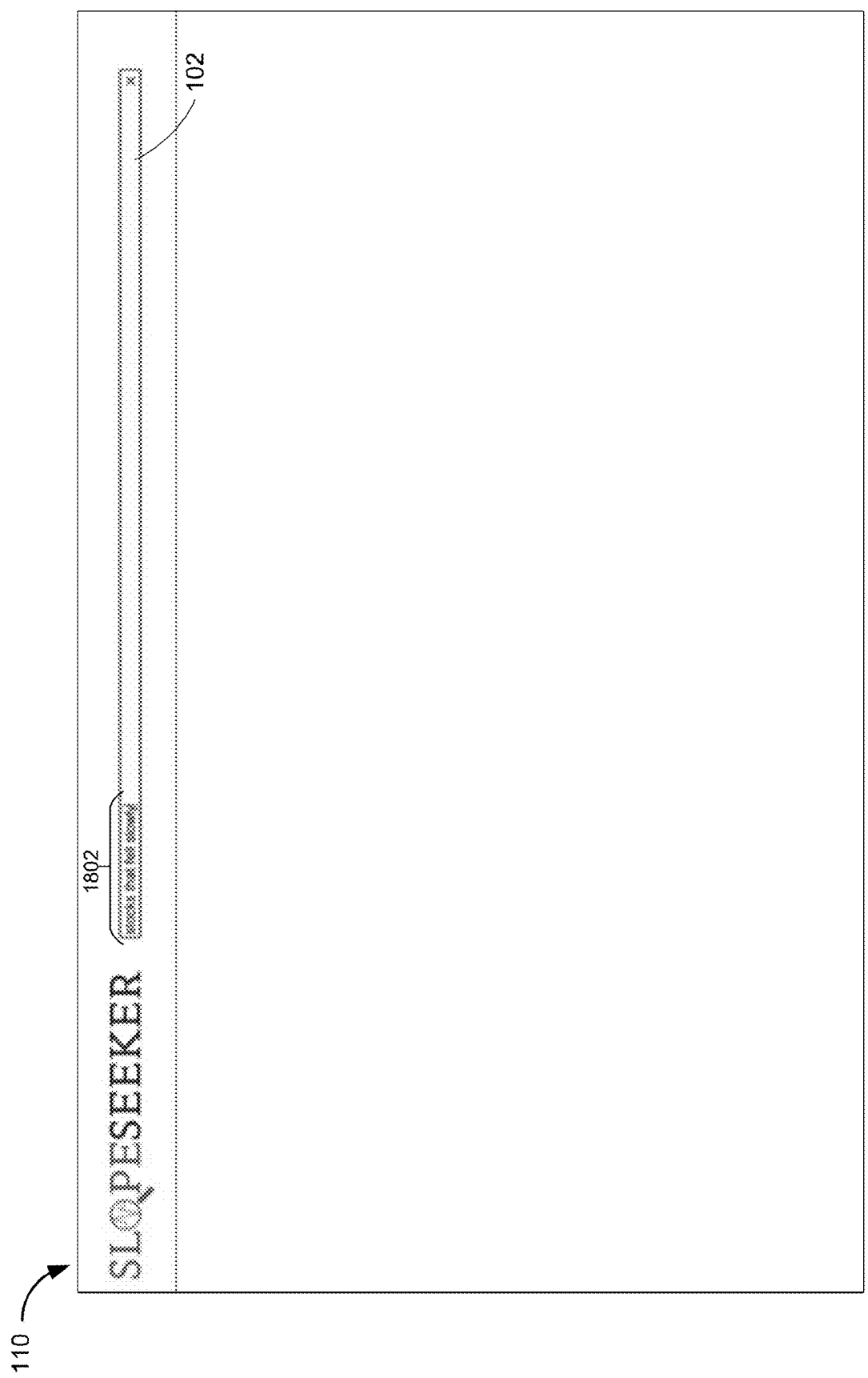
FIGS. 18A-18G provide a series of screenshots illustrating how the SlopeSeeker system allows a user to search for specific trends and data based on the quantified language of a natural language queries, in accordance with some implementations.
Figure 18B:
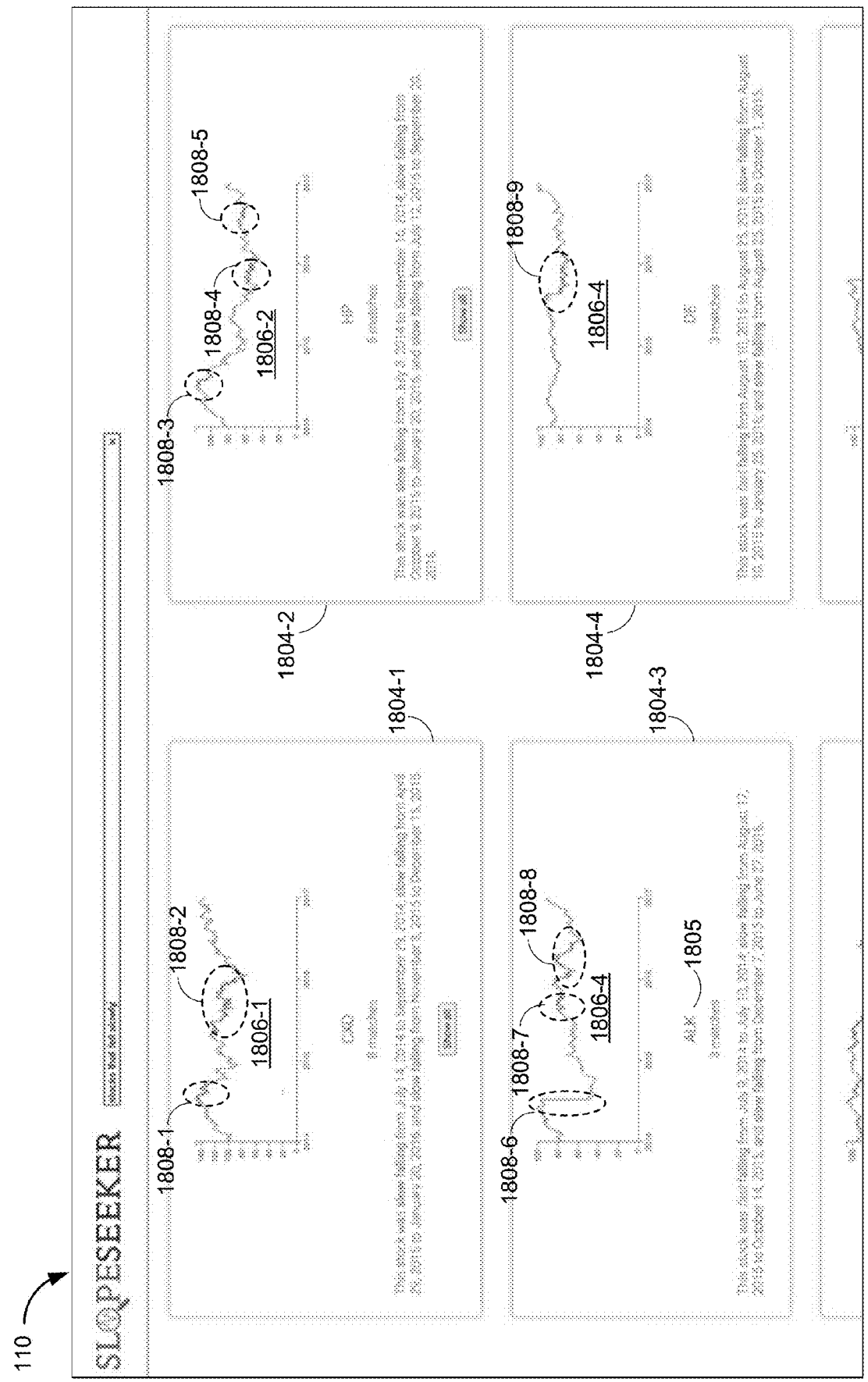

In FIG. 18A, a user inputs a natural language query 1802 (e.g., "stocks that fell slowly") into the search bar 102 (e.g., natural language inbox box). FIG. 18B illustrates that, in response to receiving the natural language query, the user interface 110 displays results (e.g., as tiles 1804) corresponding to the query. Each of the results includes a respective chart 1806 (e.g., a line plot) showing stock prices over time. A respective chart 1806 can include one or more highlighted segments 1808 (e.g., visually emphasized segments, or segments that are encoded in a different color compared to the rest of the chart), corresponding to one or more specific events on the chart. In the example of FIG. 18B, each of the one or more specific events is an instance of falling stock prices, in which the respective segment is a segment of the chart with a negative slope.

Figure 18C:
Figure 18D:
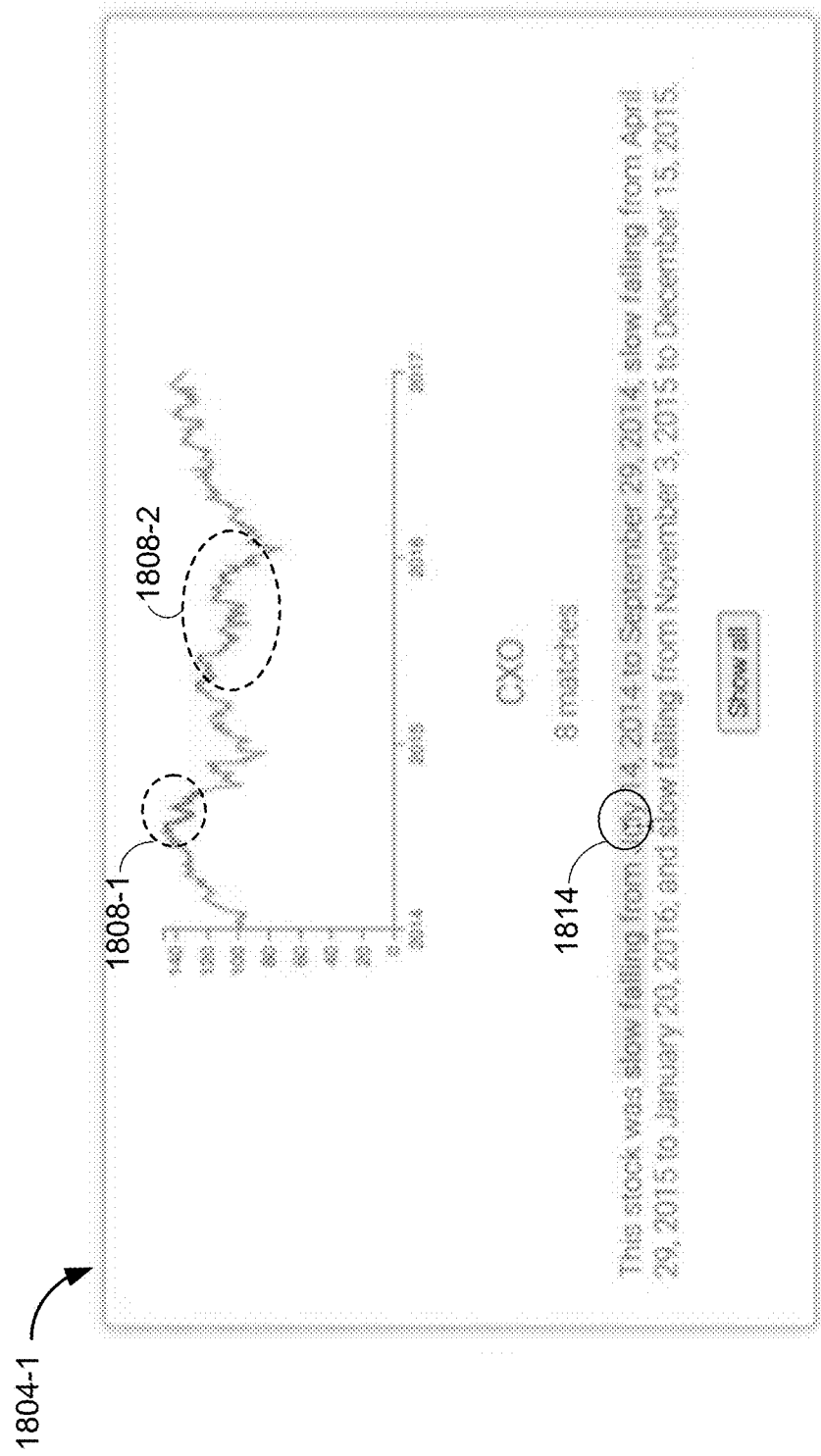

FIG. 18C illustrates that when a user hovers (1810) the mouse over a highlighted event on a chart, the corresponding textual annotation 1812 is also highlighted. In FIG. 18D, when a user hovers (1814) the mouse over a textual annotation, the portion of the chart corresponding to the textual annotation (i.e., segment 1801-1) is visually emphasized while the rest of the events on the chart (e.g., corresponding to segment 1808-2) are visually de-emphasized.

Referring back to FIG. 18B, it can be observed that most of the instances of "slow falling stocks" identified by the computing system 200 correspond to segments of the line charts whose slopes are slightly negatively inclined (i.e., not a steep decline). In some instances, in response to a natural language query, the user interface can display a result that has an opposite meaning (or a partial match) to the semantics of the user query. For example, FIG. 18B shows that the chart corresponding to the stock ticker 1805 "ALK" includes a segment 1808-6 with a steep decline for the time period Jul. 9, 2014 to Jul. 10, 2014 (i.e., the vertical or near-vertical line segment).

Figure 18E:
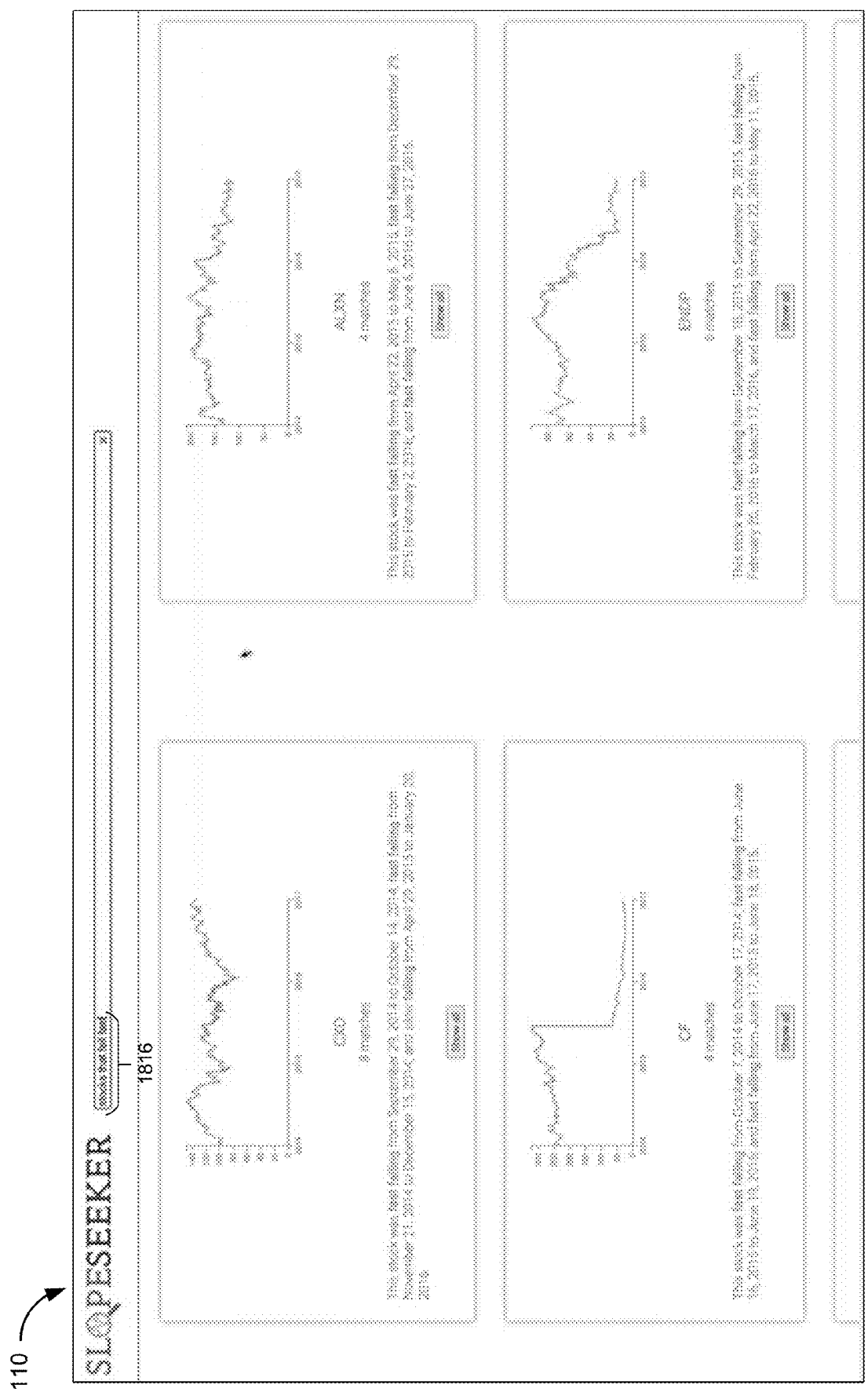

FIG. 18E shows a user modification to the query via the natural language input box 102. In this example, a user modifies the query from "stocks that fell slowly" (1802) to "stocks that fell fast" (1816). In response to receiving the modified query, the user interface displays an updated set of charts of stock prices over time, in which each of the charts includes one or more respective segments corresponding to fast falling stock prices. Compared to the results in FIG. 18B, the segments of the line charts in FIG. 18E have slopes that are more negatively inclined (e.g., with a more negative gradient). Thus, by detecting a change in a modifier from "slow" to "fast" in the input query, the computing system can update its search to identify trends in the time series data that corresponds to the updated modifier.

Figure 18F:
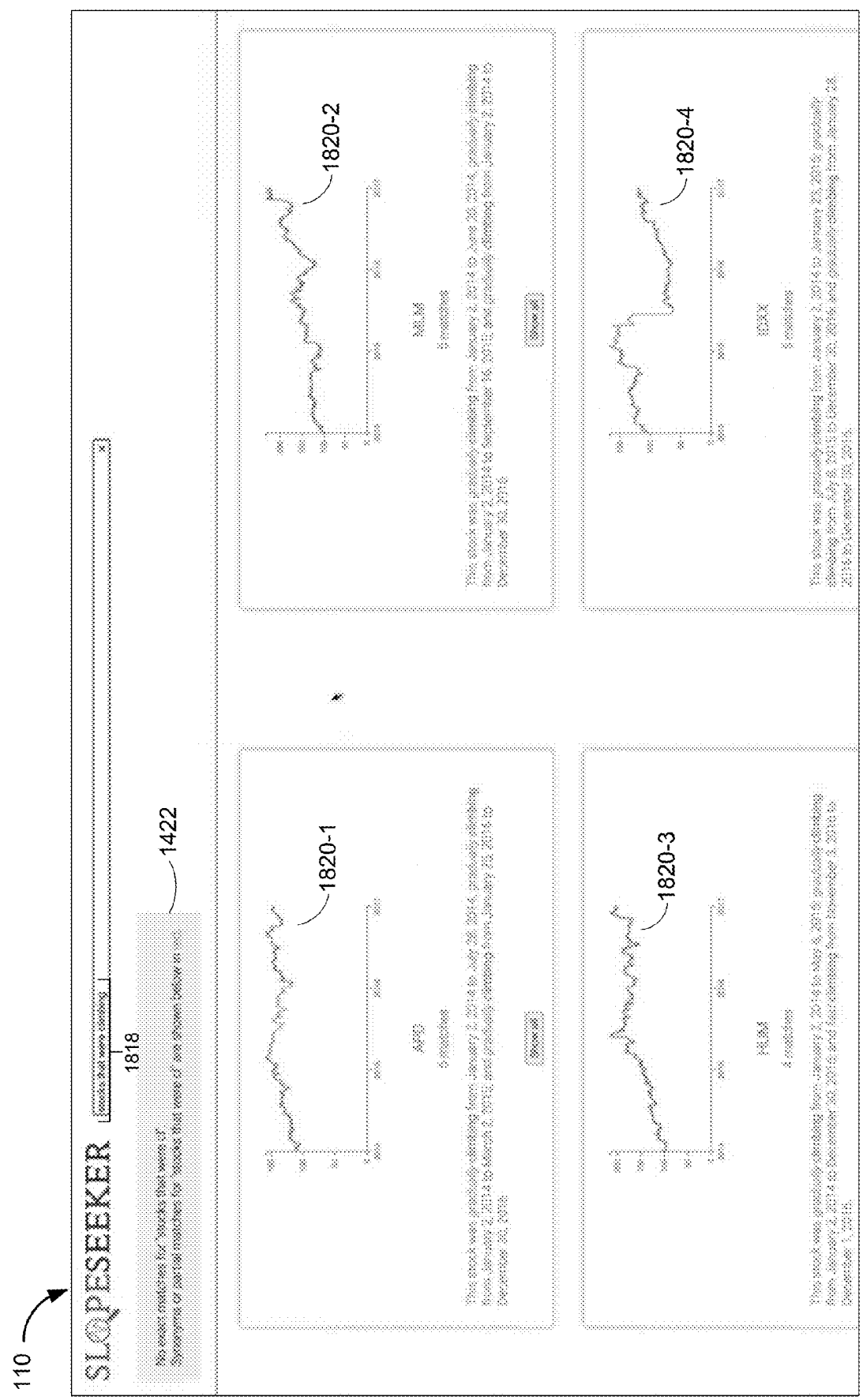

In some instances, a user can use terms that have different semantics. For example, FIG. 18F illustrates user input of a natural language query 1818 (e.g., "stocks that are climbing") into the natural language input box. In response to the natural language query, the user interface 110 displays a notification box 1422 indicating that there are no exact matches to the query 1818 (e.g., "climbing"), and displays a set of charts 1820 with highlighted portions showing instances of stock prices gradually climbing over time. The visually emphasized portions of the charts in FIG. 18F correspond to respective time periods, identified by the computing device, in which a respective stock price experiences a relatively slow and steady increase over a longer period of time (e.g., at least 3 months, 6 months, or 9 months over a three-year timespan). FIG. 18F shows that the chart 1820-3 corresponding to stock ticker MLM and the stock corresponding to stock ticker HUM are highlighted over the entire duration that the charts span (e.g., three years).

Figure 18G:
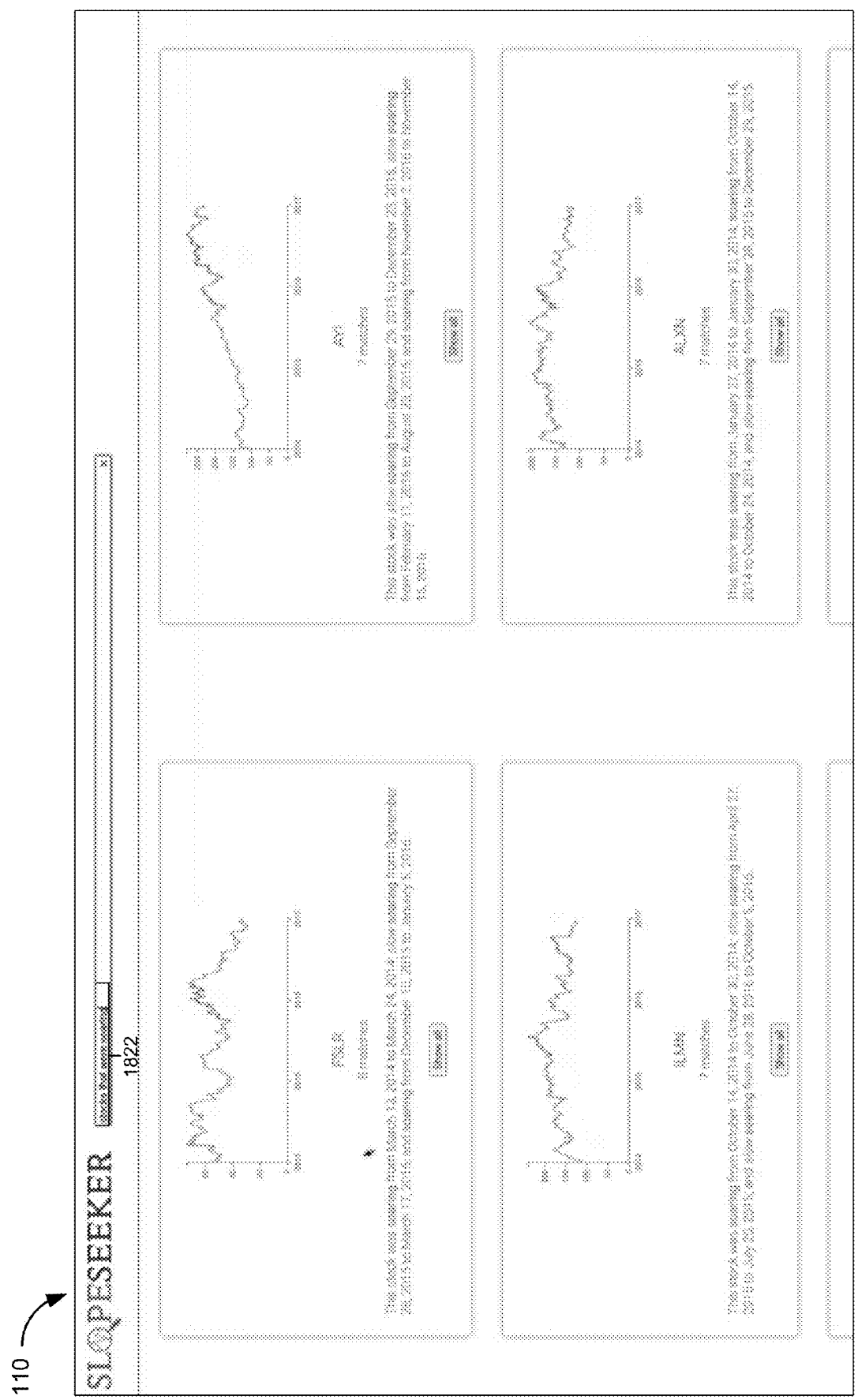

FIG. 18G illustrates results that are displayed in response to a natural language query 1822 "stocks that were soaring," in accordance with some implementations. The instances of "soaring" correspond to segments of the line graphs with steeper slopes over shorter periods of time compared to the results in FIG. 18F, FIGS. 19A to 19D are a series of screenshots illustrating building sequence queries, in accordance with some implementations. A sequence query refers to a series of events that are identified in a single line graph.

Figure 19A:
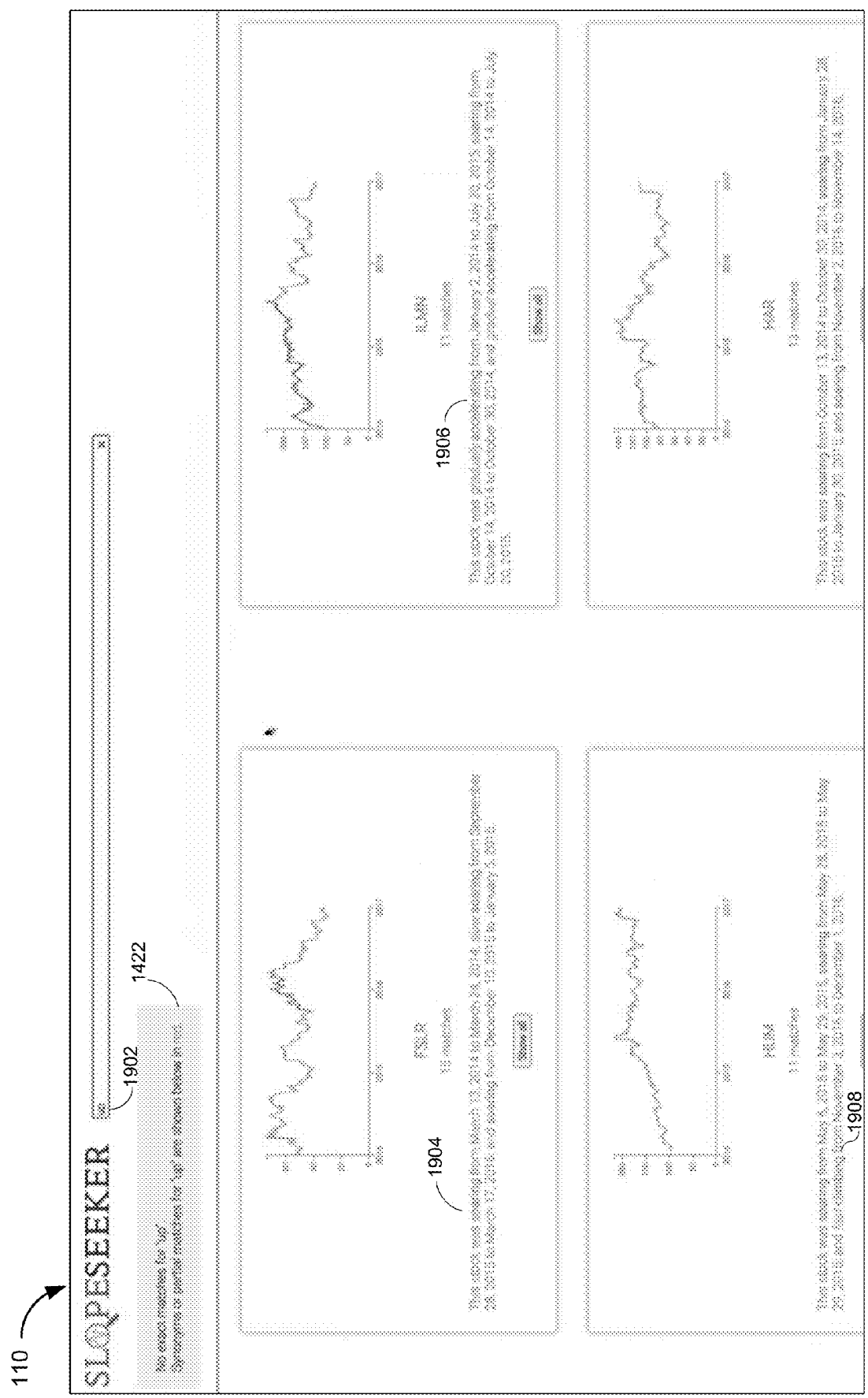
FIGS. 19A-19D are a series of screenshots illustrating building sequence queries, in accordance with some implementations.

In FIG. 19A, a user inputs a term 1902 (e.g., a single word) "up" in the natural language input box. In response to the user input, the notification box 1422 displays a notification that there is no exact match for the word "up." The notification further indicates that the computing device has identified synonyms or partial matches for the word "up," which are shown in red in the results. In this example, the computing device identifies words (e.g., adjectives) such as "soaring" (1904), "accelerating" (1906) and "climbing" (1908), and/or words with modifiers such as "slow soaring," "gradual accelerating," and "fast climbing" to be synonymous with the term "up."

Figure 19B:
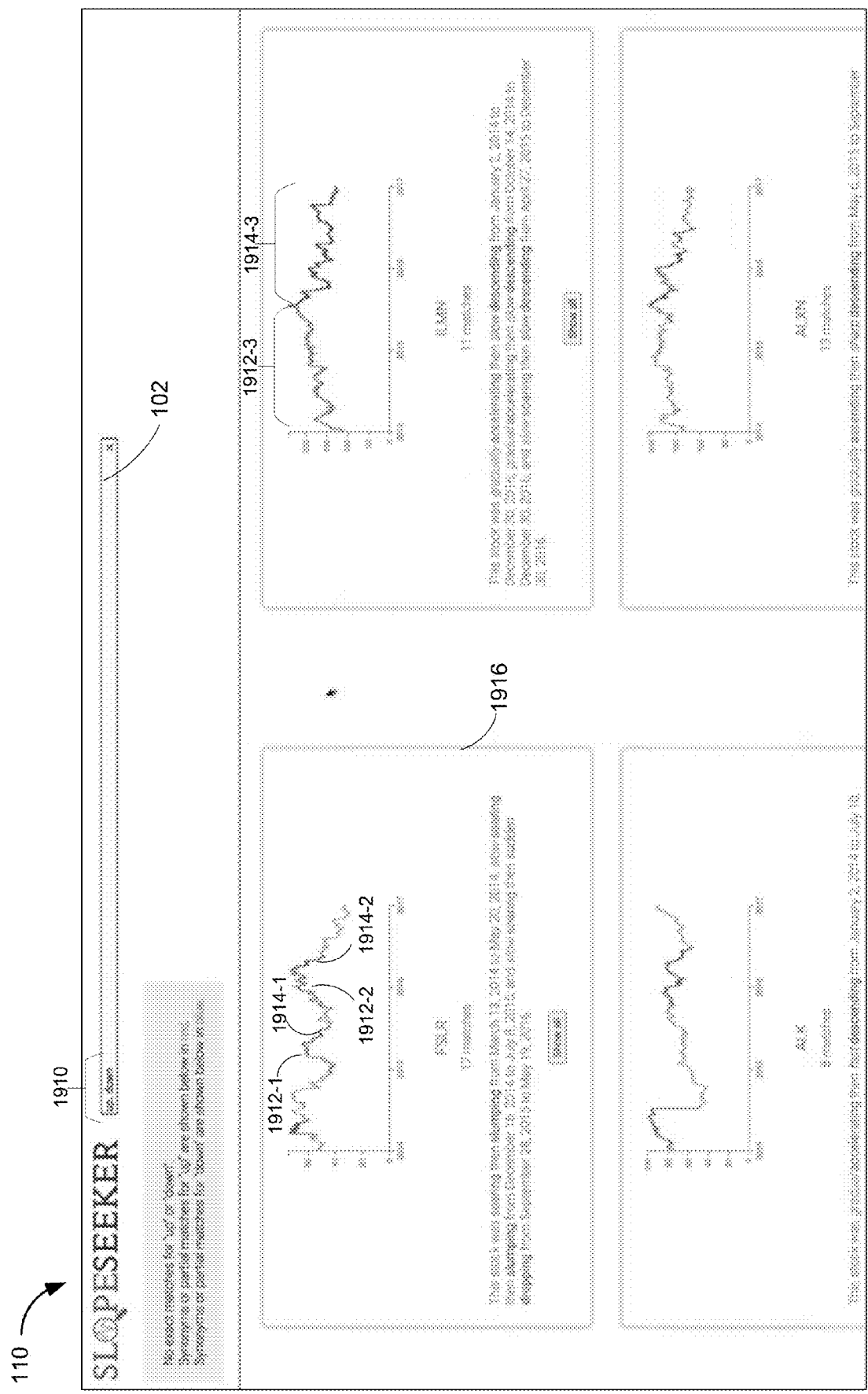

Suppose that a user is interested to see stocks whose prices went up then down. In FIG. 19B, the user enters a query 1910 "up, down" into the natural language input box 102. In response to receiving the query, the user interface displays events that match the query. Each of the events corresponds to a pair of line segments corresponding to a time period where the stock price increased and then decreased. Each pair of line segments consists of a first line segment 1912, corresponding to a stock price increase, and a second line segment 1914 contiguous to the first line segment, corresponding to a stock price decrease. In some implementations, as illustrated in FIG. 19B, the user interface displays the respective first line segments using a first color encoding (e.g., red, orange, or black) and displays the respective second line segments using a second color encoding that is distinct from the first color encoding.

Figure 19C:

In FIG. 19C, there is a user interaction (1918) (e.g., a mouse hover action) with a textual annotation (e.g., the text portion "slow soaring then slumping from Dec. 16, 2014 to Jul. 8, 2015) corresponding to the chart in tile 1916. In response to the user interaction, the portion of the line graph (segment 1912-1 and 1914-1) corresponding to the textual annotation is visually emphasized, whereas other portions of the chart (e.g., including other events identified by the computing device as matching the query "up, down") are visually de-emphasized.

Figure 19D:
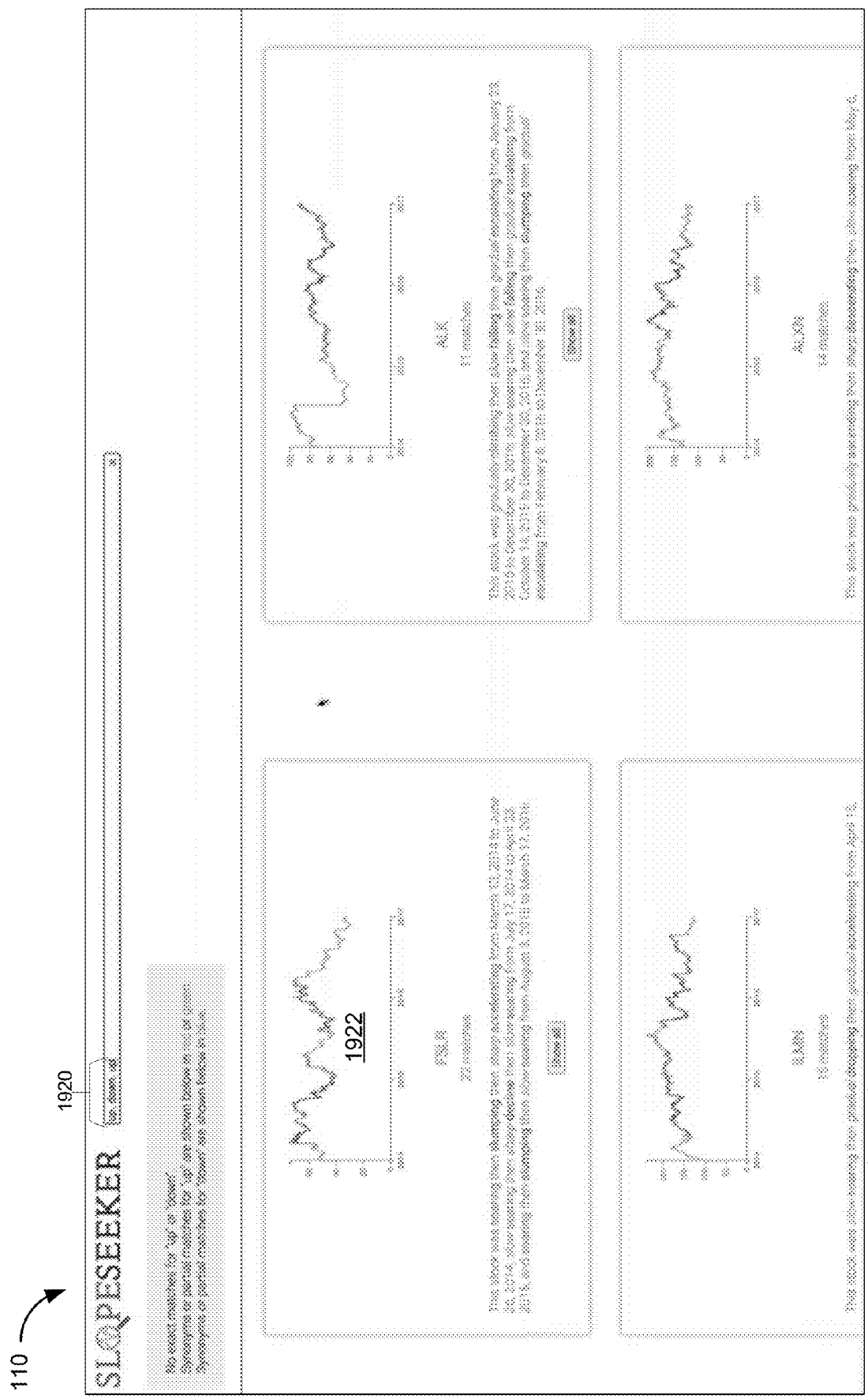

In FIG. 19D, the user builds on the previous query by inputting a term (e.g., "up") after the previous search terms, thus creating a query 1920 with a tuple of terms "up, down, up." In response to receiving the query, the user interface displays a set of charts that have portions exhibiting a "price increase, price decrease, and price increase" trend. For example, one of the charts identified by the computing device is a chart 1922, corresponding to stock ticker FLSR, that includes a portion corresponding to three segments (e.g., contiguous segments, or non-contiguous segments based on a tunable parameter as described in method 2300) over the time period March 2014 to June 2014, in which the stock price soared, then slumped, then sharply accelerated. In the example of FIG. 19D, line segments corresponding to the first stock price increase are encoded with a first color, line segments corresponding to the stock price decrease are encoded with a second color distinct from the first color, and line segments corresponding to the second stock price increase are encoded with a third color that is distinct from both the first and second colors.

Figure 20A:
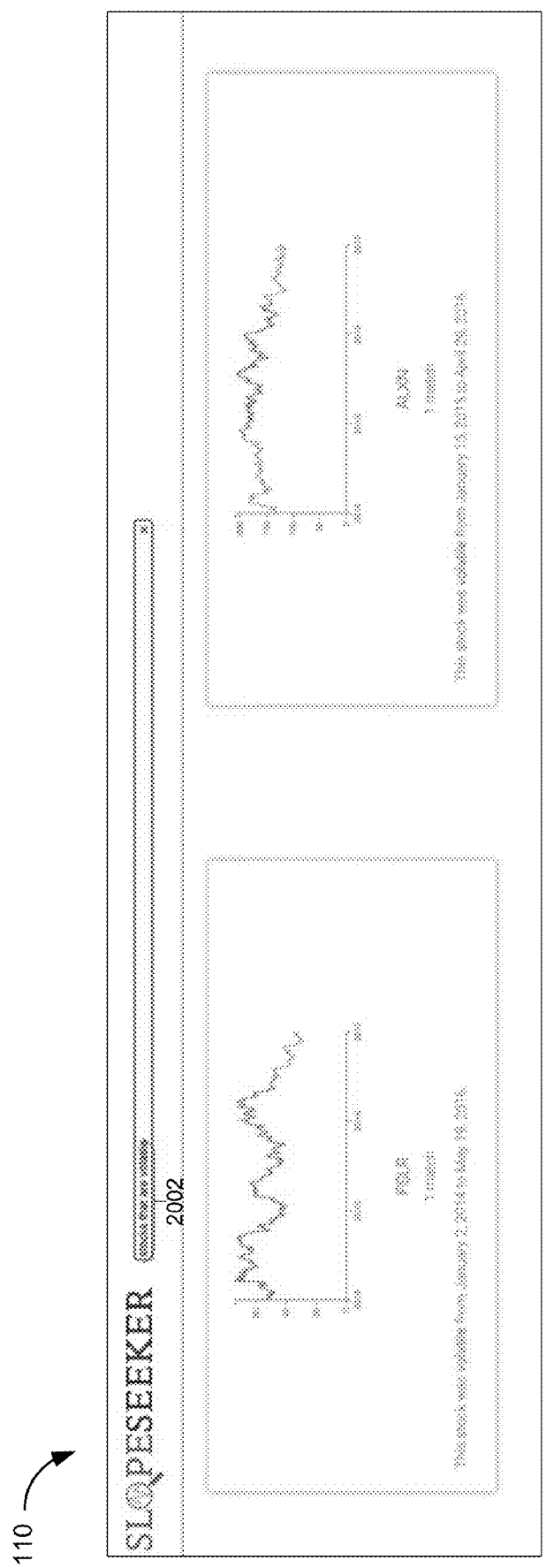
FIGS. 20A and 20B are screenshots illustrating the use of the SlopeSeeker system to search for more global trends that may not correspond to a single slope within a segment of a trend, in accordance with some implementations.
Figure 20B:
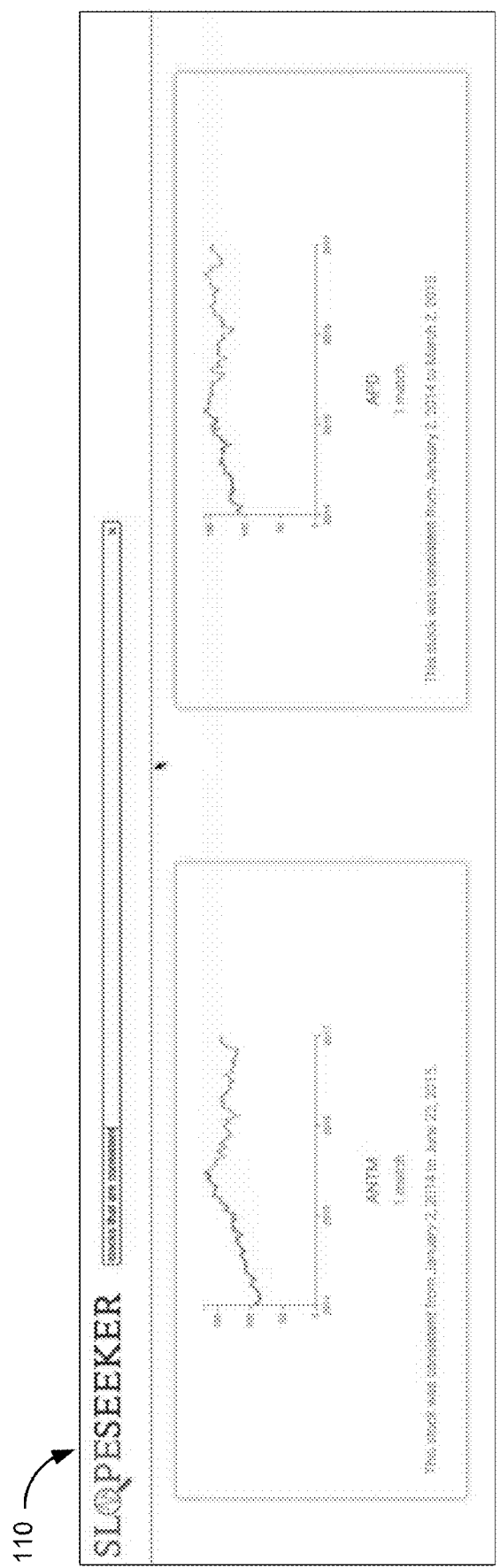

FIGS. 20A and 20B are screenshots illustrating the use of the SlopeSeeker system to search for more global trends that may not correspond to a single slope within a segment of a trend, in accordance with some implementations.

FIG. 20A illustrates an example where a user inputs a query 2002 "stocks that are volatile." In response to this query, the user interface displays charts corresponding to stock tickers FSLR and ALXN with highlighted portions corresponding to respective longer time periods (e.g., for at least one year over the three-year duration of the chart) in which the stock prices exhibit a longer period of volatility (e.g., instead of highlighting one particular slope of the chart).

FIG. 20B illustrates another example in which a user searches for "stocks that are consistent" over time (e.g., where there is very little deviation over the broad longer-term trend. In response to this user query, the user interface displays two charts. Each of the charts includes a respective highlighted portion corresponding to a time period where the stock price was consistent.

FIGS. 21A to 21I are a series of screenshots illustrating user interactions with the SlopeSeeker user interface, in accordance with some implementations.

Figure 21A:
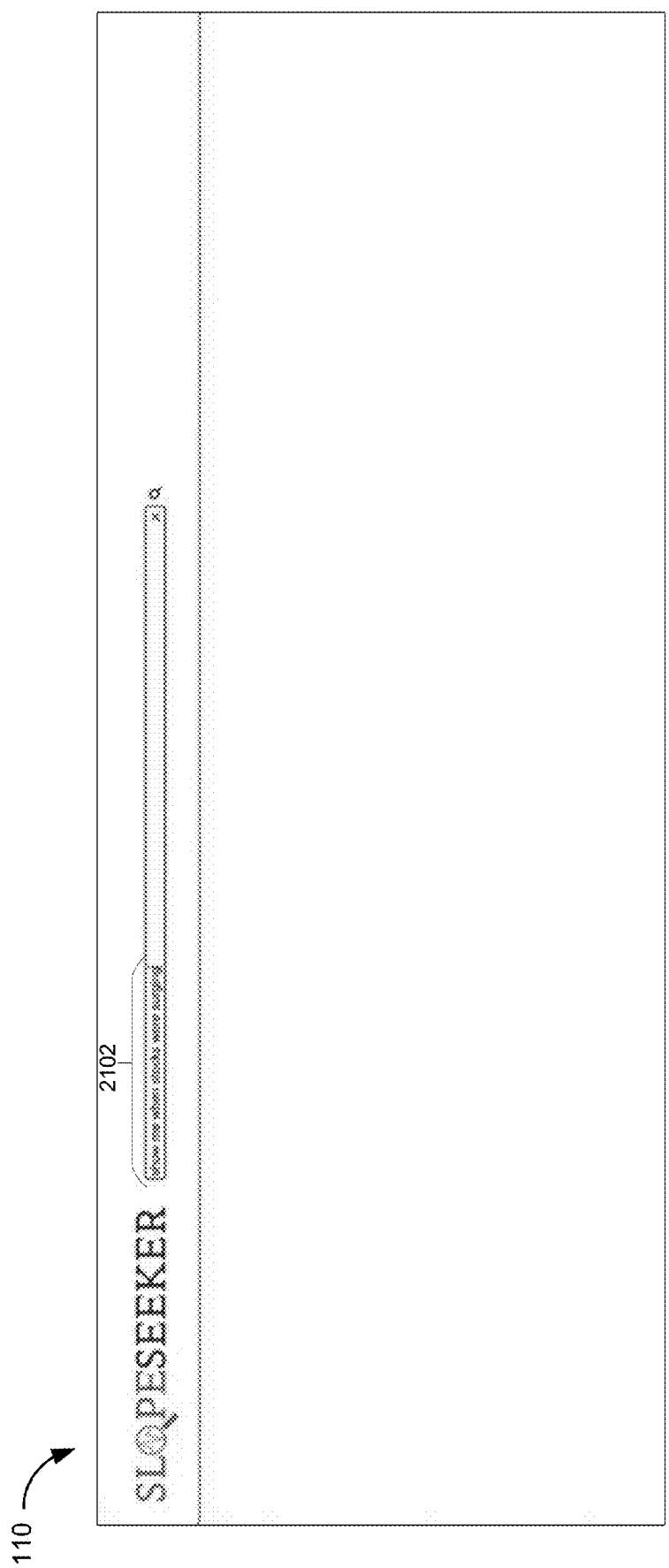
FIGS. 21A-21I are a series of screenshots illustrating user interactions with the SlopeSeeker user interface, in accordance with some implementations.
Figure 21B:
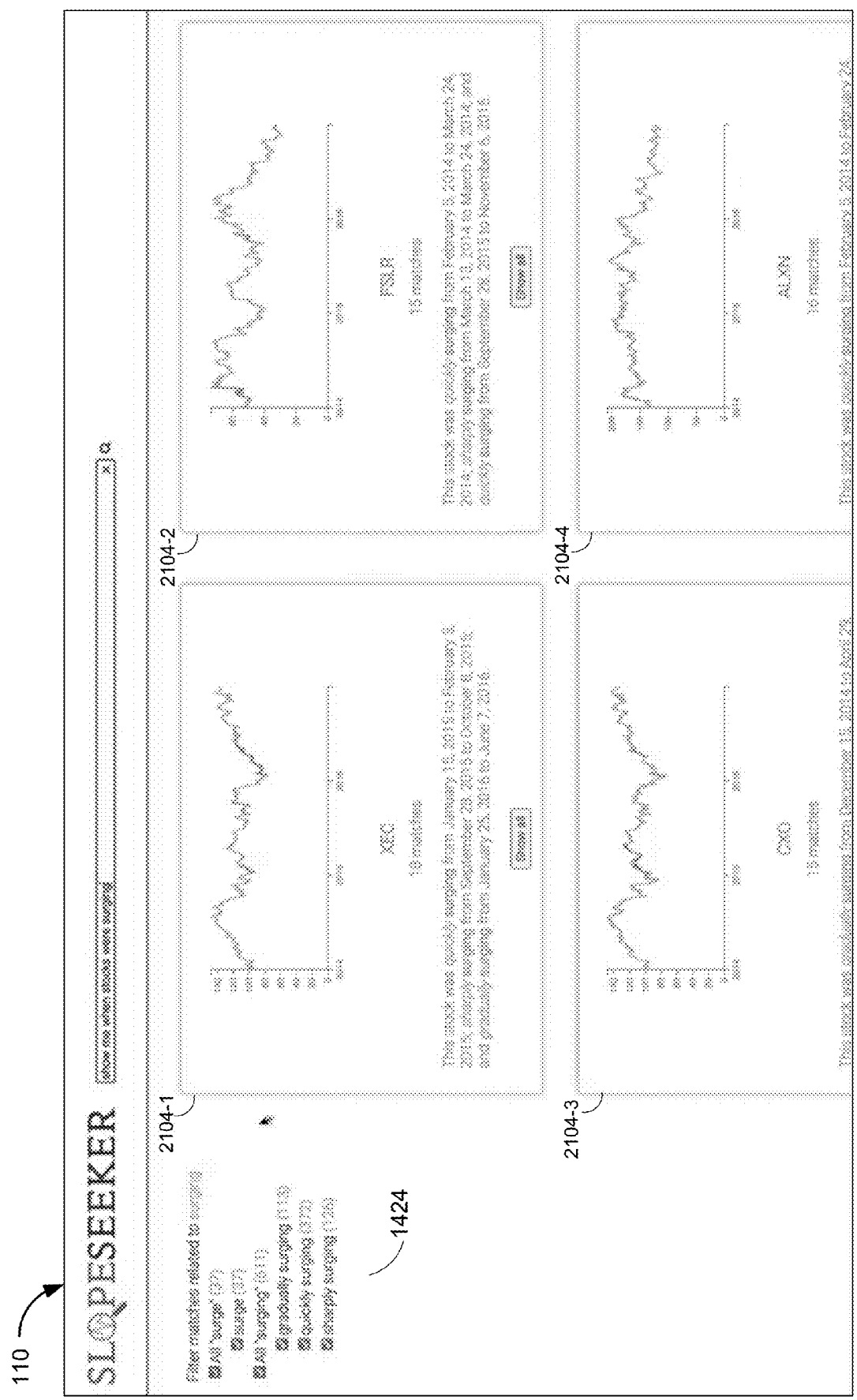
Figure 21C:
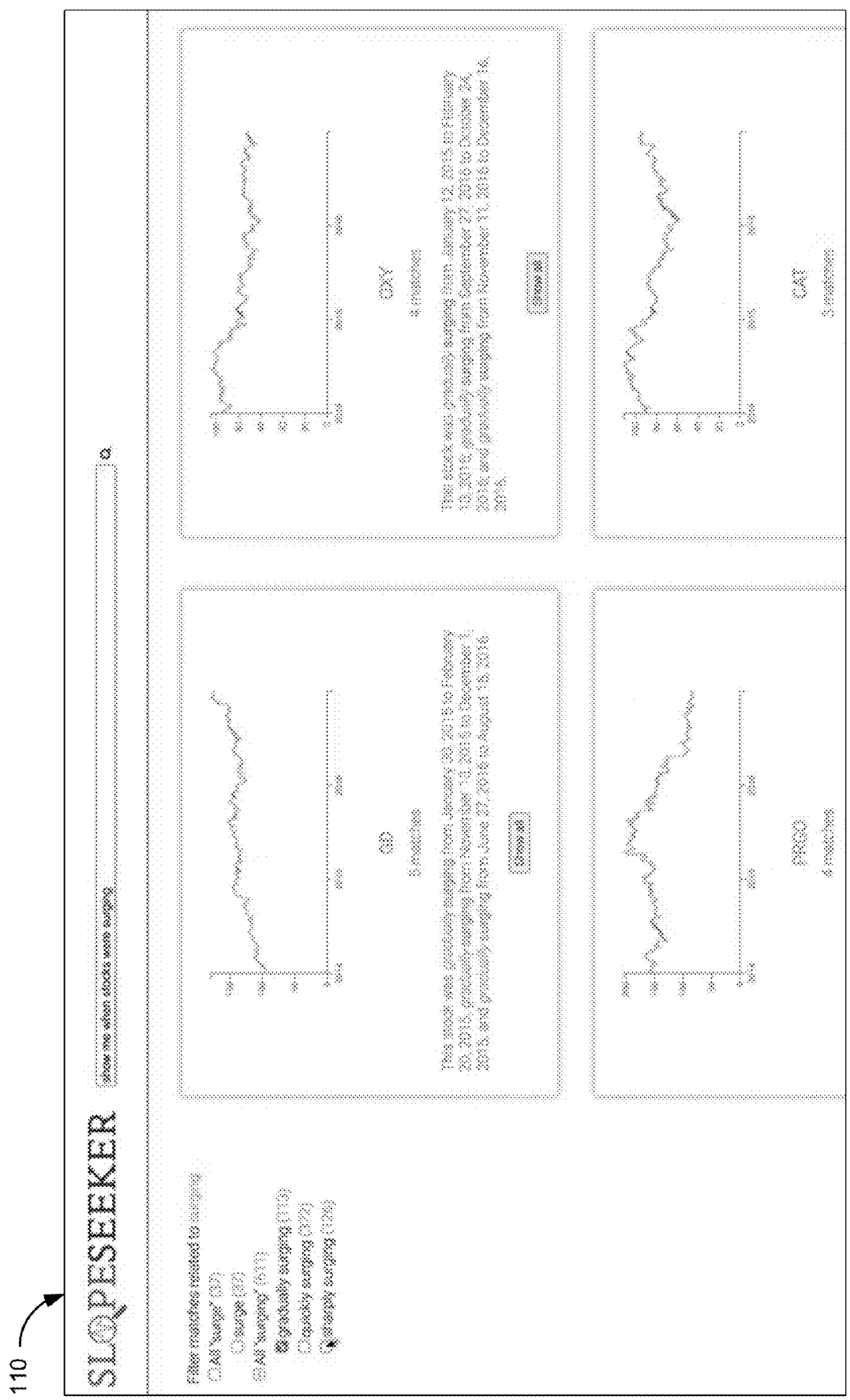
Figure 21D:
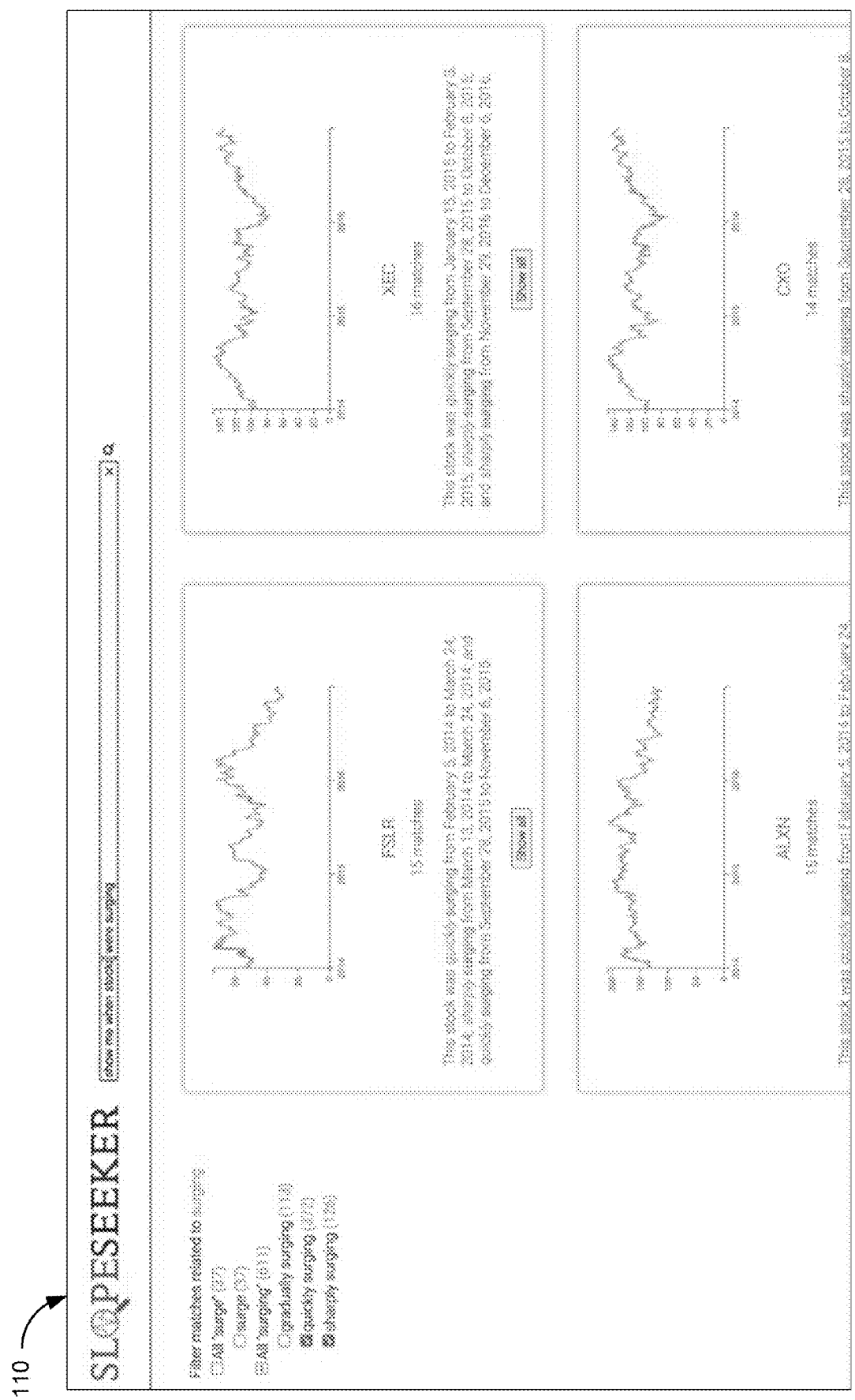

In FIG. 21A, the user interface 110 receives the user input 2102 "Show me when stocks were surging." FIG. 21B shows that the user interface populates with result tiles 2104-1, 2104-2, 2104-3, and 2104-4, each corresponding to one stock, showing the stock price chart and textual annotations of when each event of interest occurred. In some implementations, a user can interact with the side bar 1424 to filter the results to a subset of results (e.g., to the type(s) of surging behavior that the user would like to see). For example, the user might only be interested in gradual surges (FIG. 21C) or more sharp ones (FIG. 21D).

Figure 21E:
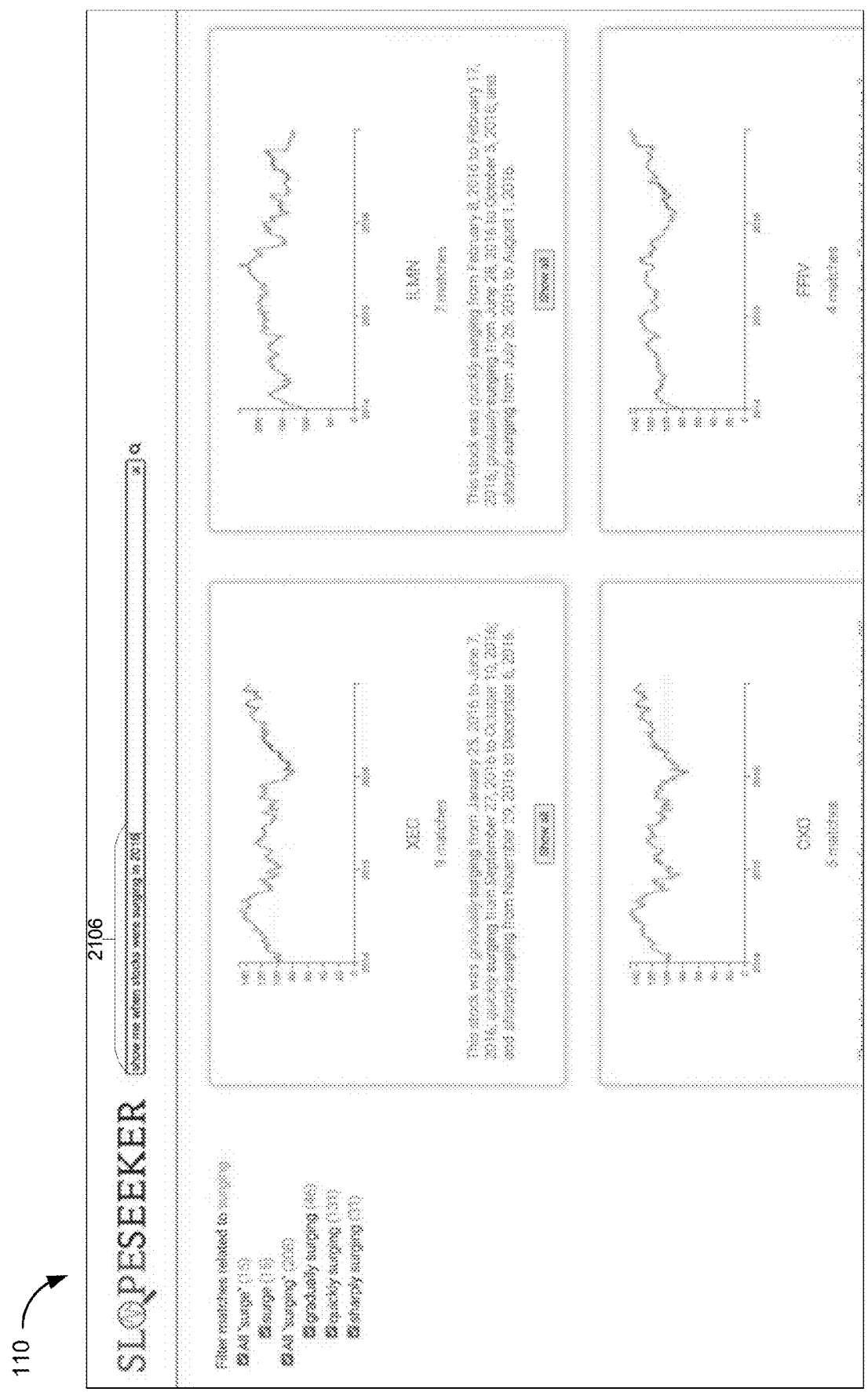

In some instances, the user can further filter the results by modifying the natural language input query, such as "Show me when stocks were surging in 2016" (2106) as illustrated in FIG. 21E.

Figure 21F:
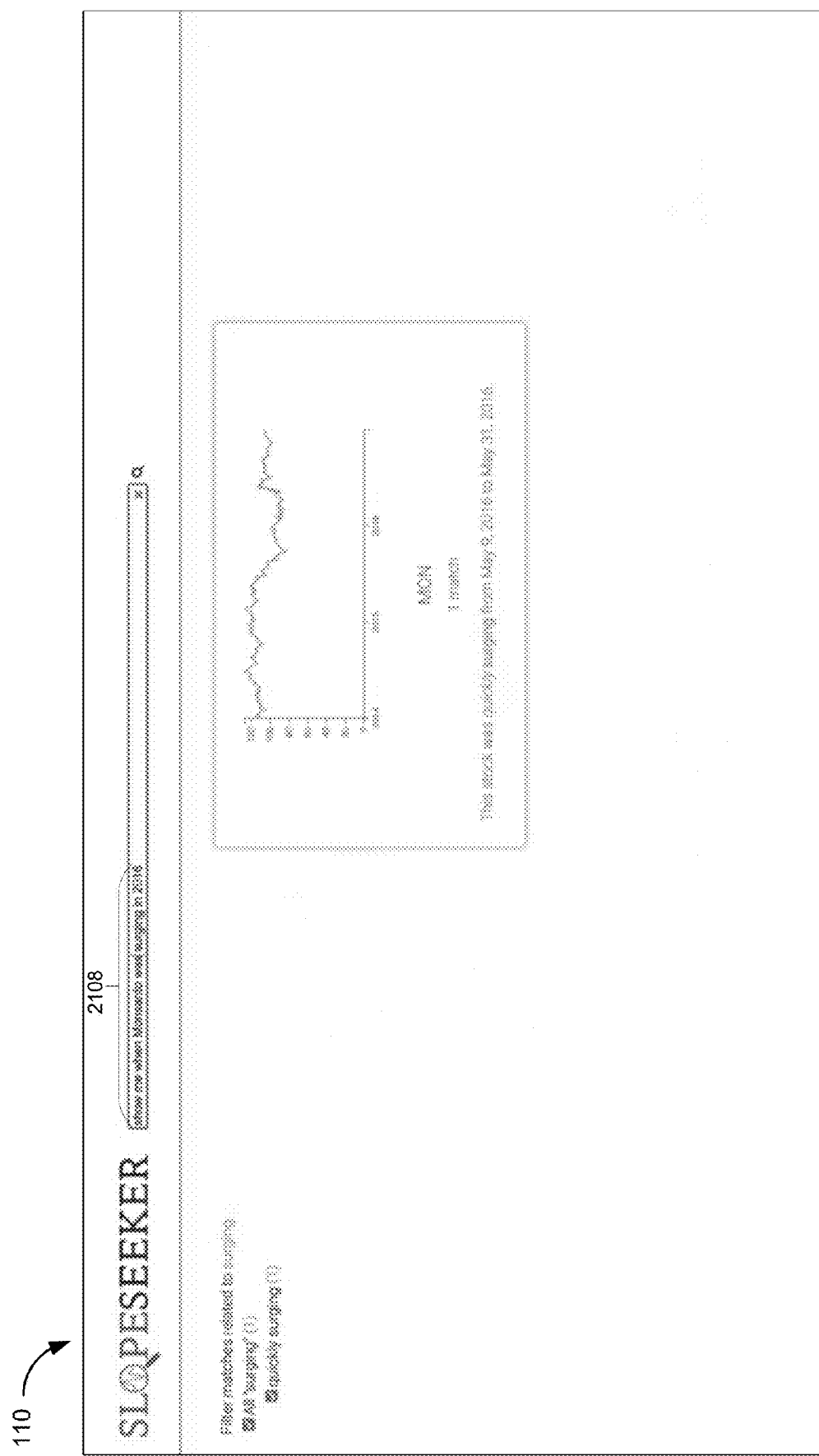

In some instances, the user can further filter the results by modifying the natural language input query to specify a specific stock like "Monsanto," as illustrated in the natural language input query 2108 "Show me when Monsanto was surging in 2016" as illustrated in FIG. 21F.

Figure 21G:
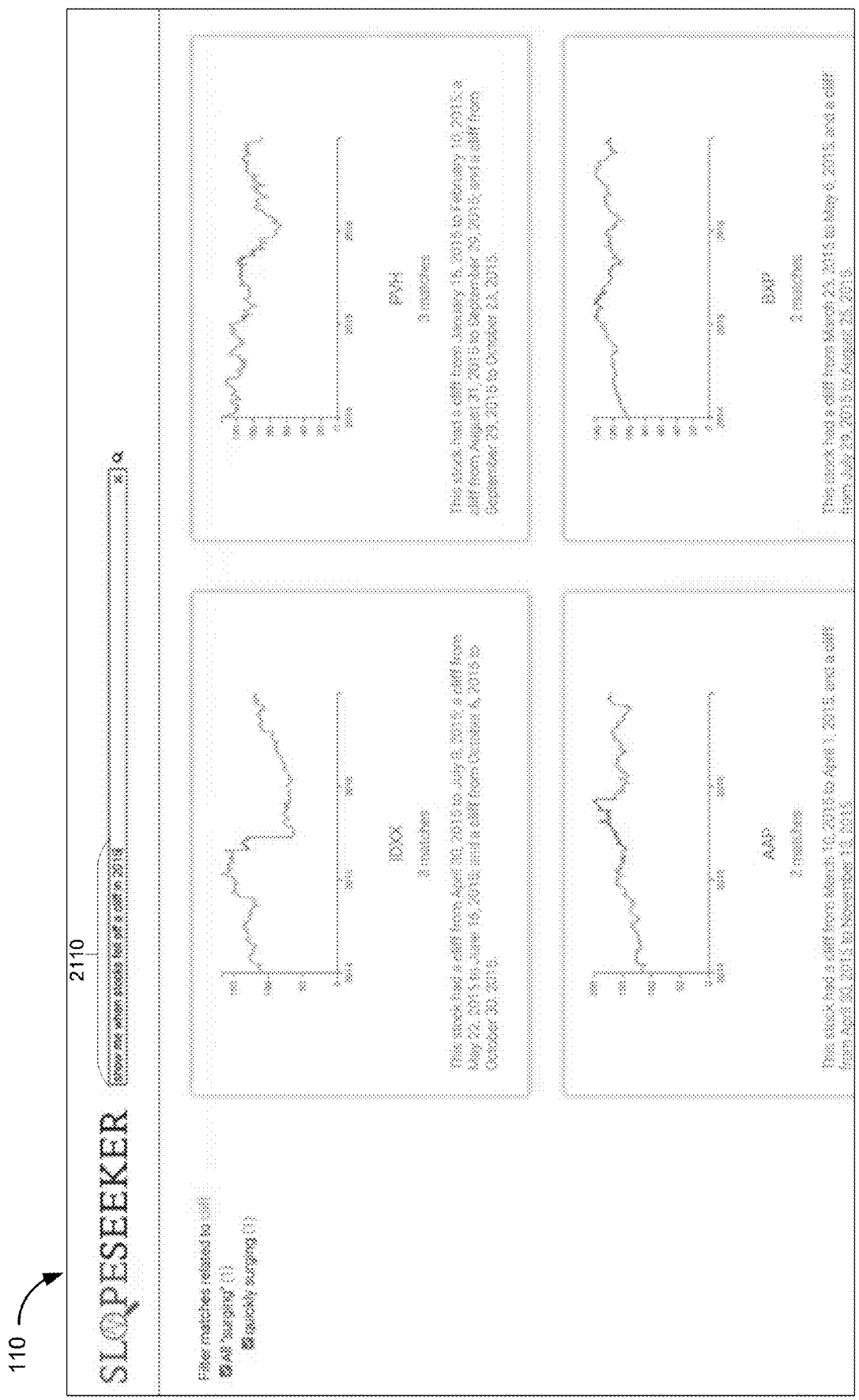
Figure 21H:
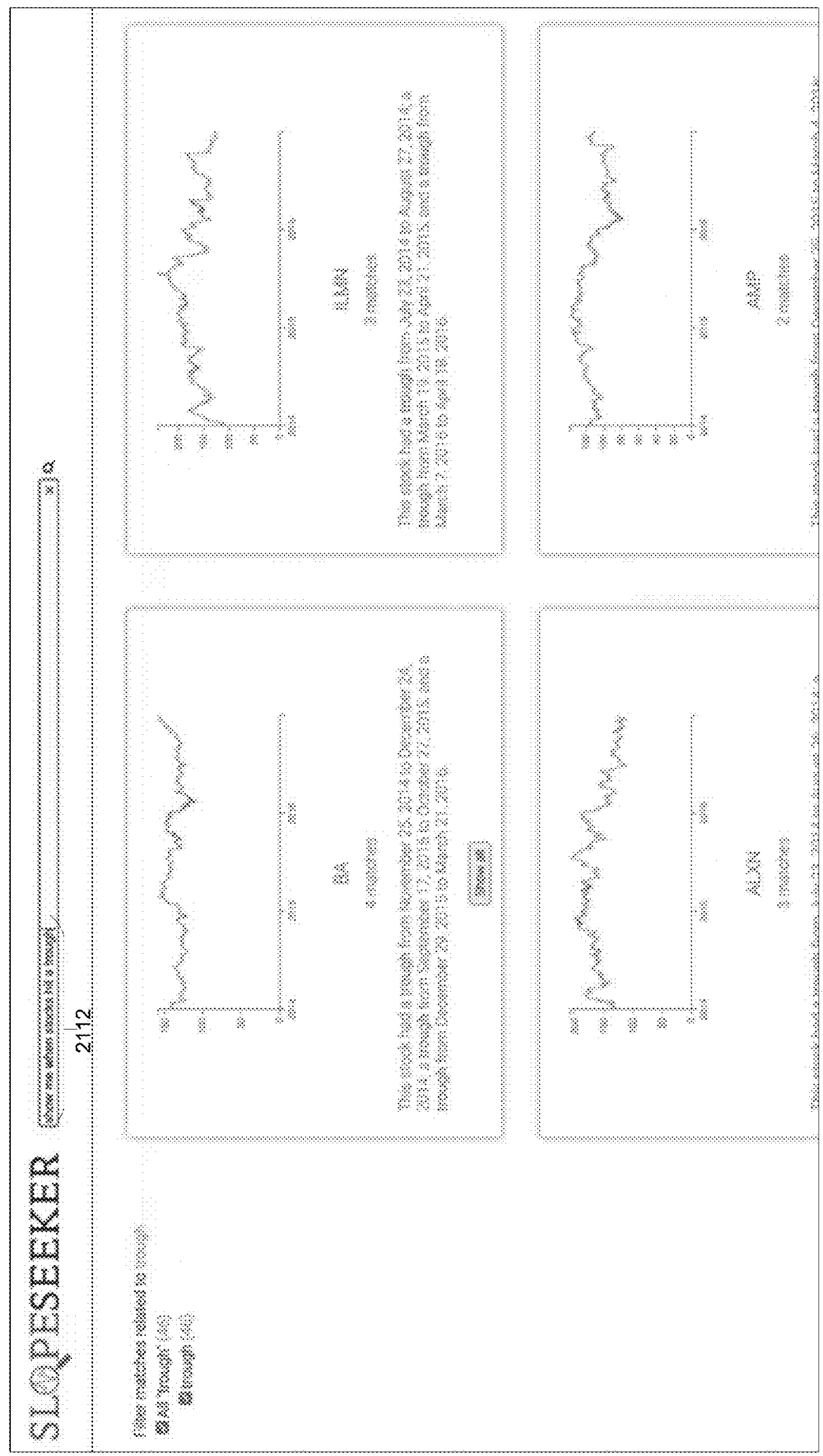

In some instances, a user can also search for multi-line segment shapes. For example, FIG. 21G shows the query 2110 "Show me when stocks fell off a cliff in 2015" that is input by a user, whereas FIG. 21H shows another natural query 2112 "Show me when stocks hit a trough." In both of these instances, the user interface displays results of stock prices that identify segments corresponding to when stock prices fell sharply (FIG. 21G) or reached a low point (FIG. 21H).

Figure 21I:
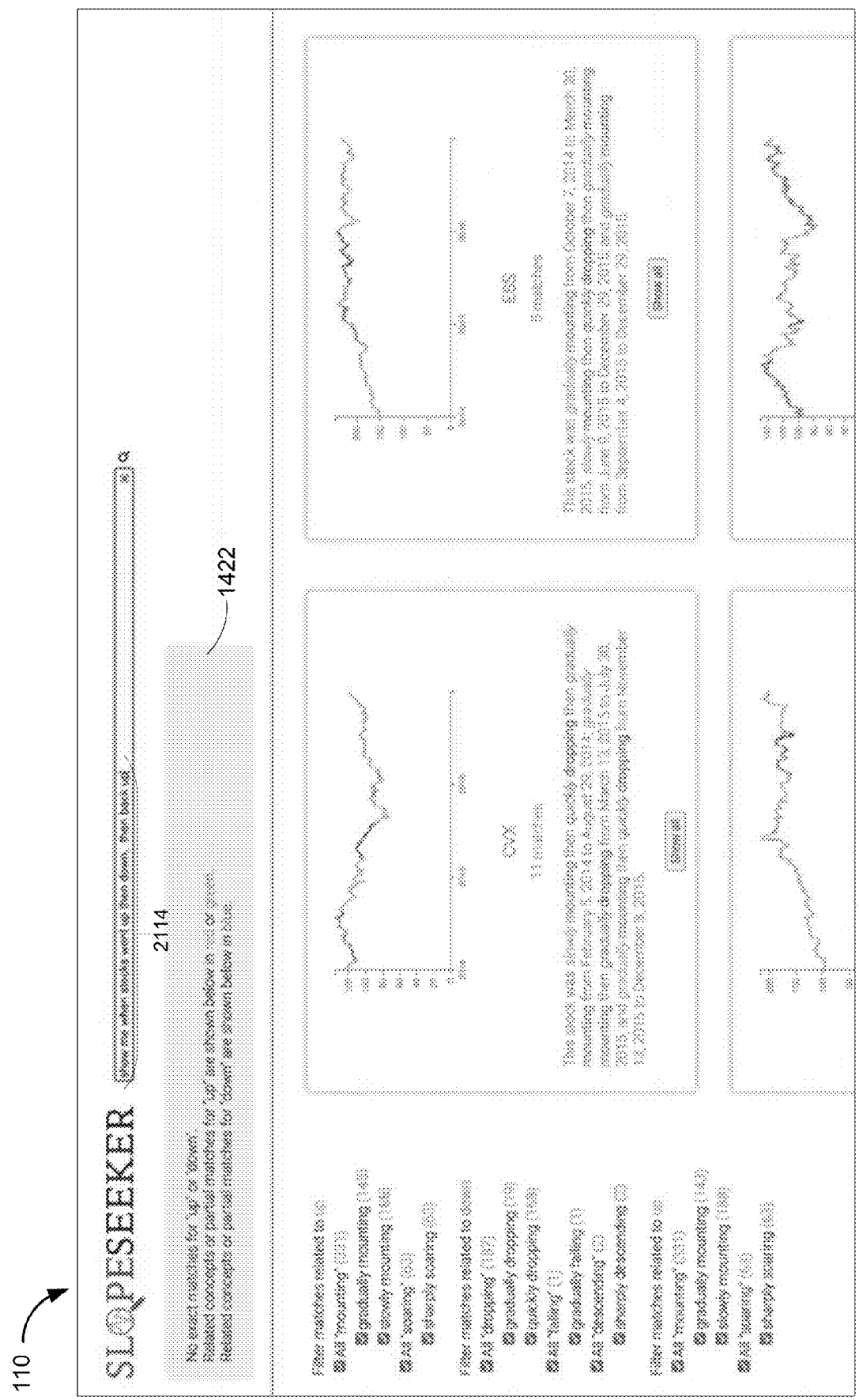

In some implementations, the system and user interface disclosed herein enable searching of arbitrary sequences of trend events. FIG. 21I illustrates results displayed on the user interface in response to a natural language query 2114 "show me when stocks went up then down, then back up." The notification box 1422 informs the user that there are no exact matches for the terms "up" or down," but there are related concepts that are shown on the side bar. The results show three sequences where the trend "up, down, up" as well as partial sequences where they exist otherwise.

VII. Exemplary Use Case Scenarios

FIGS. 22A to 22D provide a flowchart of a method 2200 for analyzing data trends, in accordance with some implementations. The method 2200 is also called a process.

The method 2200 is performed (2202) at a computing device 200 having a display 212, one or more processors 202, and memory 206. The memory 206 stores (2204) one or more programs configured for execution by the one or more processors 202. In some implementations, the operations shown in FIGS. 1, 4, 5, 6, 7A to 7C, 8, 9, 10, 11, 12, 13, 14A, 14B, 15, 16, 17A, 17B, 18A to 18G, 19A to 19D, 20A, 20B, and 21A to 21I correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 2200 may be combined and/or the order of some operations may be changed. In some implementations, some of the operations in the method 2200 may be combined with other operations in the method 2300.

The computing device receives (2206) a first natural language input specifying one or more search terms directed to a dataset. The dataset comprises a set of (e.g., a plurality of) time series data. In some implementations, the computing device receives the first natural language input via a search 102 (e.g., a natural language input box) of a user interface 110. In some implementations, the first natural language input is a verbal input or any other user input.

The computing device, in response to receiving the first natural language input, parses (2208) the first natural language input into one or more tokens.

The computing device assigns (2210) a respective semantic role to each of the one or more tokens.

In some implementations, the respective semantic role for each token comprises (2212) a predefined category of a plurality of categories. In some implementations, the plurality of categories includes (2214) two or more of: an event type (e.g., single or multi-sequence), a trend term (e.g., "tanking," "plateau," "steep increase," or "accelerating"), an attribute (e.g., one or more data fields and/or data values of data fields), and a date range (e.g., absolute or relative date ranges).

In some implementations, the plurality of categories includes (2216) the event type. The event type is one of: a single event or a multi-sequence event.

The computing device translates (2218) (i) the one or more tokens and (ii) one or more semantic roles assigned to the one or more tokens into one or more queries (e.g., into a machine-interpretable form that can be processed to retrieve relevant search results).

Referring to FIG. 22B, the computing device executes (2220) the one or more first queries against a search index (e.g., search index 130) to retrieve (from the search index) a plurality of labeled trend events. In some implementations, the search index is a search database, an Elasticsearch index, or other search indexing frameworks such as Solr, Sphinx, or OpenSearch. Each labeled trend event (i) corresponds (2222) to respective portion (that is less than all) of a respective line chart of a set of line charts (e.g., line graphs, line plots) representing the time series data and (ii) has a respective chart identifier.

The retrieved labeled trend events can be exact matches to at least one token (e.g., the user types "tanking" and a matching document would contain that word) or inexact matches to at least one token. An inexact match occurs when a search result is only returned as a result of support for synonyms or edge n-gram matches. A synonym match could be if the user types in "plummeting" and no documents contain that word, but documents do contain "tanking" and the specification for the search index settings has specified that "plummeting" and "tanking" are synonyms. An edge n-gram match occurs when the user only partially types in a search term but the search index can guess what the user means based on these first few letters. For instance, if the user types "dro", the search index would return documents that contain "dropping". The synonym and edge n-gram processing are performed by the search index according to specification in the search index settings (see, e.g., FIG. 15).

In some implementations, each labeled trend event of the plurality of labeled trend events is (2224) identified by a respective chart ID 262-1, a respective start point (in time) 264-1, a respective end point (in time) 266-1, and a respective set of (one or more) semantic labels 268-1.

In some implementations, a labeled trend event includes one (i.e., a single) semantic label. In some implementations, a labeled trend event includes two or more semantic labels. For example, if a trend event corresponds to a steep fall in stock price, it can be labeled ["tanking", "falling", "slumping"], from the most to the least precise order.

In some implementations, each labeled trend event of the plurality of labeled trend events is (2226) a respective labeled slope segment of a respective line chart in the set of line charts.

In some implementations, each line chart in the set of time series line charts is (2228) a plot of data values of a data field (or changes in data values of a data field) over a predefined timespan.

In some implementations, each line chart in the set of line charts has (2230) the same time span. For example, in some implementations, each line chart in the set of line charts can have the same length of time, such as 6 months, 1 year, or 3 years. In some implementations, each line chart in the set of line charts can span the same time duration, such as from January 2021 to December 2023.

In some implementations, the search index stores (2232) (i) first vector representations corresponding to the plurality of labeled trend events (e.g., as a plurality of document vectors $\mathcal{D} = \{d_1, d_2, \ldots, d_n\}$), (ii) second vector representations corresponding to a plurality of encoded tokens (encoded n-gram string tokens), and (iii) respective mapping relationships between the first vector representations and the second vector representations.

In some implementations the retrieved plurality of labeled trend events includes (2234) a first labeled trend event corresponding to an exact match of the one or more tokens. As an example, a user types "tanking" and the first labeled trend event contains the word "tanking."

In some implementations the retrieved plurality of labeled trend events includes (2236) a second labeled trend event corresponding to an inexact match of the one or more tokens. An inexact match occurs when a search result is only returned as a result of support for synonyms or edge n-gram matches. As an example, a synonym match can be when a user inputs the term "plummeting" and no documents contain that word, but documents do contain "tanking" and the specification for the search index settings has specified that "plummeting" and "tanking" are synonyms. An edge n-gram match occurs when the user only partially types in a search term and Elasticsearch can guess what the user means based on these letters. For instance, if the user types "dro", the search index will return documents that contain "dropping".

In some implementations, the computing device, in accordance with a determination that no exact match exists between the retrieved plurality of labeled trend events and the one or more tokens, generates (2238) and displays a notification (e.g., in a notification box 1422) indicating that there is no exact match for the one or more terms. The computing device displays (e.g., in a side bar 1424 of the user interface 110), one or more user-selectable text labels corresponding to synonyms of the one or more terms.

Figure 22A:
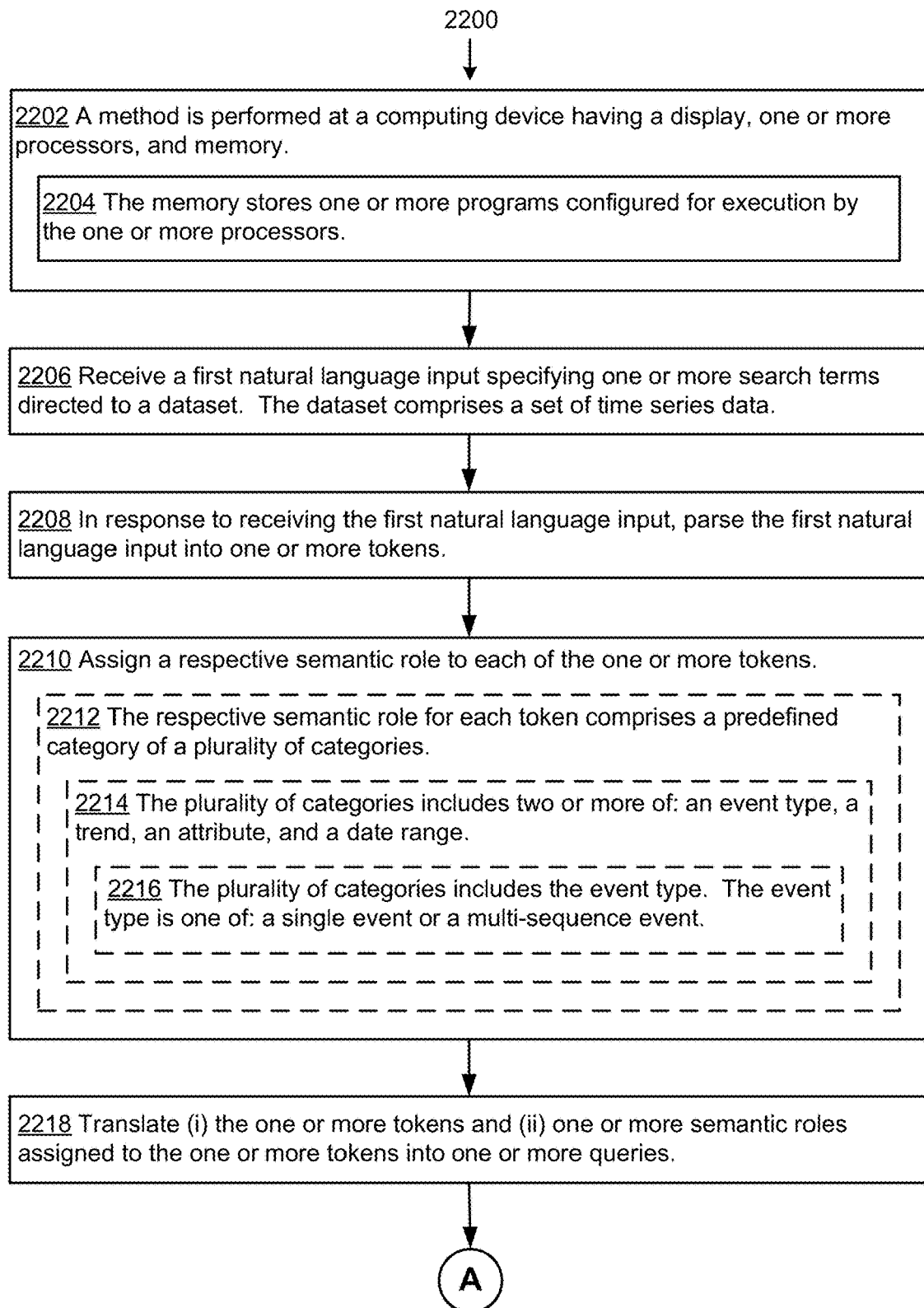
Figure 22C:
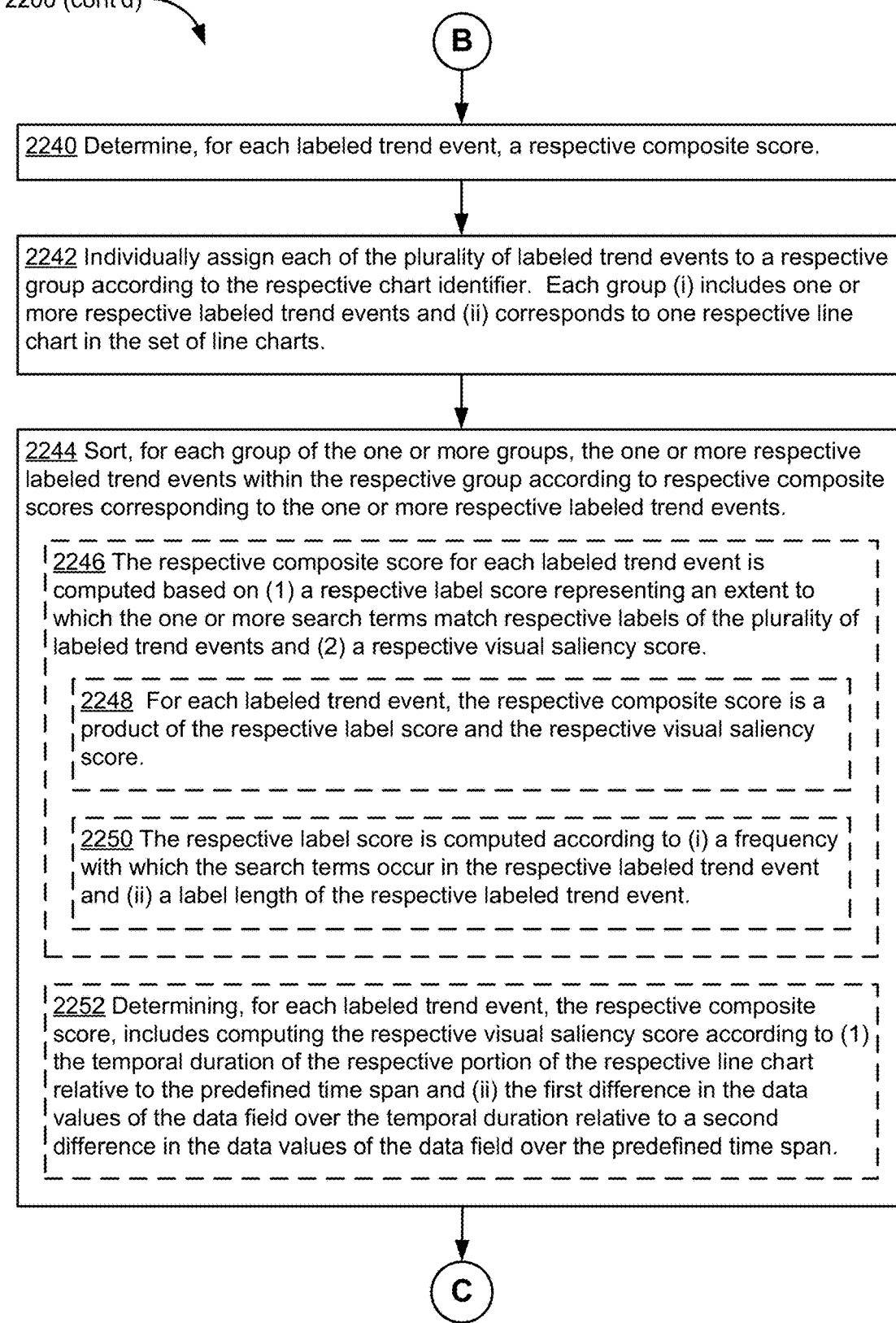

With continued reference to FIG. 22C, the computing device determines (2240), for each labeled trend event, a respective composite score.

The computing device individually assigns (2242) each of the plurality of labeled trend events to a respective group according to the respective chart identifier (see, e.g., Bucketing process in Section V.D.3). Each group (i) includes one or more respective labeled trend events and (ii) corresponds to one respective line chart in the set of line charts. Each group includes at least one labeled trend event. The number of groups is less than or equal to the number of line charts in the set of line charts.

The computing device sorts (2244), for each group of the one or more groups, the one or more respective labeled trend events within the respective group according to respective composite scores corresponding to the one or more respective labeled trend events.

In some implementations, the respective composite score for each labeled trend event is computed (2246) (e.g., by the search index 130 or by the computing device 200) based on (1) a respective label score representing an extent to which the one or more search terms match respective labels of the plurality of labeled trend events and (2) a respective visual saliency score (the visual saliency score quantifies the perceptual prominence of a trend event).

In some implementations, for each labeled trend event, the respective composite score is (2248) a product (i.e., multiplication) of the respective label score and the respective visual saliency score.

In some implementations, the respective label score is computed (2250) according to (i) a frequency with which the search terms occur in the respective labeled trend event and (ii) a label length of the respective labeled trend event.

In some implementations, determining (2252), for each labeled trend event, the respective composite score includes computing the respective visual saliency score according to (1) a temporal duration of the respective portion of the respective line chart relative to the predefined timespan and (ii) a first difference in the data values of the data field over the temporal duration relative to a second difference in the data values of the data field over the predefined timespan.

Figure 22D:
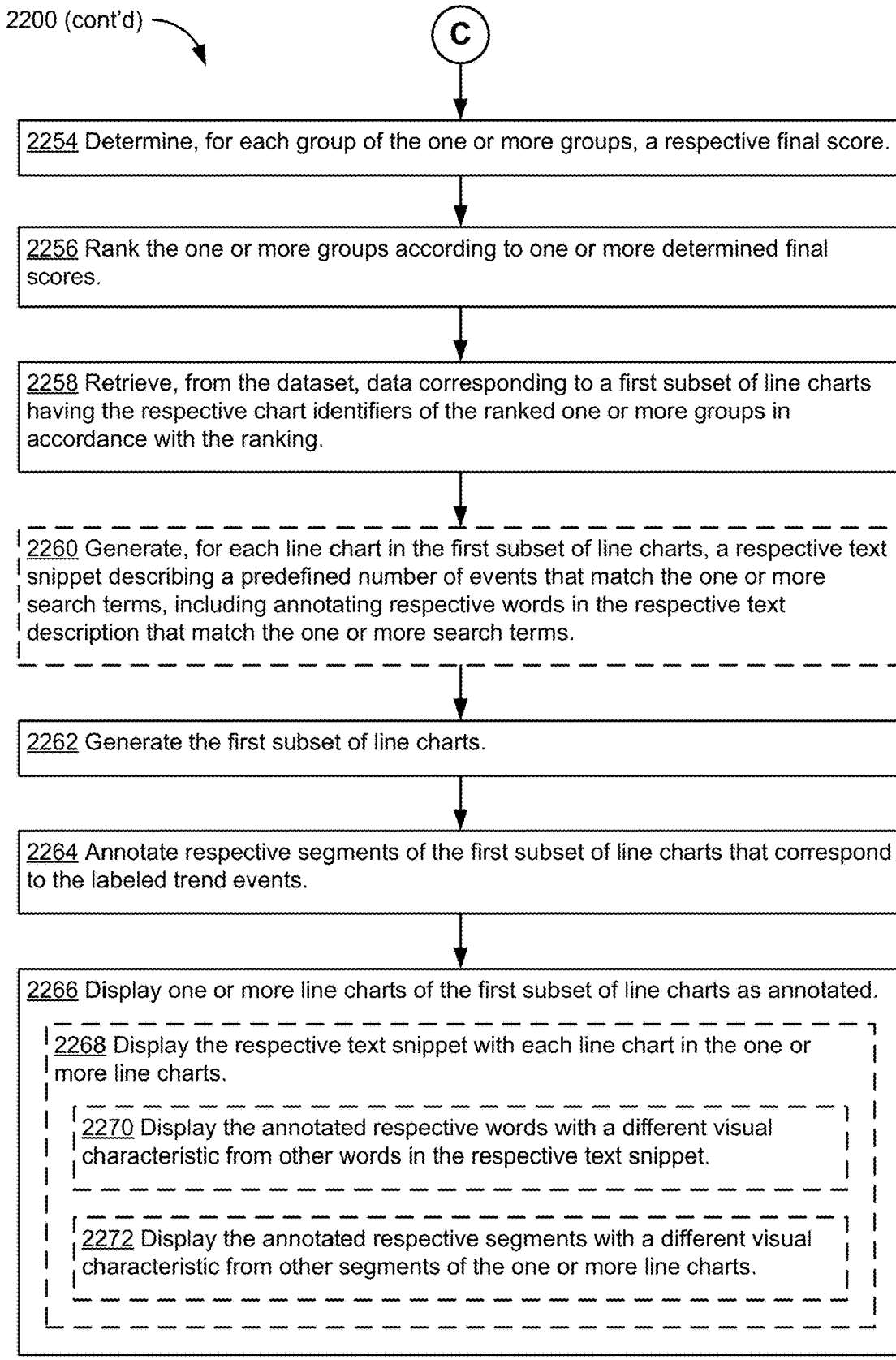

Referring to FIG. 22D, the computing device determines (2254), for each group (e.g., bucket) of the one or more groups, a respective final score. The final score for each group (e.g., bucket) is the sum of the composite scores of its individual events, and buckets are presented in sorted order according to this final score. Groups (or buckets) are only created if they have labeled trend events that would fit into them. In other words, there are no empty buckets, and so each bucket inherently has a score greater than zero.

The computing device ranks (2256) the one or more groups according to one or more determined final scores.

The computing device retrieves (2258), from the dataset, data corresponding to a first subset of (e.g., one or more) line charts having the respective chart identifiers of the ranked groups in accordance with the ranking.

In some implementations, the computing device, after retrieving the data corresponding to the first subset of line charts, generates (2260), for each line chart in the first subset of line charts, a respective text description describing a predefined number (e.g., up to three five, or seven) of events that matches the one or more search terms, including annotating (e.g., color-encoding or label-encoding) respective words in the respective text description that matches (e.g., partially or fully matches) the one or more search terms.

The computing device generates (2262) the first subset of line charts. For example, the computing device individually generates each line chart of the first subset of line charts.

The computing device annotates (2264) (e.g., via color-encoding or label-encoding) respective segments of the first subset of line charts that correspond to the labeled trend events.

The computing device displays (2266) one or more line charts of the first subset of line charts as annotated.

In some implementations, displaying the one or more of the first subset of line charts as annotated includes (2268) displaying the respective text snippet with each line chart in the one or more line charts.

In some implementations, the computing device displays (2270) the annotated respective words with a different visual characteristic from other words in the respective text description.

In some implementations, the computing device displays (2272) the annotated respective segments with a different visual characteristic from other segments of the one or more line charts.

FIGS. 23A to 23E provide a flowchart of a method 2300 for analyzing data trends, in accordance with some implementations. The method 2300 is also called a process.

The method 2300 is performed (2302) at a computing device 200 having a display 212, one or more processors 202, and memory 206. The memory 206 stores (2304) one or more programs configured for execution by the one or more processors 202. In some implementations, the operations shown in FIGS. 1, 4, 5, 6, 7A to 7C, 8, 9, 10, 11, 12, 13, 14A, 14B, 15, 16, 17A, 17B, 18A to 18G, 19A to 19D, 20A, 20B, and 21A to 21I correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 2300 may be combined and/or the order of some operations may be changed. In some implementations, some of the operations in the method 2300 may be combined with other operations in the method 2200.

The computing device receives (2306) (e.g., via a search bar 102 or a natural language input box of a user interface, or via a verbal input, or any other user input) a natural language input specifying a plurality of search terms directed to a dataset. The plurality of search terms includes a first search term and a second search term. The second search term is subsequent to the first search term in the natural language input. The dataset comprises a set of (e.g., a plurality of) time series data.

In some implementations, the natural language input does not have another trend term between the first search term and the second search term. Using the natural language input "Show me when Acme stocks went up, then flat, then down before 2020" as an example, in some instances, the first term is "up", and the second term is "flat". In some instances, the first term is "flat", and the second term is "down. In some implementations, In this example, the parser 236 (or the parser module 336) identifies the trend terms as ['up'], ['flat'], and ['down']. The parser determines that the natural language input is a multi-sequence event type based on the number of trend terms. In the case of multi-sequence event type, the number of trend terms in the natural language input is great than one. In the case of single event type, the number of trend terms in the natural language input is exactly equal to one.

In some implementations, the plurality of search terms specified in the natural language input includes (2308) a third search term.

The computing device, in response to (2310) receiving the natural language input, and in accordance with a determination that the first search term and the second search term (e.g., where each of the first and second search terms can be a single-word or a multi-word) specify a first sequence of data trends (e.g., in a specific order), (i) executes, for the first search term, one or more first queries against a search index to retrieve a first set of (one or more) labeled trend events; and (ii) executes, for the second search term, one or more second queries against the search index to retrieve a second set of (one or more) labeled trend events. Each labeled trend event in the first and second sets of labeled trend events (i) corresponds (2312) to respective portion (that is less than all) of a respective line chart of a set of line charts (e.g., line graphs, line plots) representing the time series data and (ii) has a respective chart identifier.

Referring to FIG. 23B, in some implementations, each labeled trend event of the plurality of labeled trend events is (2316) a respective labeled slope segment of a respective line chart in the set of line charts.

In some implementations, each line chart in the set of line charts has (2318) the same time span. For example, each line chart in the set of line charts can have the same length of time, such as 6 months, 1 year, or 3 years. As another example, each line chart in the set of line charts can have the same time duration, such as from January 2021 to December 2023.

In some implementations, the first sequence of data trends is (2322) specified by the first search term, the second search term, and the third search term. In some instances, the third search term is subsequent to the second search term. In some instances, the third search term precedes the first search term. Going back to the example natural language input "Show me when Acme stocks went up, then flat, then down before 2020," in one example, the first search term is "up," the second search term is "flat," and the third search term is "down." In another example, the third search term is "up," the first search term is "flat," and the second search term is "down."

In some implementations, the determination that the first search term and the second search term specify the first sequence of data trends includes parsing (2324) (e.g., using a semantic parser, such as parser 236 or parser module 336) the natural language input including the first search term and the second search term into a plurality of tokens, including assigning (i) a first semantic role to a first token corresponding to the first search term and (ii) a second semantic role to a second token corresponding to the second search term; and determining, based on the assigned first and second semantic roles, that the first search term and the second search term specify the first sequence of data trends.

In some implementations, parsing the natural language input includes determining (2326) that an event type corresponding to the natural language input is a multi-sequence event type.

With continued reference to FIG. 23C, the computing device constructs (2328) one or more sequences of labeled trend events based on the retrieved first and second sets of labeled trend events.

In some implementations, constructing the one or more sequences of labeled trend events based on the retrieved first and second sets of trend events includes: for each sequence of labeled trend events, joining (2330) (e.g., via a SQL join) a respective first labeled trend event corresponding to the first search term and a respective second labeled trend event corresponding to the second search term, according to (i) a respective chart identifier corresponding to the respective first labeled trend event and the respective second labeled trend event and (ii) respective start and end dates of the respective first labeled trend event and the respective second labeled trend event.

In some implementations, a tunable parameter is included to allow for some temporal delay (or a temporal interlude) between adjacent events. The tunable parameter allows for "a temporal interlude between adjacent events in a sequence," the length of which is chosen as appropriate for the data and context. For example, the "tunable parameter" can be set to one day, three days, one week, or any amount of time a user would like to allow between events for them to still be considered a sequence. This means that a sequence search for "up, down" would return sequences composed of an "up" event followed by a "down" event with an allowance for an intervening day, week, etc. between the end of the "up" event and the start of the "down" event. The temporal delay can be an arbitrarily long or short temporal delay. In practice, the amount of temporal delay can be selected based on what is appropriate for the data and domain.

In some implementations, the computing device, in accordance with a determination that the constructed one or more sequences of labeled trend events are partial sequence matches of the natural language input, determines (2332), for each sequence of the one or more sequences, a respective sequence score based at least in part on (i) a number of events in the respective sequence and (ii) a respective sequence offset (the respective sequence offset is the number of sequential events missing from the beginning of the sequence compared to the query).

Going back to the example natural language input "Show me when Acme stocks went up, then flat, then down before 2020," where the user is interested in stocks with the pattern "up, flat, down" which has length three, a sub-sequence of length two (e.g., "up, flat") will be scored higher than a sub-sequence of length one (e.g., "up") because it matches more constituent events of the sequence. Second, a non-edge sub-sequence (with a large offset) will be penalized to be scored lower than an edge sub-sequence (with zero offset). Continuing with the same example, the sub-sequence "up, flat" has zero offset because it begins at the same place as the initial query pattern, but "flat, down" has an offset of one since begins starts one event later in the sequence. Intuitively, sub-sequence partial matches that begin similarly to the desired sequence from the query should be scored higher than those that end similarly to the desired sequence. Finally, after applying any score penalties to the sequence results and any partial results, all results are bucketed, and the bucket scores are computed as before.)

Referring now to FIG. 23D, in some implementations, after constructing the one or more sequences of labeled trend events, the computing device determines (2334), for each sequence of the one or more sequences, a respective sequence score by aggregating (summing) one or more respective composite scores corresponding to one or more respective labeled trend events in the respective sequence.

In some implementations, for a respective labeled trend event in the respective sequence, the computing device determines (2336) a respective composite score for the respective labeled trend event based on (1) a respective label score representing an extent to which a respective search term matches respective labels of the plurality of labeled trend events and (2) a respective visual saliency score. The visual saliency score quantifies the perceptual prominence of a trend event.

In some implementations, the respective composite score is (2338) a product (e.g., a multiplication) of the respective label score and the respective visual saliency score.

In some implementations, determining the respective composite score includes computing (2340) the respective label score according to (i) a frequency with which the first search terms occur in the respective labeled trend event and (ii) a label length of the respective labeled trend event.

In some implementations, each line chart in the set of time series line charts is a plot of data values of a data field (or changes in data values of a data field) over a predefined timespan. Determining the respective composite score includes computing (2342) the respective visual saliency score according to (1) a temporal duration of the respective portion of the respective line chart relative to the predefined timespan and (ii) a first difference in the data values of the data field over the temporal duration relative to a second difference in the data values of the data field over the predefined timespan.

The computing device assigns (2344) each sequence of labeled trend events, of the one or more sequences of labeled trend events, into one or more groups according to the respective chart identifier.

The computing device determines (2346), for each group of the one or more groups, a respective final score.

In some implementations, the respective final score for each group of the one or more groups is (2348) an aggregation of one or more respective sequence scores, from one or more respective sequences of labeled trend events, in the respective group.

Figure 23A:
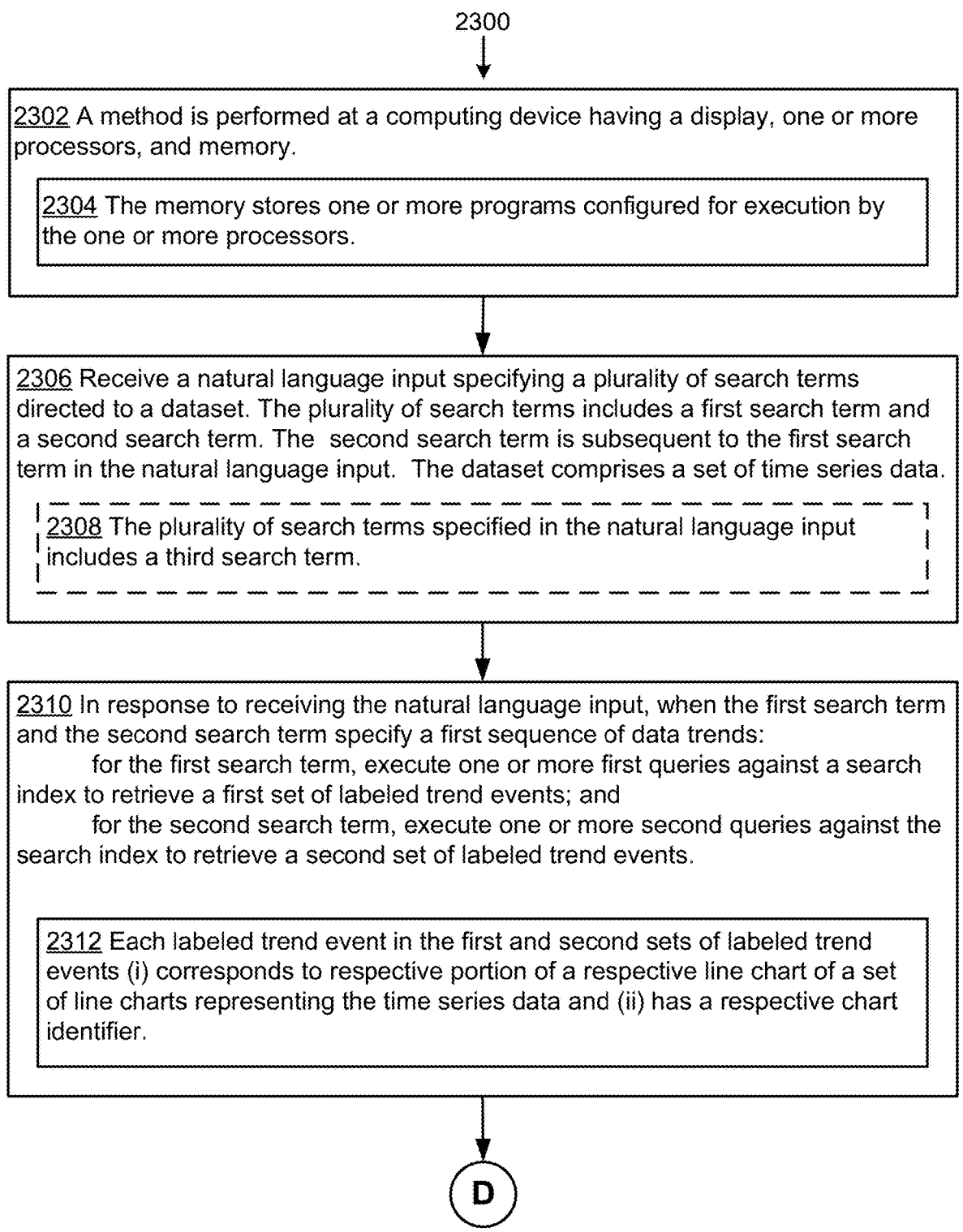
Figure 23E:
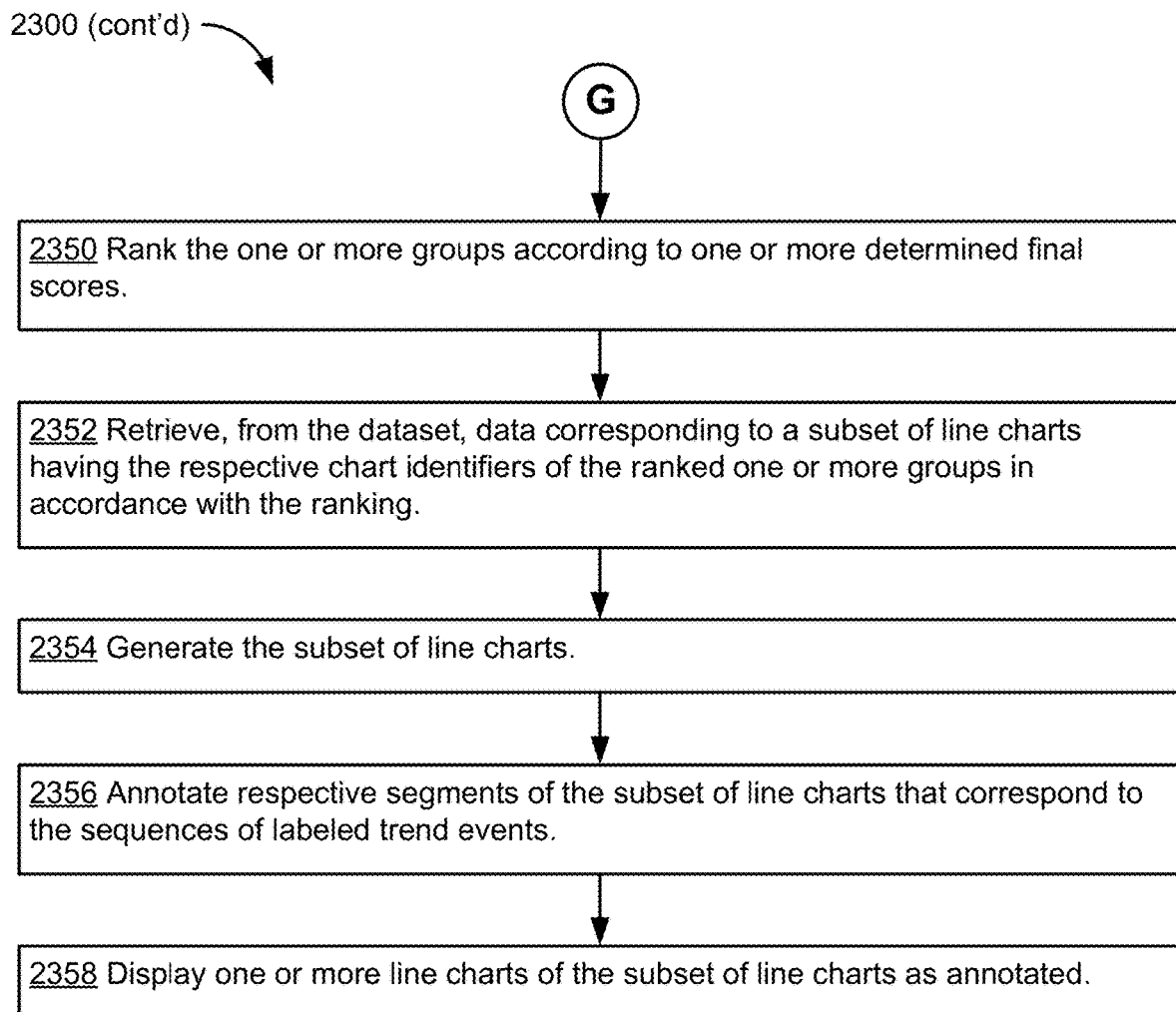

With continued reference to FIG. 23E, the computing device ranks (2350) the one or more groups according to one or more determined final scores.

The computing device retrieves (2352), from the dataset, data corresponding to a subset of (one or more) line charts having the respective chart identifiers of the ranked groups in accordance with the ranking.

The computing device generates (2354) the subset of line charts.

The computing device annotates (2356) (e.g., via color-encoding or label-encoding) respective segments of the subset of line charts that correspond to the sequences of labeled trend events; and The computing device displays (2358) one or more line charts of the subset of line charts as annotated.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" entails each of the following possibilities: A only, B only, C only, A and B without C, A and C without B, B and C without A, and a combination of A, B, and C.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for analyzing data trends, comprising:
at a computing device having one or more processors, and memory storing one or more programs configured for execution by the one or more processors:
receiving a first natural language input specifying one or more search terms directed to a dataset, wherein the dataset comprises a set of time series data;
in response to receiving the first natural language input:
parsing the first natural language input into one or more tokens, including assigning a respective semantic role to each of the one or more tokens;
translating (i) the one or more tokens and (ii) one or more semantic roles assigned to the one or more tokens into one or more queries;
executing the one or more queries against a search index to retrieve a plurality of labeled trend events, wherein each labeled trend event (i) corresponds to respective portion of a respective line chart of a set of line charts representing the time series data and (ii) has a respective chart identifier;
determining, for each labeled trend event, a respective composite score;
individually assigning each of the plurality of labeled trend events to a respective group according to the respective chart identifier, wherein each group (i) includes one or more respective labeled trend events and (ii) corresponds to one respective line chart in the set of line charts;
sorting, for each group of the one or more groups, the one or more respective labeled trend events within the respective group according to respective composite scores corresponding to the one or more respective labeled trend events;
determining, for each group of the one or more groups, a respective final score;
ranking the one or more groups according to one or more determined final scores;
retrieving, from the dataset, data corresponding to a first subset of line charts having the respective chart identifiers of the ranked one or more groups in accordance with the ranking;
generating the first subset of line charts;
annotating respective segments of the first subset of line charts that correspond to the labeled trend events; and
displaying one or more line charts of the first subset of line charts as annotated.

2. The method of claim 1, further comprising:
after retrieving the data corresponding to the first subset of line charts:
generating, for each line chart in the first subset of line charts, a respective text snippet describing a predefined number of events that match the one or more search terms, including annotating respective words in the respective text snippet that match the one or more search terms;

wherein displaying the one or more of the first subset of line charts as annotated includes displaying the respective text snippet with each line chart in the one or more line charts.

3. The method of claim 2, further comprising:
displaying the annotated respective words with a different visual characteristic from other words in the respective text snippet; and
displaying the annotated respective segments with a different visual characteristic from other segments of the one or more line charts.

4. The method of claim 1, wherein the respective semantic role for each token comprises a predefined category of a plurality of categories, the plurality of categories including two or more of: an event type, a trend, an attribute, and a date range.

5. The method of claim 4, wherein:
the plurality of categories includes the event type; and
the event type is one of: a single event or a multi-sequence event.

6. The method of claim 1, wherein each labeled trend event of the plurality of labeled trend events is identified by a respective chart ID, a respective start point, a respective end point, and a respective set of semantic labels.

7. The method of claim 1, wherein each labeled trend event of the plurality of labeled trend events is a respective labeled slope segment of a respective line chart in the set of line charts.

8. The method of claim 1, wherein:
the respective composite score for each labeled trend event is computed based on (1) a respective label score representing an extent to which the one or more search terms match respective labels of the plurality of labeled trend events and (2) a respective visual saliency score.

9. The method of claim 8, wherein:
for each labeled trend event, the respective composite score is a product of the respective label score and the respective visual saliency score.

10. The method of claim 8, wherein determining, for each labeled trend event, the respective composite score includes:
computing the respective label score according to (i) a frequency with which the search terms occur in the respective labeled trend event and (ii) a label length of the respective labeled trend event.

11. The method of claim 8, wherein:
each line chart in the set of line charts is a plot of data values of a data field over a predefined time span; and
determining, for each labeled trend event, the respective composite score includes:
computing the respective visual saliency score according to (i) a temporal duration of the respective portion of the respective line chart relative to the predefined time span and (ii) a first difference in the data values of the data field over the temporal duration relative to a second difference in the data values of the data field over the predefined time span.

12. The method of claim 1, wherein each line chart in the set of line charts has the same time span.

13. The method of claim 1, wherein the search index stores (i) first vector representations corresponding to the plurality of labeled trend events, (ii) second vector representations corresponding to a plurality of encoded tokens, and (iii) respective mapping relationships between the first vector representations and the second vector representations.

14. The method of claim 1, wherein the retrieved plurality of labeled trend events includes:
a first labeled trend event corresponding to an exact match of the one or more tokens; and
a second labeled trend event corresponding to an inexact match of the one or more tokens.

15. The method of claim 1, further comprising:
in accordance with a determination that no exact match exists between the retrieved plurality of labeled trend events and the one or more tokens:
generating and displaying a notification indicating that there is no exact match for the one or more terms; and
displaying, one or more user-selectable text labels corresponding to synonyms of the one or more terms.

16. A computing device, comprising:
a display;
one or more processors; and
memory coupled to the one or more processors, the memory storing one or more programs configured to be executed by the one or more processors, the one or more programs including instructions for:
receiving a first natural language input specifying one or more search terms directed to a dataset, wherein the dataset comprises a set of time series data;
in response to receiving the first natural language input:
parsing the first natural language input into one or more tokens, including assigning a respective semantic role to each of the one or more tokens;
translating (i) the one or more tokens and (ii) one or more semantic roles assigned to the one or more tokens into one or more queries;
executing the one or more queries against a search index to retrieve a plurality of labeled trend events, wherein each labeled trend event (i) corresponds to respective portion of a respective line chart of a set of line charts representing the time series data and (ii) has a respective chart identifier;
determining, for each labeled trend event, a respective composite score;
individually assigning each of the plurality of labeled trend events to a respective group according to the respective chart identifier, wherein each group (i) includes one or more respective labeled trend events and (ii) corresponds to one respective line chart in the set of line charts;
sorting, for each group of the one or more groups, the one or more respective labeled trend events within the respective group according to respective composite scores corresponding to the one or more respective labeled trend events;
determining, for each group of the one or more groups, a respective final score;
ranking the one or more groups according to one or more determined final scores;
retrieving, from the dataset, data corresponding to a first subset of line charts having the respective chart identifiers of the ranked one or more groups in accordance with the ranking;
generating the first subset of line charts;
annotating respective segments of the first subset of line charts that correspond to the labeled trend events; and
displaying one or more line charts of the first subset of line charts as annotated.

17. The computing device of claim 16, the one or more programs further including instructions for:

after retrieving the data corresponding to the first subset of line charts:
  generating, for each line chart in the first subset of line charts, a respective text snippet describing a predefined number of events that match the one or more search terms, including annotating respective words in the respective text snippet that match the one or more search terms;
  wherein the instructions for displaying the one or more of the first subset of line charts as annotated include instructions for displaying the respective text snippet with each line chart in the one or more line charts.

18. The computing device of claim 17, the one or more programs further including instructions for:
  displaying the annotated respective words with a different visual characteristic from other words in the respective text snippet; and
  displaying the annotated respective segments with a different visual characteristic from other segments of the one or more line charts.

19. The computing device of claim 16, the one or more programs further including instructions for:
  in accordance with a determination that no exact match exists between the retrieved plurality of labeled trend events and the one or more tokens:
    generating and displaying a notification indicating that there is no exact match for the one or more terms; and
    displaying, one or more user-selectable text labels corresponding to synonyms of the one or more terms.

20. A non-transitory computer-readable storage medium storing one or more programs, the one or more programs comprising instructions, which when executed by a computing device having a display, one or more processors, and memory, cause the computing device to perform operations comprising:
  receiving a first natural language input specifying one or more search terms directed to a dataset, wherein the dataset comprises a set of time series data;
  in response to receiving the first natural language input:
    parsing the first natural language input into one or more tokens, including assigning a respective semantic role to each of the one or more tokens;
    translating (i) the one or more tokens and (ii) one or more semantic roles assigned to the one or more tokens into one or more queries;
    executing the one or more queries against a search index to retrieve a plurality of labeled trend events, wherein each labeled trend event (i) corresponds to respective portion of a respective line chart of a set of line charts representing the time series data and (ii) has a respective chart identifier;
    determining, for each labeled trend event, a respective composite score;
    individually assigning each of the plurality of labeled trend events to a respective group according to the respective chart identifier, wherein each group (i) includes one or more respective labeled trend events and (ii) corresponds to one respective line chart in the set of line charts;
    sorting, for each group of the one or more groups, the one or more respective labeled trend events within the respective group according to respective composite scores corresponding to the one or more respective labeled trend events;
    determining, for each group of the one or more groups, a respective final score;
    ranking the one or more groups according to one or more determined final scores;
    retrieving, from the dataset, data corresponding to a first subset of line charts having the respective chart identifiers of the ranked one or more groups in accordance with the ranking;
    generating the first subset of line charts;
    annotating respective segments of the first subset of line charts that correspond to the labeled trend events; and
    displaying one or more line charts of the first subset of line charts as annotated.

* * * * *